US012472306B2

(12) United States Patent
Naaman et al.

(10) Patent No.: US 12,472,306 B2
(45) Date of Patent: Nov. 18, 2025

(54) MULTIPLE USE COMPUTERIZED INJECTOR

(71) Applicant: E3D A.C.A.L., Merom Hagalil (IL)

(72) Inventors: Idan Naaman, Merom Hagalil (IL); Amotz Porat, West Galilee (IL); Michael Segev, Lower Galilee (IL); Tsachi Shaked, Merom Hagalilee (IL)

(73) Assignee: E3D A.C.A.L., Merom Hagalil (IL)

( * ) Notice: Subject to any disclaimer, the term of this patent is extended or adjusted under 35 U.S.C. 154(b) by 735 days.

(21) Appl. No.: 17/800,447

(22) PCT Filed: Feb. 16, 2021

(86) PCT No.: PCT/IL2021/050182
§ 371 (c)(1),
(2) Date: Aug. 17, 2022

(87) PCT Pub. No.: WO2021/165958
PCT Pub. Date: Aug. 26, 2021

(65) Prior Publication Data
US 2023/0070400 A1  Mar. 9, 2023

Related U.S. Application Data

(60) Provisional application No. 62/977,746, filed on Feb. 18, 2020.

(51) Int. Cl.
*A61M 5/315* (2006.01)
*A61M 5/145* (2006.01)
(Continued)

(52) U.S. Cl.
CPC ...... *A61M 5/31546* (2013.01); *A61M 5/1456* (2013.01); *A61M 5/24* (2013.01);
(Continued)

(58) Field of Classification Search
CPC .. A61M 5/31546; A61M 5/1456; A61M 5/24; A61M 5/3146; A61M 5/31578; A61M 5/31593; A61M 5/482; A61M 2005/2411
See application file for complete search history.

(56) References Cited

U.S. PATENT DOCUMENTS

2015/0202367 A1   7/2015  Plaschkes et al.
2017/0175859 A1   6/2017  Brockmeier
(Continued)

FOREIGN PATENT DOCUMENTS

WO   2005/097237 A1   10/2005
WO   2014/066256 A1    5/2014
WO   2017/212473 A2   12/2017

*Primary Examiner* — Tasnim Mehjabin Ahmed
(74) *Attorney, Agent, or Firm* — Sughrue Mion, PLLC

(57) ABSTRACT

A computer-controlled injector, including a housing arranged along a longitudinal axis and configured to receive a cassette assembly, containing a medicament cartridge; the housing includes a cassette assembly receiving volume and a cassette assembly insertion and removal opening communicating with the cassette assembly receiving volume; at least one locking element for locking the cassette assembly with respect to the housing upon axial insertion of the cassette assembly into the housing; and an injection drive mechanism including a computer-controlled motor for driving a piston, forming part of the medicament cartridge, for injecting a medicament, the computer-controlled motor also being operative for operating the at least one locking element for releasing the cassette assembly from the housing.

20 Claims, 41 Drawing Sheets

(51) Int. Cl.
  *A61M 5/24*   (2006.01)
  *A61M 5/31*   (2006.01)
  *A61M 5/48*   (2006.01)

(52) U.S. Cl.
  CPC ...... *A61M 5/3146* (2013.01); *A61M 5/31578* (2013.01); *A61M 5/31593* (2013.01); *A61M 5/482* (2013.01); *A61M 2005/2411* (2013.01)

(56) References Cited

U.S. PATENT DOCUMENTS

2019/0009028 A1   1/2019  Jacobsen et al.
2019/0143043 A1*  5/2019  Coles ..................... A61M 5/24

\* cited by examiner

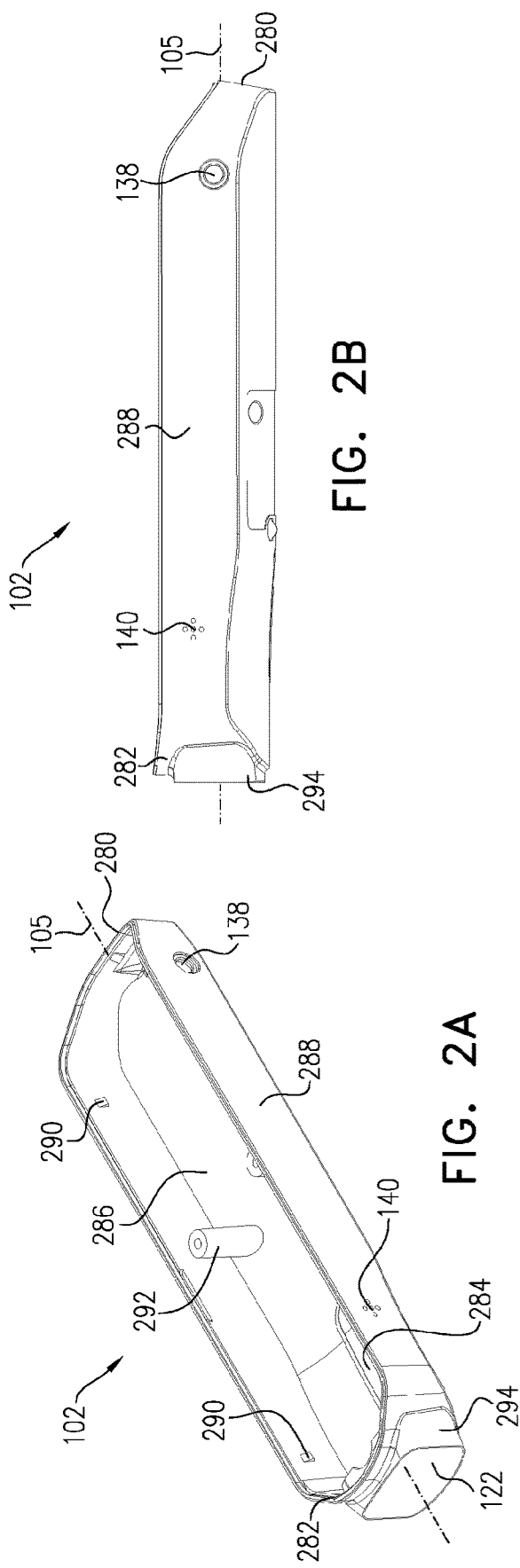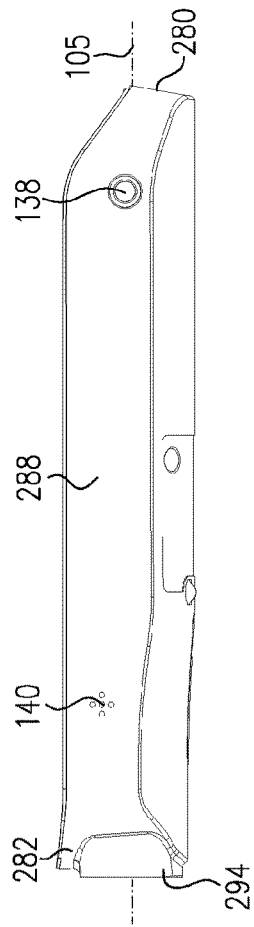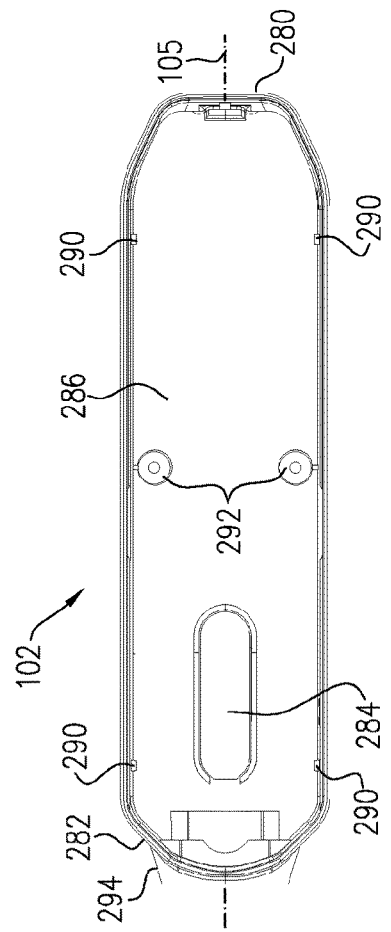

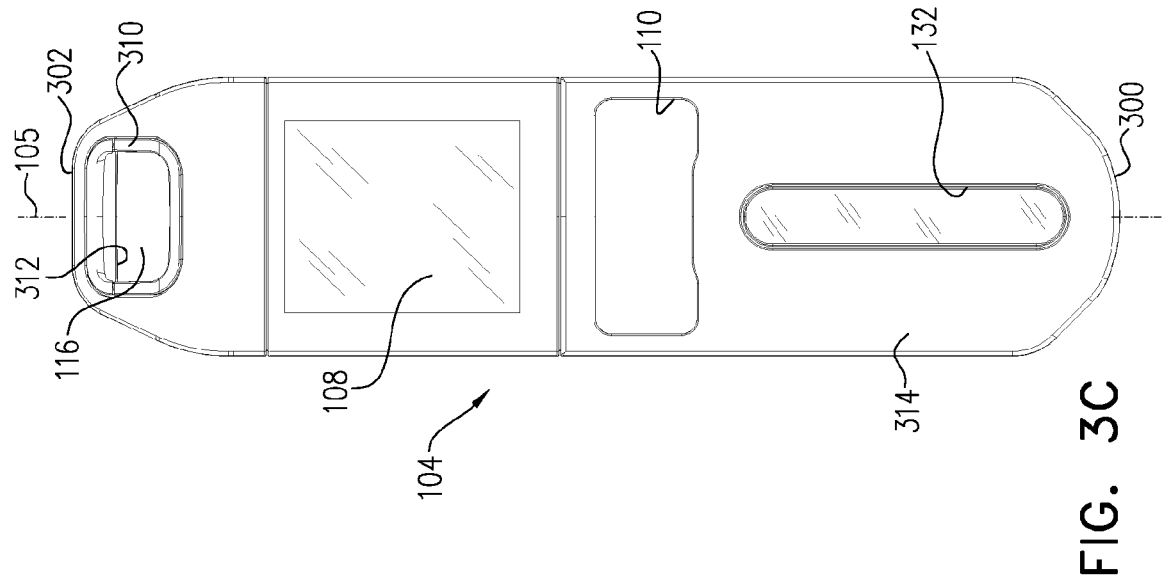
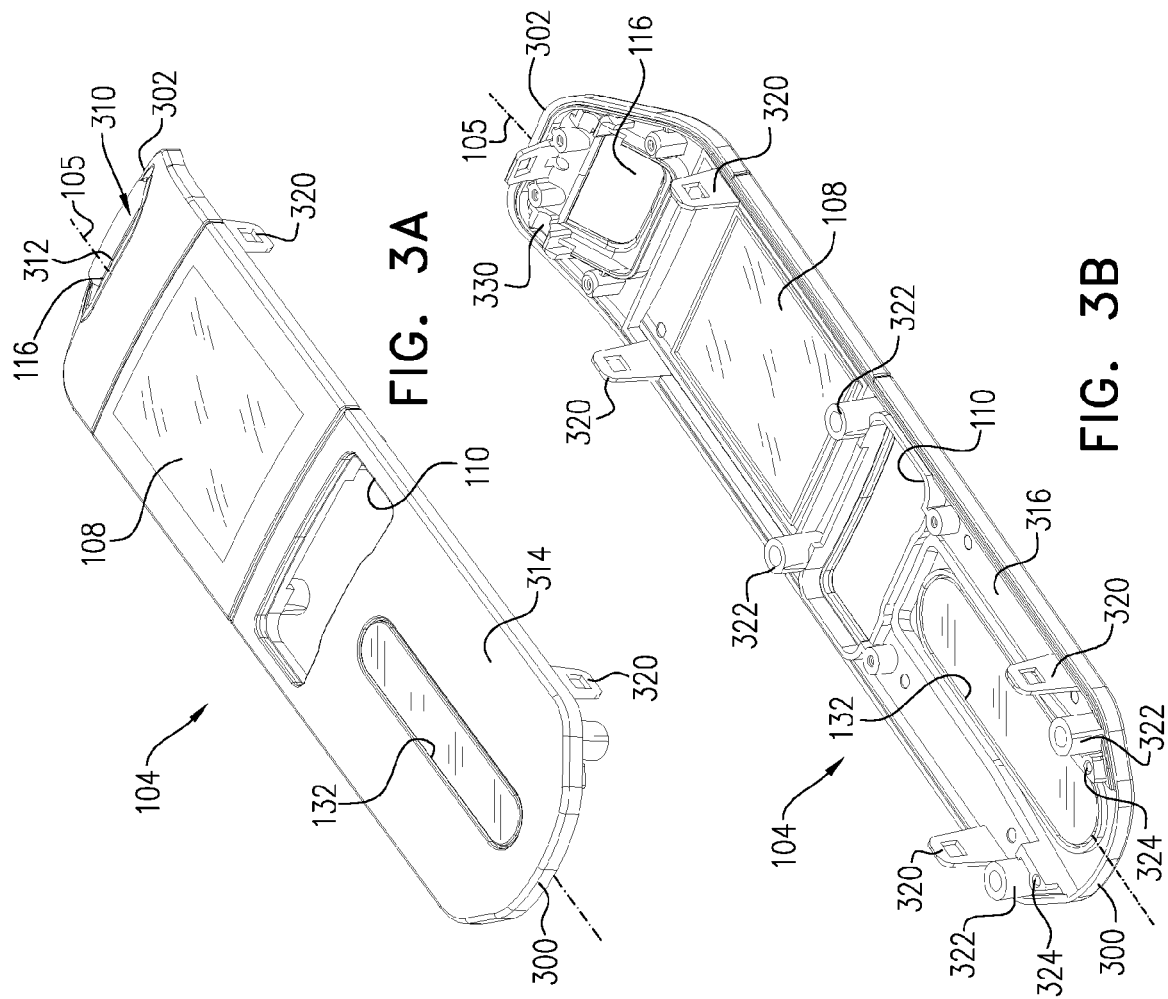

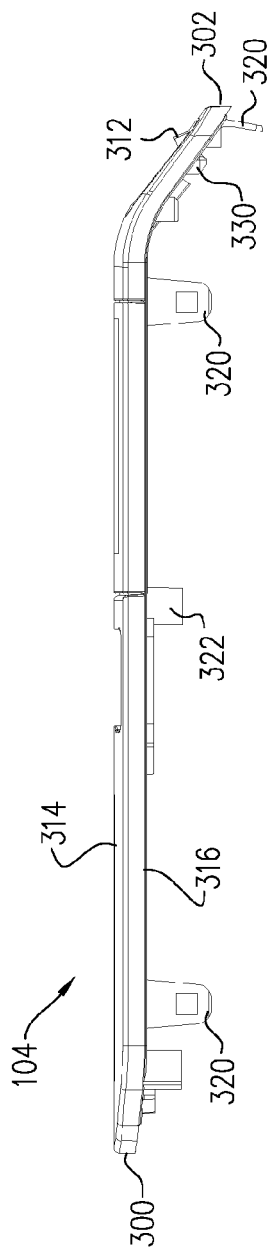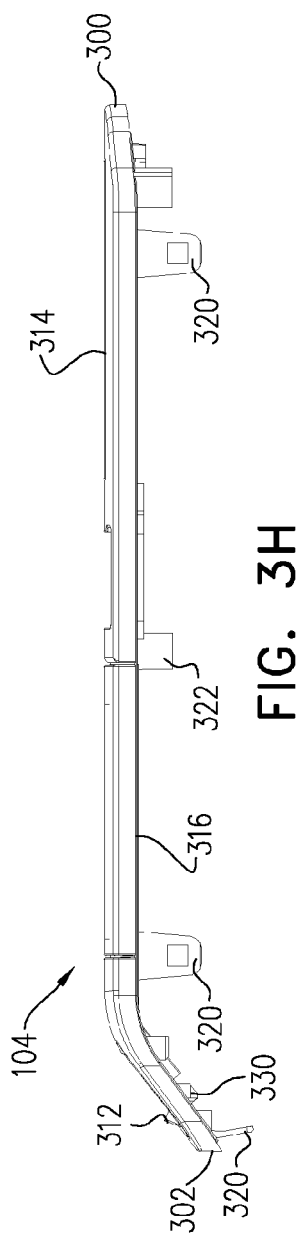

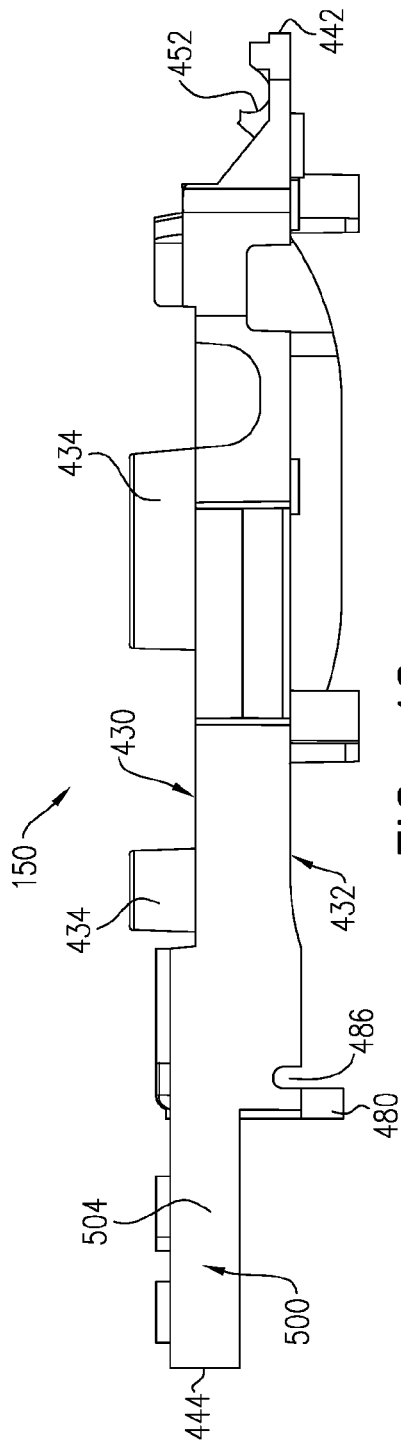
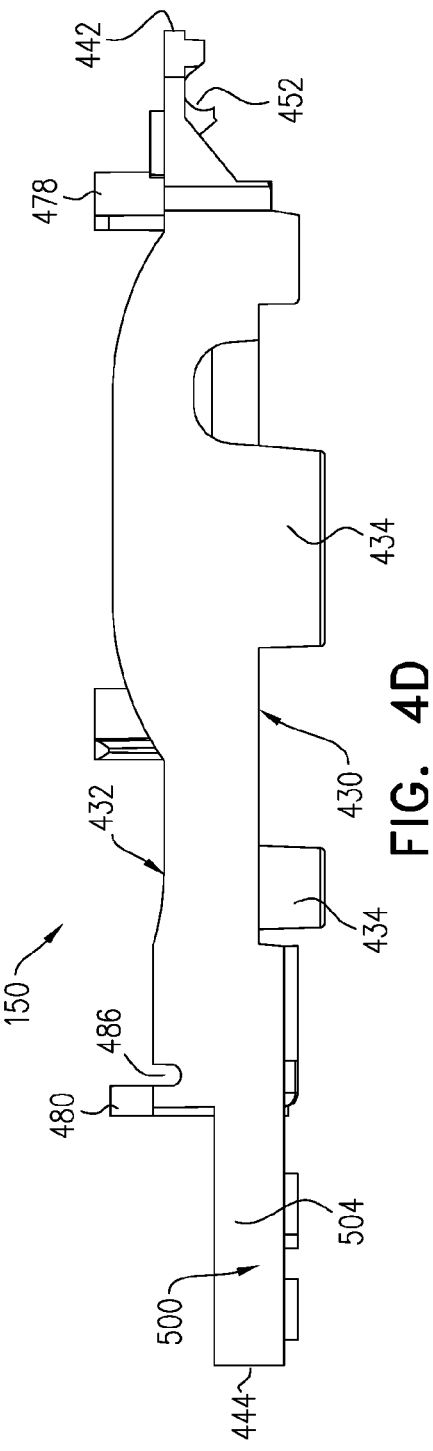
FIG. 4C
FIG. 4D

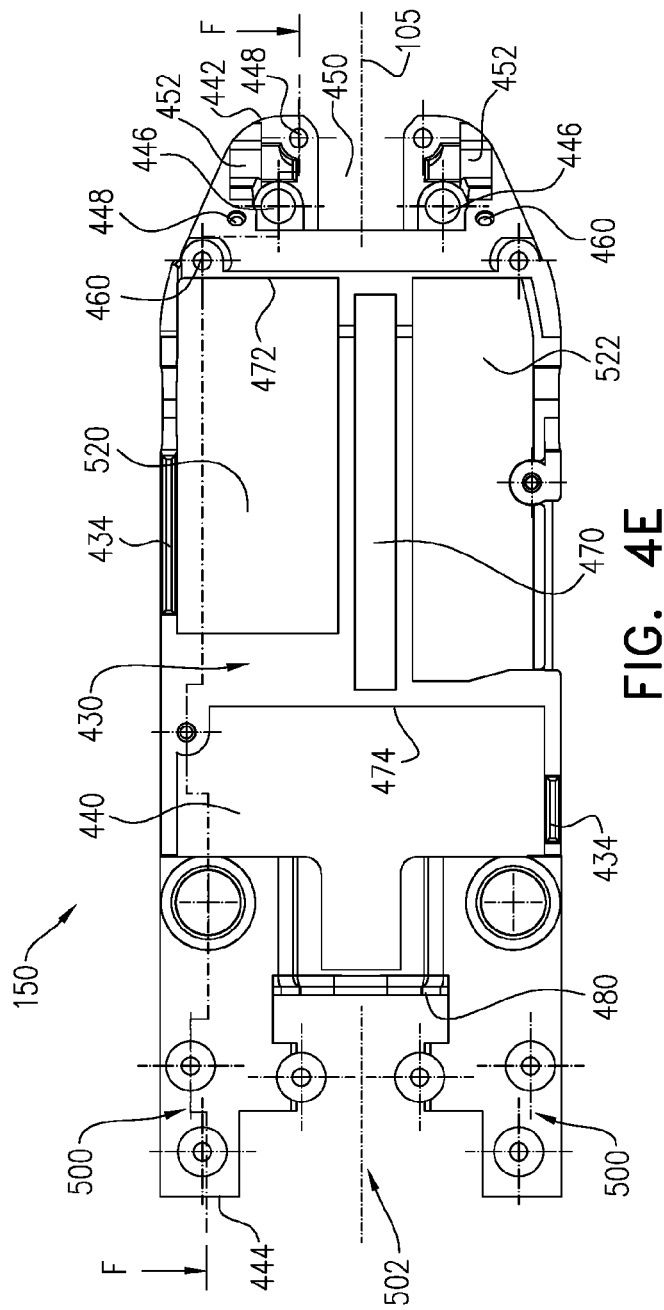
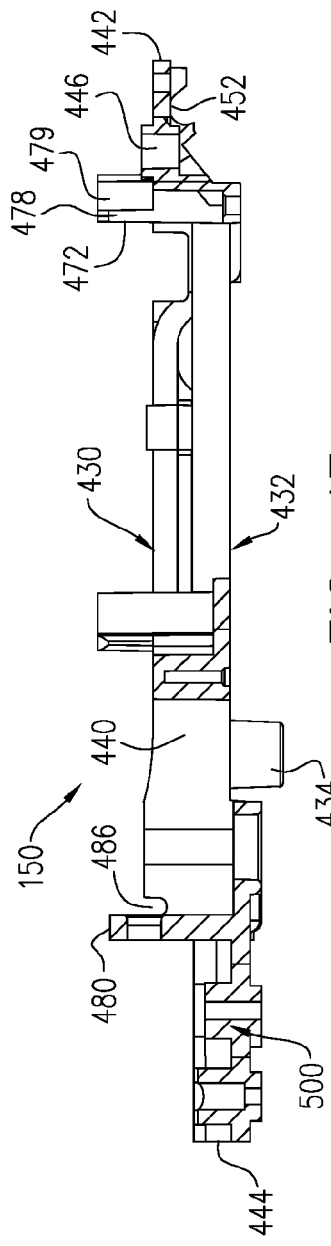
FIG. 4E
FIG. 4F

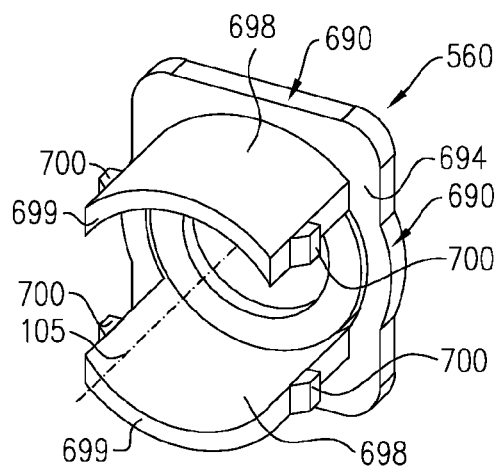 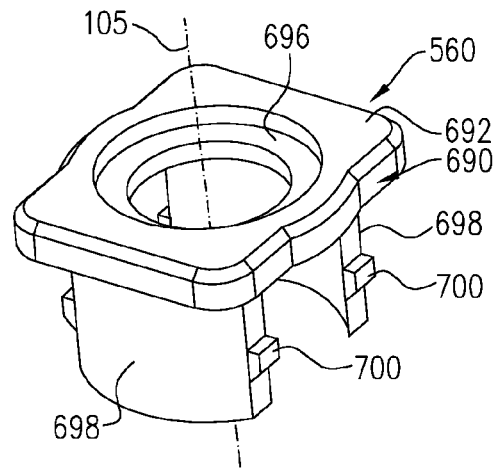
FIG. 8A   FIG. 8B
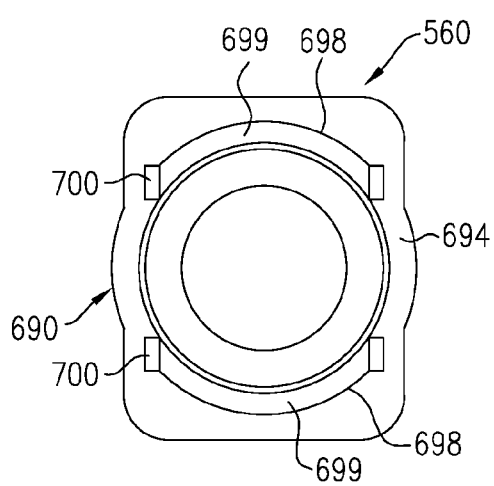 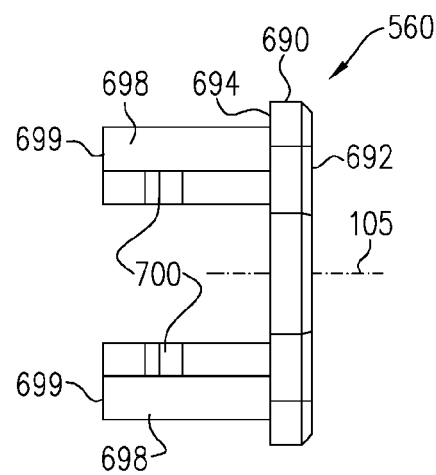
FIG. 8C   FIG. 8D

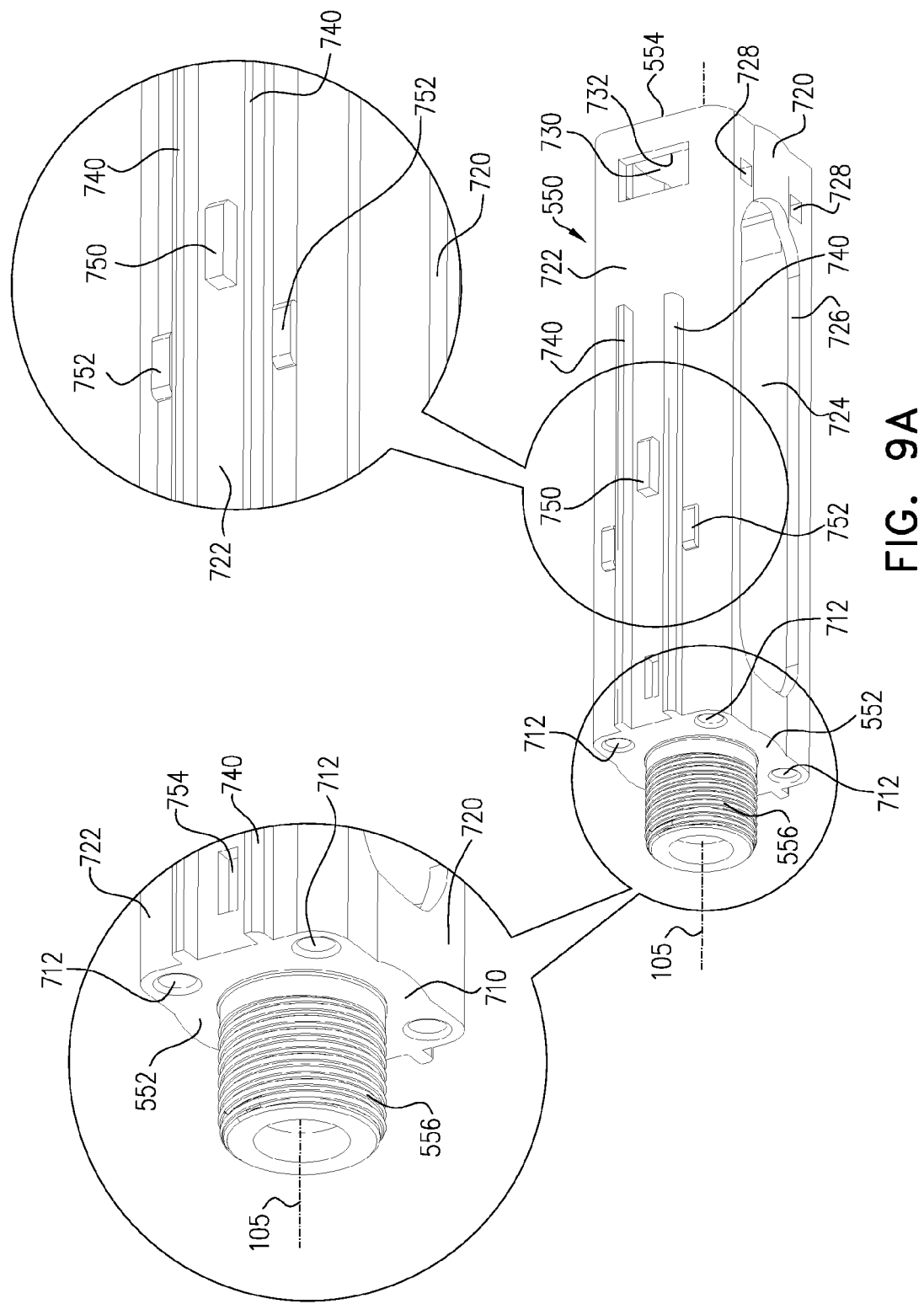

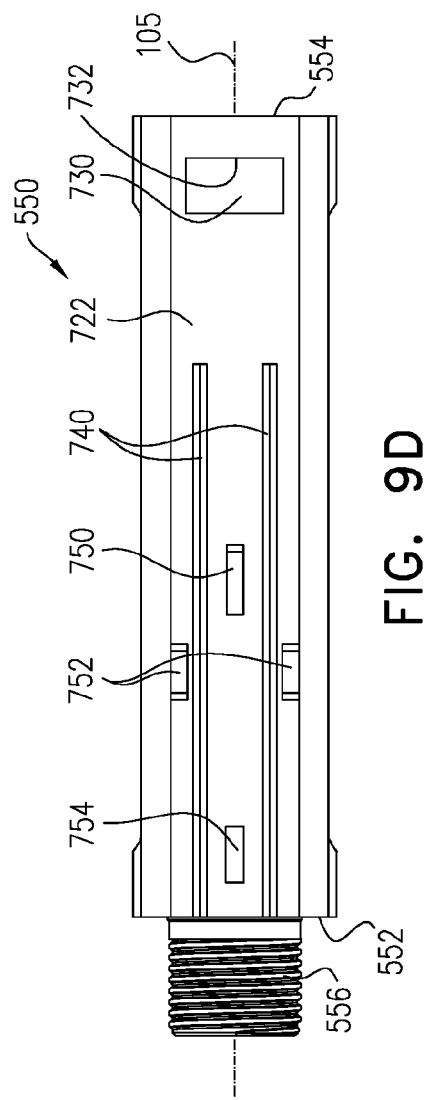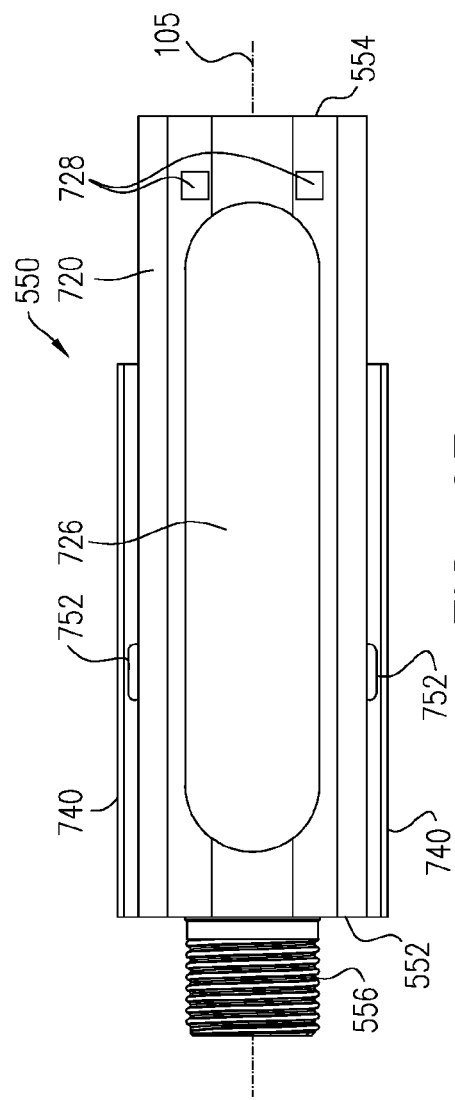

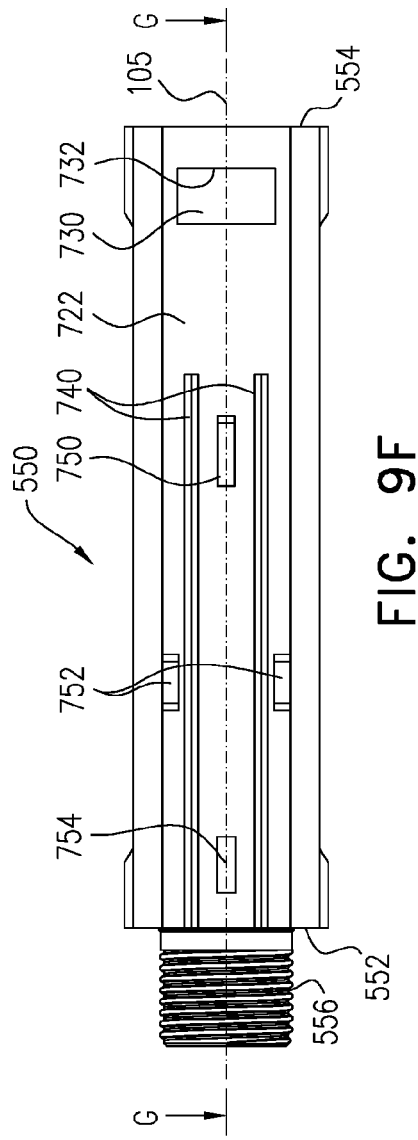
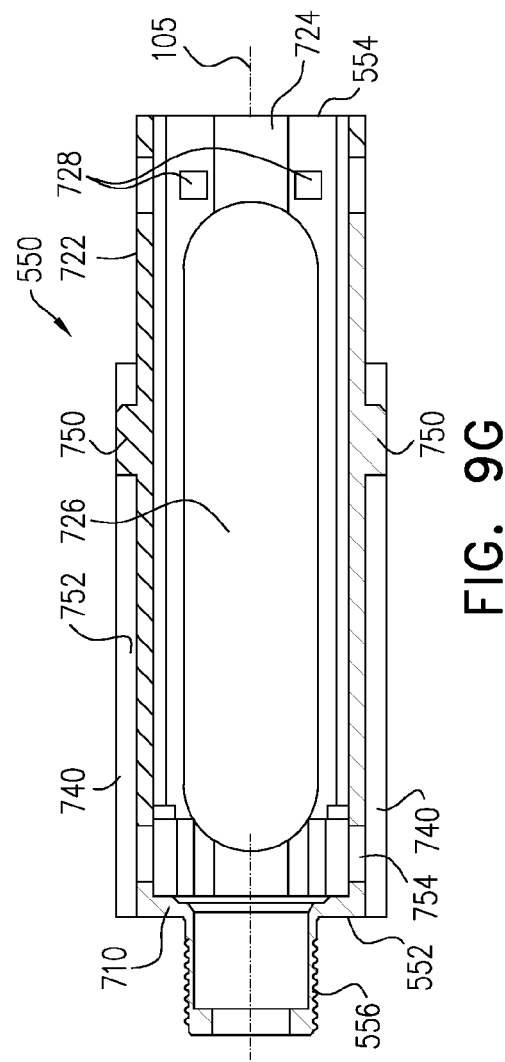

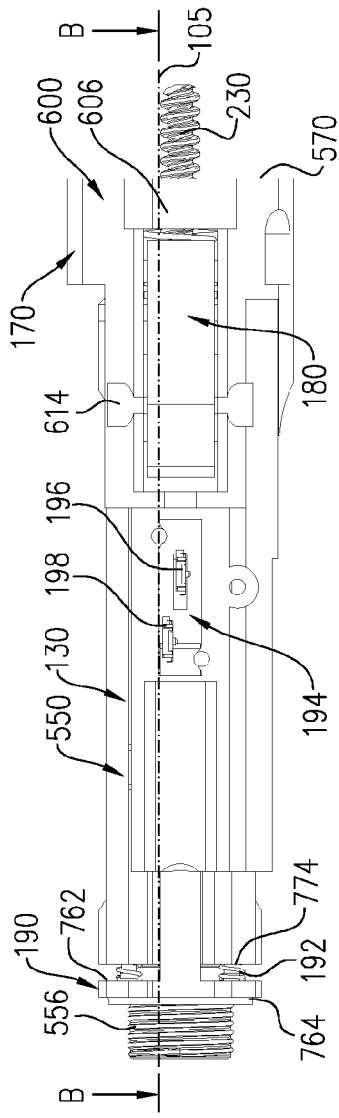
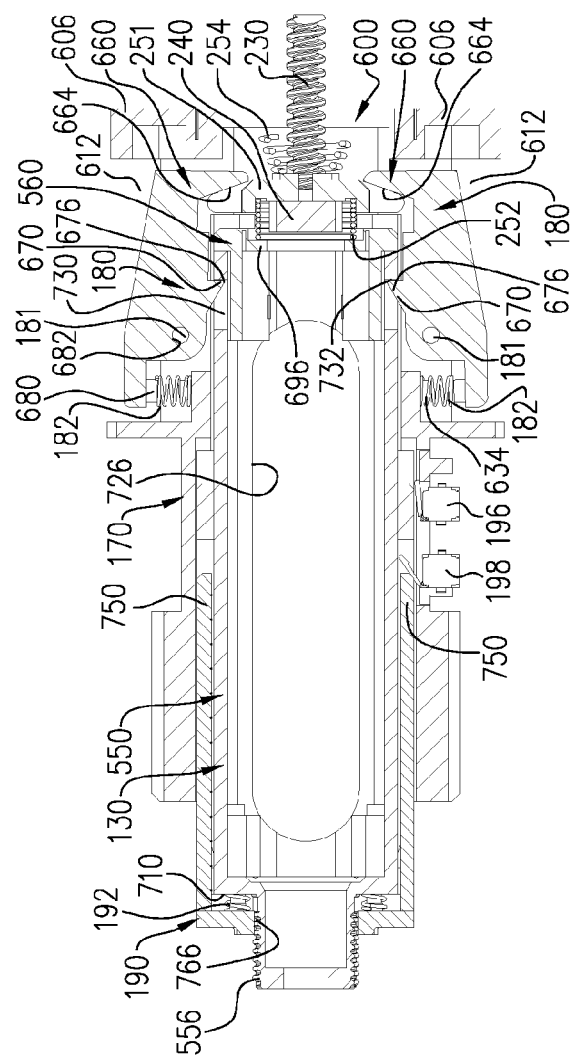
FIG. 11A
FIG. 11B

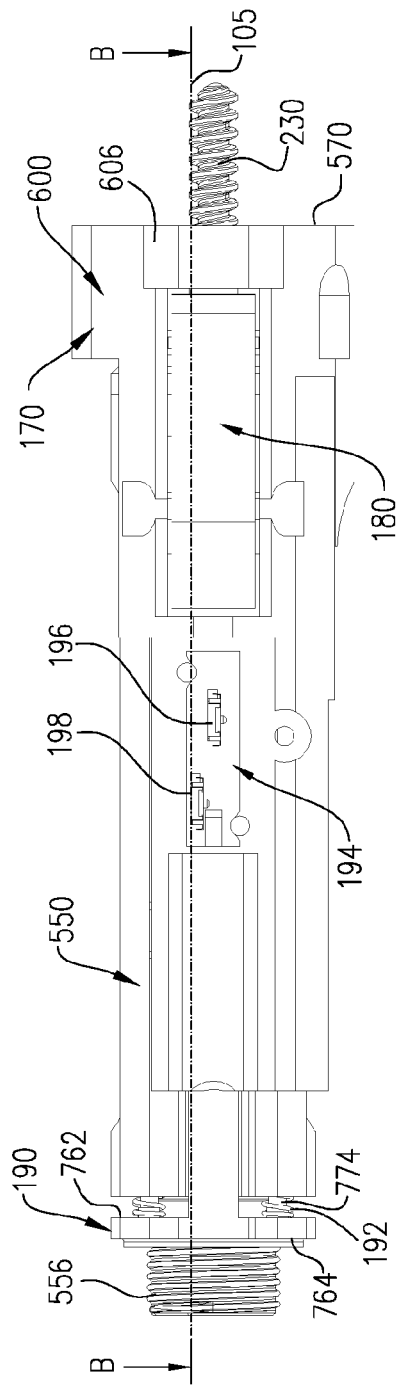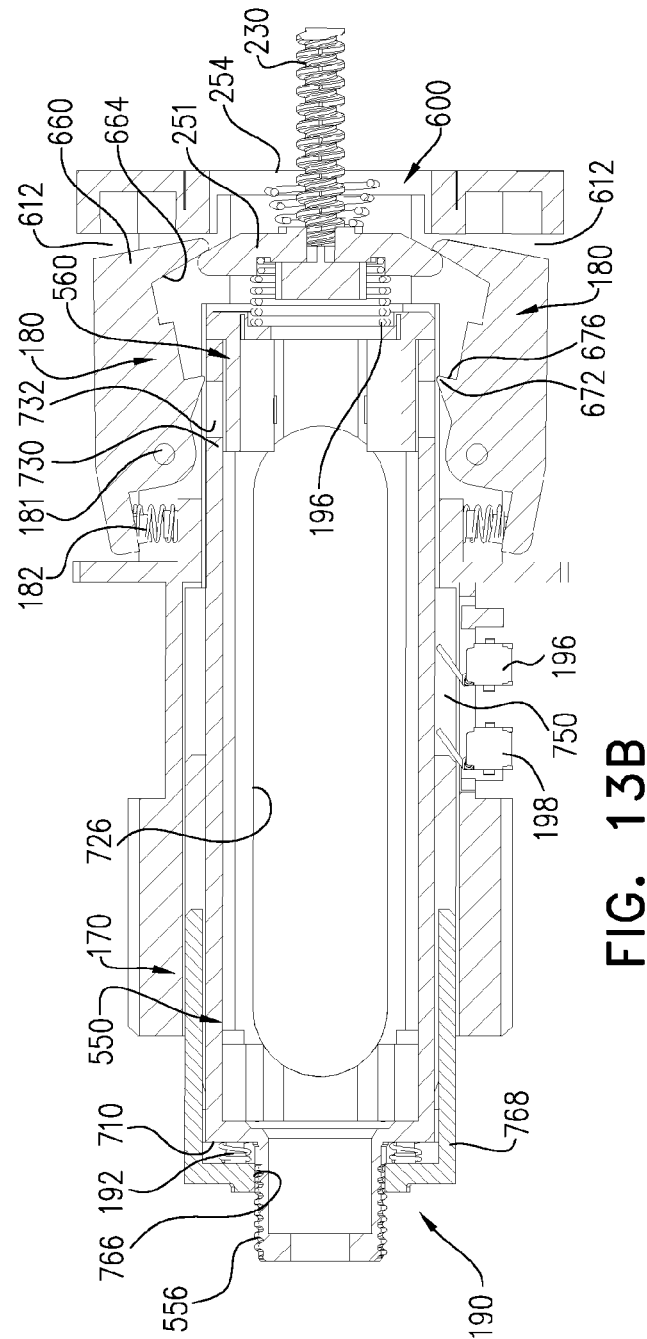
FIG. 13A
FIG. 13B

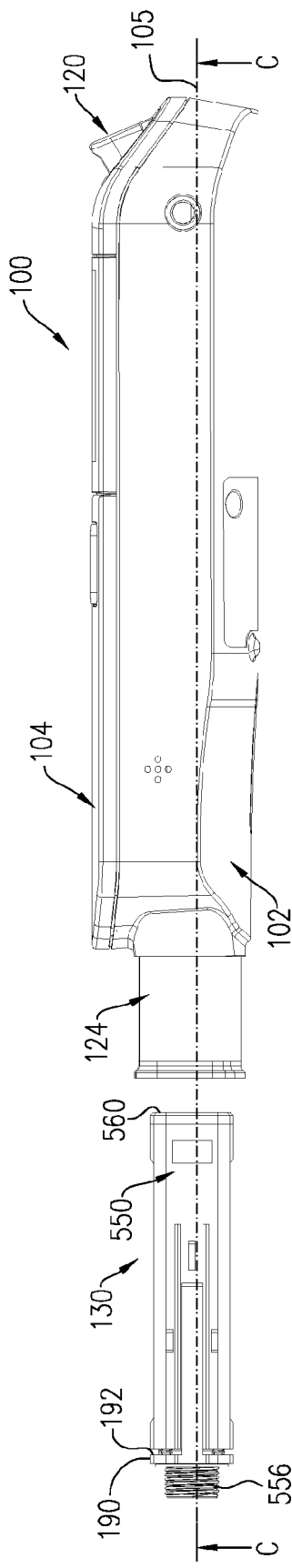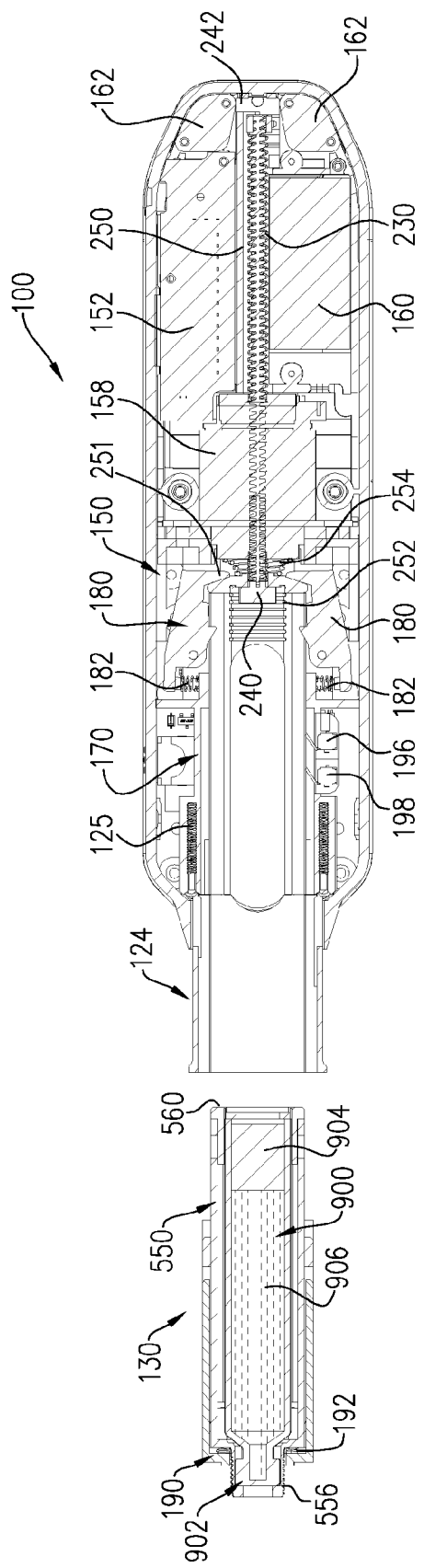
FIG. 15B
FIG. 15C

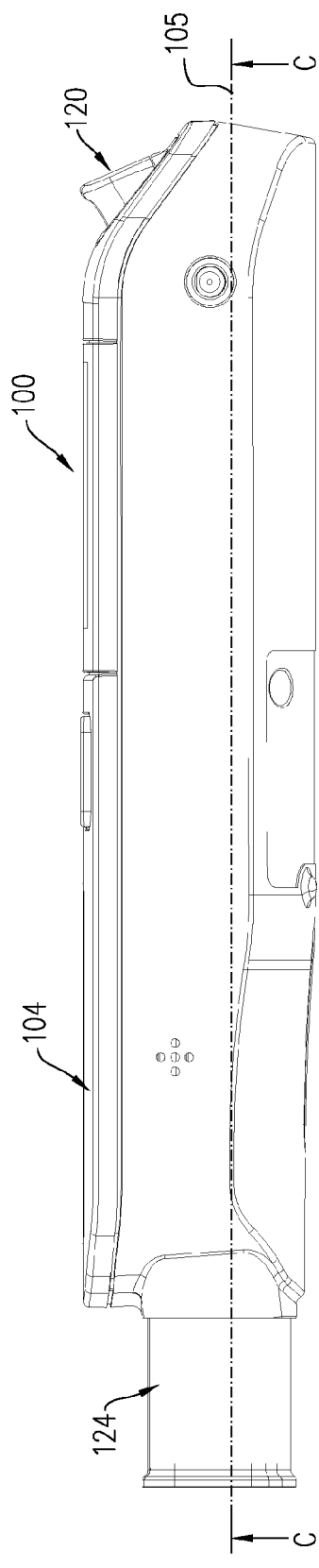
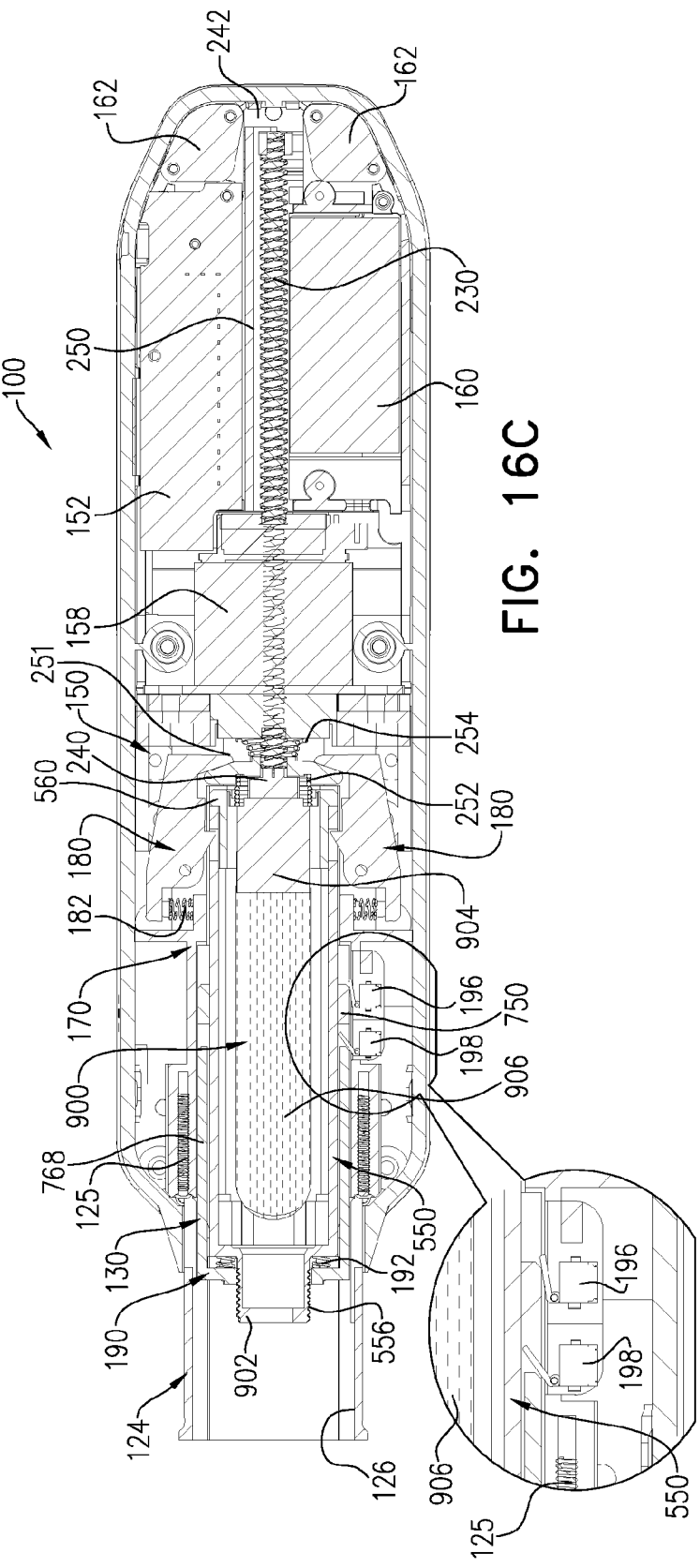
FIG. 16B
FIG. 16C

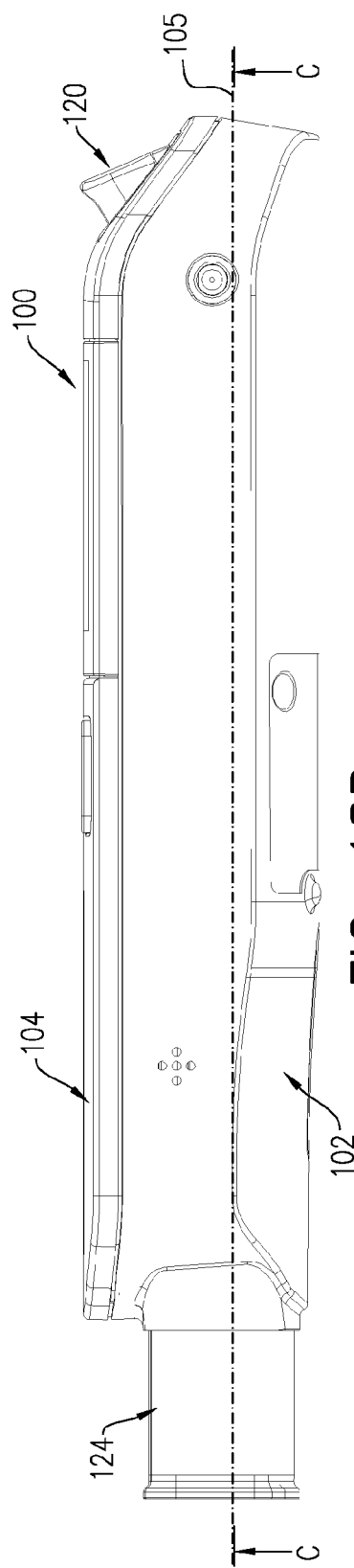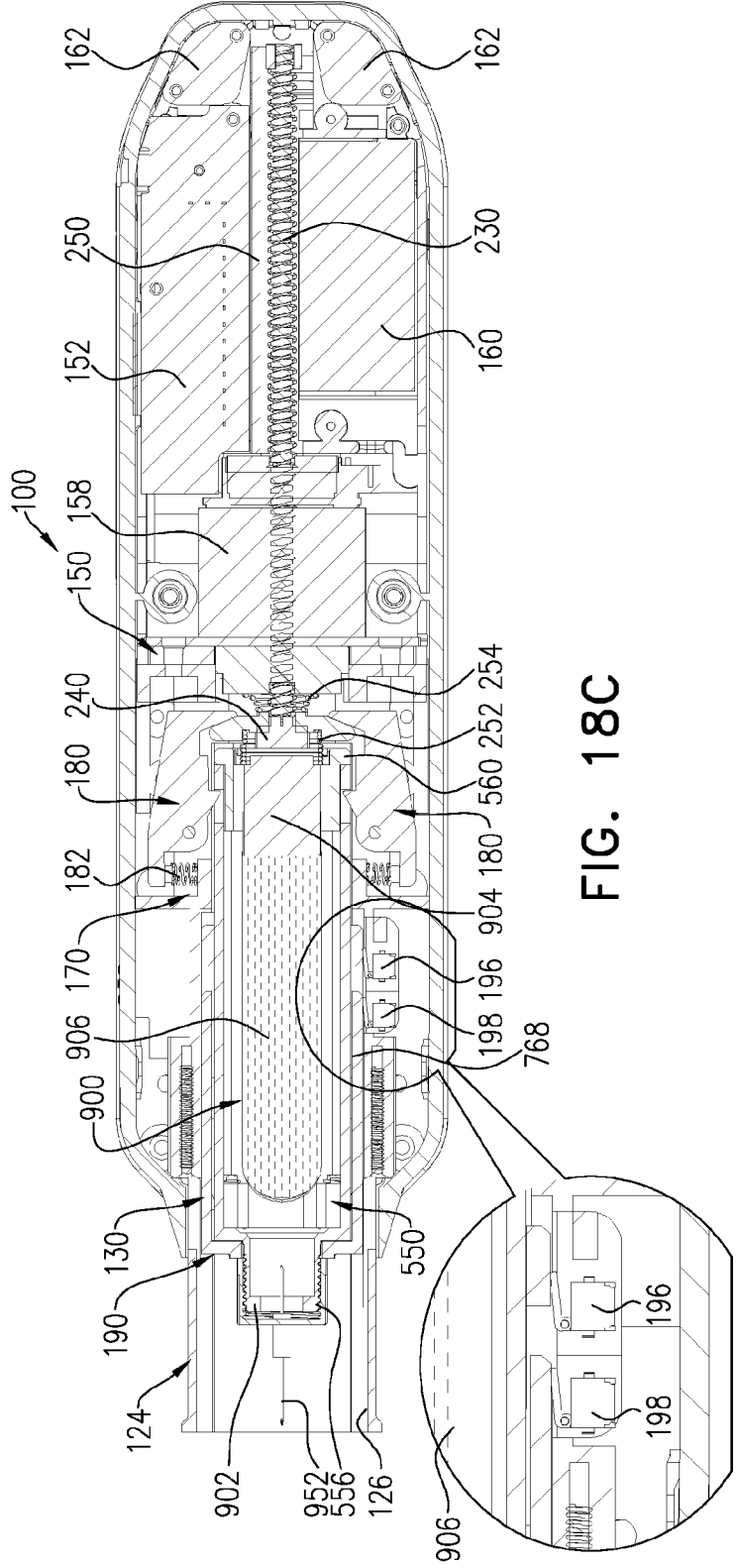
FIG. 18B
FIG. 18C

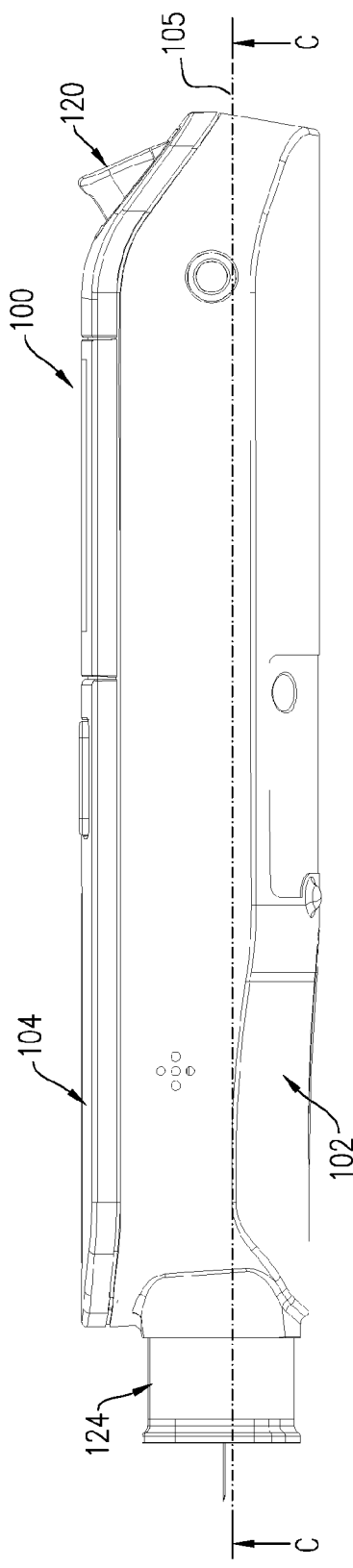
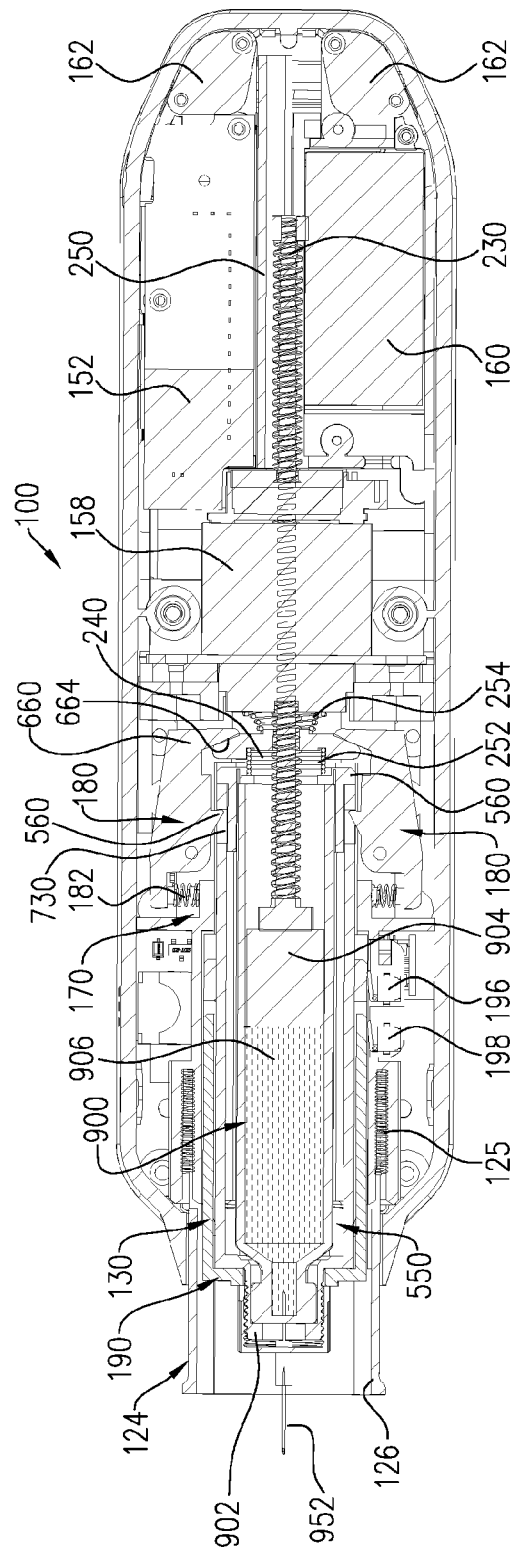
FIG. 20B
FIG. 20C

MULTIPLE USE COMPUTERIZED INJECTOR

REFERENCE TO RELATED APPLICATIONS

This application is a National Stage of International Application No. PCT/IL2021/050182 filed Feb. 16, 2021, claiming the benefit of U.S. Provisional Patent Application No. 62/977,746 filed Feb. 18, 2020, the contents of these applications are incorporated herein by reference.

Reference is hereby made to U.S. patent application Ser. No. 14/423,834, filed Sep. 3, 2013, which has published as US20150202367 and entitled "ELECTRONIC AUTO-INJECTION DEVICE", the disclosure of which is incorporated by reference in its entirety.

Reference is hereby additionally made to U.S. Provisional Patent Application 62/345,897, filed Jun. 6, 2016 and entitled "Electronic auto-injection device for drugs in cartridges", the disclosure of which is incorporated by reference in its entirety.

Reference is hereby made to a PCT Patent Application PCT/IL2017/050607, filed Jun. 1, 2017, which has published as WO2017212473 and entitled "Multiple use computerized injector", the disclosure of which is incorporated by reference in its entirety.

Reference is hereby additionally made to U.S. Provisional Patent Application 62/977,746, filed Feb. 18, 2020 and entitled "Multiple use computerized injector", the disclosures of which are incorporated by reference in their entirety and priority of which is hereby claimed pursuant to 37 CFR 1.78(a) (4) and (5)(*i*).

FIELD OF THE INVENTION

The present invention generally relates to a computerized injector, and more specifically to a multiple-use computerized injector, adapted for administration of medication to a patient.

BACKGROUND OF THE INVENTION

Many computerized injectors adapted for administration of medication to a patient are known.

SUMMARY OF THE INVENTION

The present invention seeks to provide an improved computerized injector.

There is thus provided in accordance with an embodiment of the present invention a computer-controlled injector, comprising a housing arranged along a longitudinal axis and configured to receive a cassette assembly, containing a medicament cartridge; the housing includes a cassette assembly receiving volume and a cassette assembly insertion and removal opening communicating with the cassette assembly receiving volume; at least one locking element for locking the cassette assembly with respect to the housing upon axial insertion of the cassette assembly into the housing; and an injection drive mechanism including a computer-controlled motor for driving a piston, forming part of the medicament cartridge, for injecting a medicament, the computer-controlled motor also being operative for operating the at least one locking element for releasing the cassette assembly from the housing.

Preferably, the at least one locking element includes two mutually pivotable locking elements, selectively couplable with the cassette assembly for locking thereof with respect to the housing. Further preferably, the two mutually pivotable locking elements being biased radially inwardly to assume a locked orientation. Still further preferably, the cassette assembly includes a cassette and a needle presence responsive element slidably attached with respect thereto. Yet further preferably, the cassette assembly is axially received into the housing along the longitudinal axis.

In accordance with an embodiment of the present invention, the injection drive mechanism also comprises a plunger rod to displace the piston for injecting a medicament. Preferably, the computer-controlled injector also comprises an at least one lock release element, associated with the plunger rod and wherein rearward displacement of the plunger rod urges rearward displacement of the lock release element and thereby causing release of the cassette assembly from the housing.

Further preferably, the cassette assembly is released from the housing upon radial outward pivotable displacement of the at least one locking element against a biasing force.

Still further preferably, the lock release element is configured to operatively couple the plunger rod to the at least one locking element, such that rearward displacement of the plunger rod causes pivoting of the at least one locking element radially outwardly, thereby releasing the cassette assembly from the housing. Yet further preferably, the at least one locking element is engaged with the lock release element and the lock release element is coupled to the plunger rod and is displaceable axially longitudinally together therewith.

In accordance with an embodiment of the present invention, the computer-controlled injector also comprises a spring disposed between the lock release element and the cassette assembly, the spring is compressed upon locking of the cassette assembly to the housing and released and adapted to bias the cassette assembly to extend forwardly out of the housing upon unlocking of the cassette assembly, which is permitted upon sufficient rearward displacement of the plunger rod along with the lock release element.

Preferably, rearward displacement of the plunger rod is actuated by an appropriate command provided to the computer-controlled motor by a user. Further preferably, the computer-controlled injector also comprises a switch which is actuated by a switch engaging protrusion of the cassette assembly, to indicate to a controller that the cassette assembly is inserted into the housing. Still further preferably, the computer-controlled injector also comprises a needle shielding element slidably coupled to the housing and configured to conceal a needle therewithin, upon attachment of the needle to the cassette assembly.

In accordance with an embodiment of the present invention, the computer-controlled injector also comprises a switch which is actuated by the needle presence responsive element of the cassette assembly, to indicate to a controller that a needle is attached to the cassette assembly.

Preferably, the computer-controlled injector also comprises a switch, sensing axial orientation of the needle shielding element relative to the housing, thus indicating injection site engagement. Further preferably, the cassette assembly comprises: a cassette having a proximal end and a distal end and an externally threaded protrusion, which extends from the forward end of the cassette for mounting of a needle assembly thereto; and a needle presence responsive element slidably arranged with respect to the cassette and being biased to a forward extended position with respect to the cassette under the force of at least one biasing element before needle assembly attachment to the externally threaded protrusion.

In accordance with an embodiment of the present invention, a computer-controlled injector comprising a housing arranged along a longitudinal axis and configured to receive a cassette assembly, containing a medicament cartridge; the housing includes a cassette assembly receiving volume and a cassette assembly insertion and removal opening communicating with the cassette assembly receiving volume; at least one locking element for locking the cassette assembly with respect to the housing upon axial insertion of the cassette assembly into the housing; at least one lock release element; and an injection drive mechanism including a computer-controlled motor for driving a plunger rod to displace a piston, forming part of the medicament cartridge, for injecting a medicament, and wherein rearward displacement of the plunger rod urges rearward displacement of the lock release element and thereby is operative to release the cassette assembly from the housing.

Preferably, the lock release element is configured to operatively couple the plunger rod to the at least one locking elements, such that pivoting of the locking elements is operative to release the cassette assembly from the housing. Further preferably, the computer-controlled motor also being operative for operating the at least one locking element for releasing the cassette assembly from the housing. Still further preferably, the at least one locking element includes two mutually pivotable locking elements, selectively couplable with the cassette assembly for locking thereof with respect to the housing. Yet further preferably, the two mutually pivotable locking elements being biased radially inwardly to assume a locked orientation.

In accordance with an embodiment of the present invention, the cassette assembly includes a cassette and a needle presence responsive element slidably attached with respect thereto. Preferably, the cassette assembly is axially received into the housing along the longitudinal axis. Further preferably, the cassette assembly is released from the housing upon radial outward pivotable displacement of the at least one locking element against a biasing force.

Still further preferably, the lock release element is configured to operatively couple the plunger rod to the at least one locking element, such that rearward displacement of the plunger rod causes pivoting of the at least one locking element radially outwardly, thereby releasing the cassette assembly from the housing. Yet further preferably, the at least one locking element is engaged with the lock release element and the lock release element is coupled to the plunger rod and is displaceable axially longitudinally together therewith.

In accordance with an embodiment of the present invention, the computer-controlled injector also comprises a spring disposed between the lock release element and the cassette assembly, the spring is compressed upon locking of the cassette assembly to the housing and released and adapted to bias the cassette assembly to extend forwardly out of the housing upon unlocking of the cassette assembly, which is permitted upon sufficient rearward displacement of the plunger rod along with the lock release element.

Preferably, rearward displacement of the plunger rod is actuated by an appropriate command provided to the computer-controlled motor by a user. Further preferably, the computer-controlled injector also comprises a switch which is actuated by a switch engaging protrusion of the cassette assembly, to indicate to a controller that the cassette assembly is inserted into the housing. Still further preferably, the computer-controlled injector also comprises a needle shielding element slidably coupled to the housing and configured to conceal a needle therewithin, upon attachment of the needle to the cassette assembly. Yet further preferably, the computer-controlled injector also comprises a switch which is actuated by the needle presence responsive element of the cassette assembly, to indicate to a controller that a needle is attached to the cassette assembly.

In accordance with an embodiment of the present invention, the computer-controlled injector also comprises a switch, sensing axial orientation of the needle shielding element relative to the housing, thus indicating injection site engagement.

Preferably, the cassette assembly comprises a cassette having a proximal end and a distal end and an externally threaded protrusion, which extends from the forward end of the cassette for mounting of a needle assembly thereto; and a needle presence responsive element slidably arranged with respect to the cassette and being biased to a forward extended position with respect to the cassette under the force of at least one biasing element before needle assembly attachment to the externally threaded protrusion.

In accordance with an embodiment of the present invention, a cassette assembly for use with a computer-controlled injector, comprising a cassette having a proximal end and a distal end and an externally threaded protrusion extends from the forward end of the cassette for mounting of a needle assembly thereto; a needle presence responsive element slidably arranged with respect to the cassette and being biased to a forward extended position with respect to the cassette under the force of at least one biasing element before attachment of the needle assembly to the externally threaded protrusion.

Preferably, the cassette assembly is axially received into a housing of the computer-controlled injector along a longitudinal axis. Further preferably, the computer-controlled injector comprises a switch which is actuated by the needle presence responsive element of the cassette assembly, to indicate to a controller that the needle assembly is attached to the cassette assembly. Still further preferably, the computer-controlled injector comprises a housing arranged along a longitudinal axis and configured to receive the cassette assembly, containing a medicament cartridge; the housing includes a cassette assembly receiving volume and a cassette assembly insertion and removal opening communicating with the cassette assembly receiving volume; at least one locking element for locking the cassette assembly with respect to the housing upon axial insertion of the cassette assembly into the housing; and an injection drive mechanism including a computer-controlled motor for driving a piston, forming part of the medicament cartridge, for injecting a medicament, the computer-controlled motor also being operative for operating the at least one locking element for releasing the cassette assembly from the housing.

Still further preferably, the at least one locking element includes two mutually pivotable locking elements, selectively couplable with the cassette assembly for locking thereof with respect to the housing. Yet further preferably, the two mutually pivotable locking elements being biased radially inwardly to assume a locked orientation.

In accordance with an embodiment of the present invention, the injection drive mechanism also comprises a plunger rod to displace the piston for injecting a medicament. Preferably, the computer-controlled injector also comprises at least one lock release element, associated with the plunger rod and wherein rearward displacement of the plunger rod urges rearward displacement of the lock release element and thereby causing release of the cassette assembly from the housing.

Further preferably, the cassette assembly is released from the housing upon radial outward pivotable displacement of the at least one locking element against a biasing force. Still further preferably, the lock release element is configured to operatively couple the plunger rod to the at least one locking element, such that rearward displacement of the plunger rod causes pivoting of the at least one locking element radially outwardly, thereby releasing the cassette assembly from the housing. Yet further preferably, the at least one locking element is engaged with the lock release element and the lock release element is coupled to the plunger rod and is displaceable axially longitudinally together therewith.

In accordance with an embodiment of the present invention, the computer-controlled injector also comprises a spring disposed between the lock release element and the cassette assembly, the spring is compressed upon locking of the cassette assembly to the housing and released and adapted to bias the cassette assembly to extend forwardly out of the housing upon unlocking of the cassette assembly, which is permitted upon sufficient rearward displacement of the plunger rod along with the lock release element.

Preferably, rearward displacement of the plunger rod is actuated by an appropriate command provided to the computer-controlled motor by a user. Further preferably, the computer-controlled injector also comprises a switch which is actuated by a switch engaging protrusion of the cassette assembly, to indicate to a controller that the cassette assembly is inserted into the housing. Still further preferably, the computer-controlled injector also comprises a needle shielding element slidably coupled to the housing and configured to conceal a needle therewithin, upon attachment of the needle to the cassette assembly. Yet further preferably, the computer-controlled injector also comprises a switch, sensing axial orientation of the needle shielding element relative to the housing, thus indicating injection site engagement.

BRIEF DESCRIPTION OF THE DRAWINGS

The present invention will be understood and appreciated more fully from the following detailed description, taken in conjunction with the drawings in which:

FIGS. 2A, 2B, 2C, 2D, 2E and 2F are simplified respective pictorial, side planar view, top planar view, bottom planar view, front planar view and hack planar view illustrations of a main housing portion of the MUCI of FIGS. 1A & 1B;

FIGS. 3A, 3B, 3C, 3D, 3E, 3F, 3G and 3H are simplified respective two pictorials views taken from different perspectives, top planar view, bottom planar view, front planar view and back planar view, first and second side view illustrations of a top housing portion of the MUCI of FIGS. 1A & 1B;

FIGS. 4A, 4B, 4C, 4D, 4E and 4F are simplified respective top and bottom pictorial, first and second side planar view, top planar view and bottom planar view illustrations of a chassis element forming part of the MUCI of FIGS. 1A & 1B;

FIGS. 8A-8D are simplified respective first and second pictorial illustrations shown from two different directions and two planar side views of a spring seat element forming part of the cassette enclosure sub-assembly of FIG. 5;

FIGS. 9A-9G are simplified respective first, second and third pictorial illustrations shown from three different directions, three planar side views and a sectional view illustration of a cassette forming part of the cassette enclosure sub-assembly of FIG. 5, the sectional view being taken along the lines G-G in FIG. 9F;

FIGS. 11A and 11B are simplified respective planar side view and sectional view illustration of the assembled cassette enclosure sub-assembly of FIG. 5, shown with the cassette disposed in a locked operative orientation with respect to the MUCI of FIGS. 1A & 1B, the sectional view being taken along the lines B-B in FIG. 11A;

FIGS. 13A and 13B are simplified respective planar side view and sectional illustration of the assembled cassette enclosure sub-assembly of FIG. 5, shown with the cassette disposed in the unlocked operative orientation with respect to the MUCI of FIGS. 1A & 1B, the sectional view being taken along the lines B-B in FIG. 13A;

FIGS. 15B and 15C are simplified respective planar side view and sectional illustration taken generally along lines C-C in FIG. 15B of the MUCI in the first operative orientation;

FIGS. 16B and 16C are simplified respective planar side view and sectional illustration taken generally along lines C-C in FIG. 16B of the MUCI in the second operative orientation;

FIGS. 18B and 18C are simplified respective planar side view and sectional illustration taken generally along lines C-C in FIG. 18B of the MUCI in the fourth operative orientation;

FIGS. 20B and 20C are simplified respective planar side view and sectional illustration taken generally along lines C-C in FIG. 20B of the MUCI in the sixth operative orientation.

DETAILED DESCRIPTION OF EMBODIMENTS OF THE INVENTION

Figure 1A:
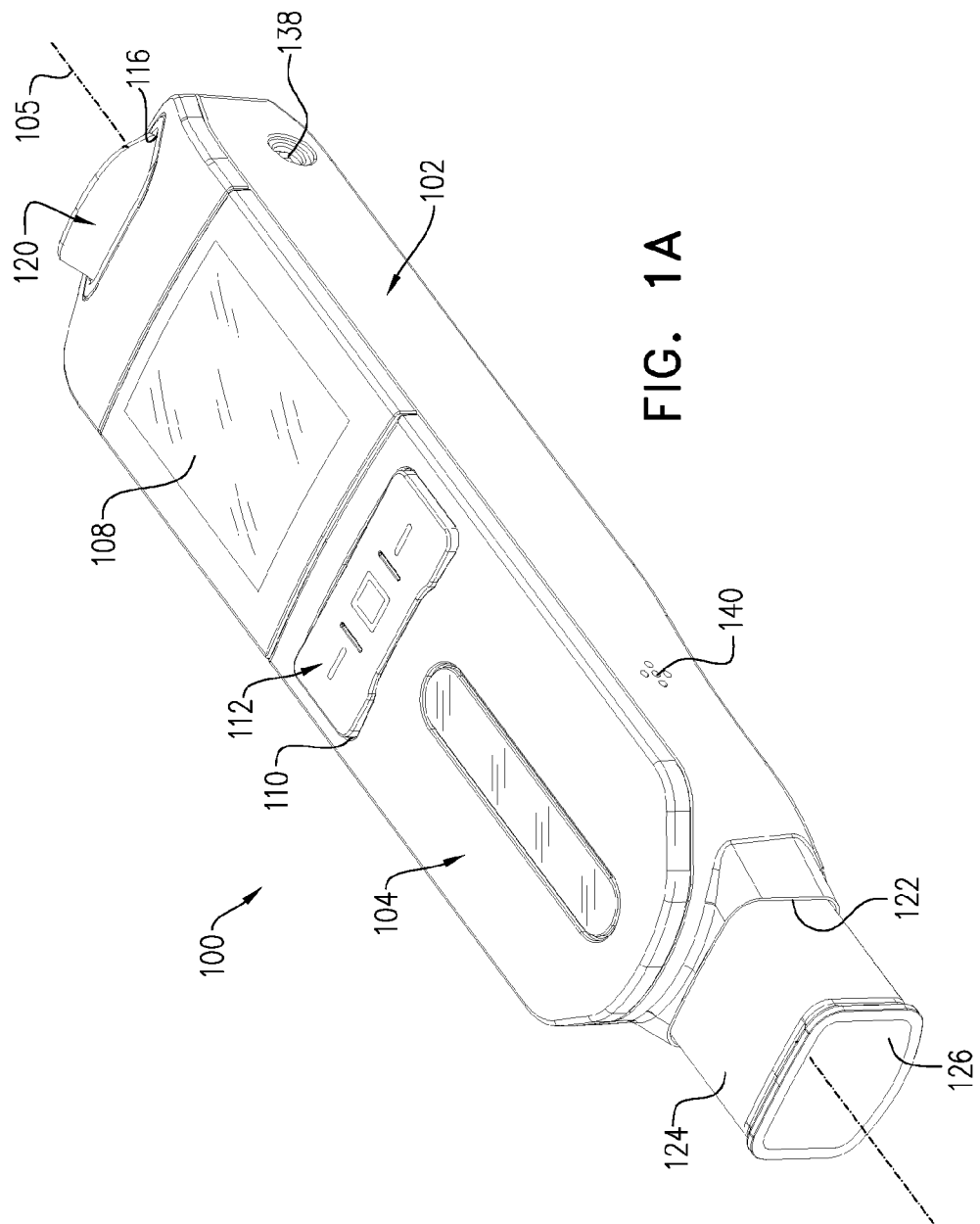
FIG. 1A is a simplified pictorial illustration of a multiple use computerized injector (MUCI) constructed and operative in accordance with an embodiment of the present invention.
Figure 1B:
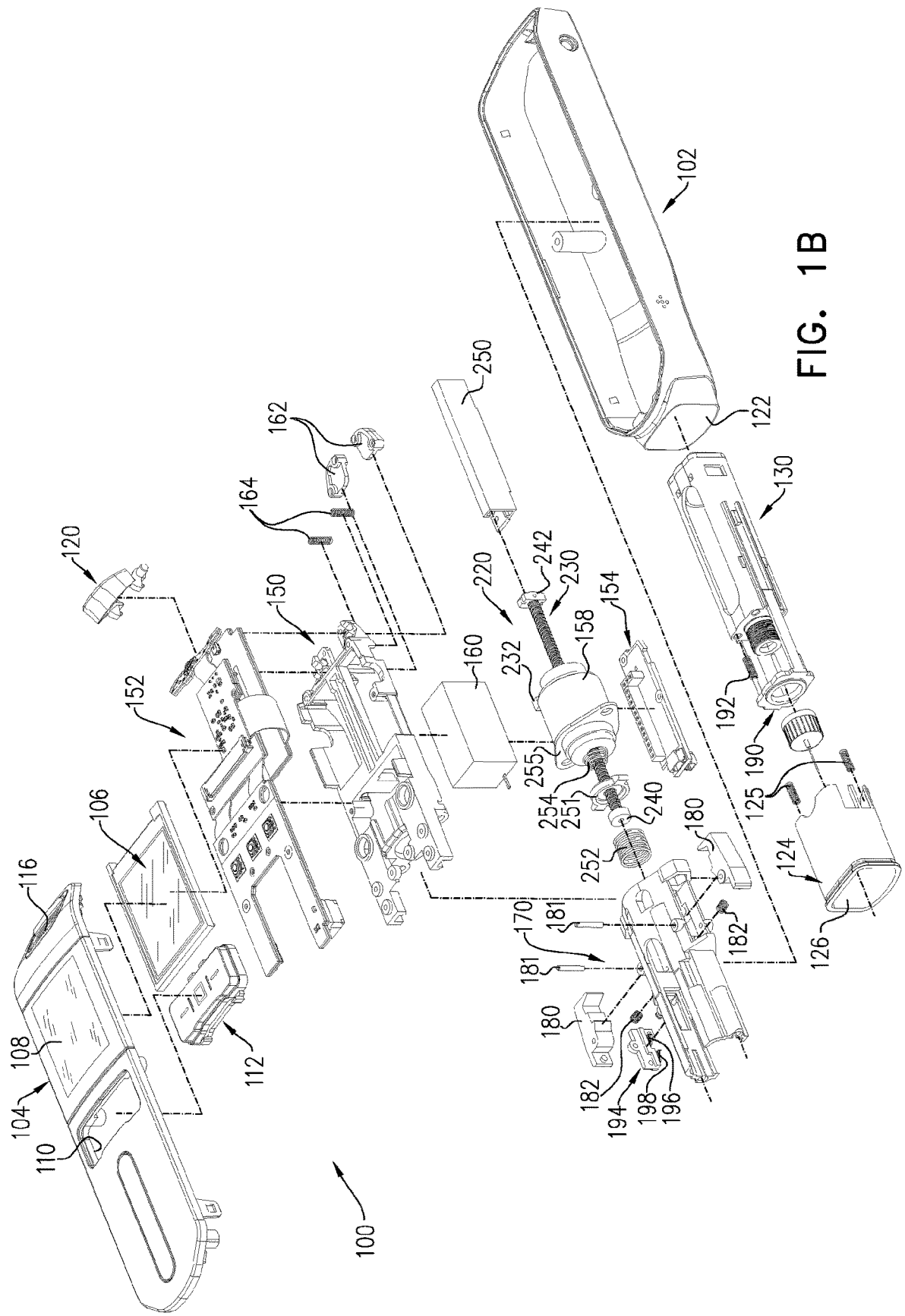
FIG. 1B is a simplified exploded view illustration of the multiple use computerized injector of FIG. 1A.
Figure 2E:
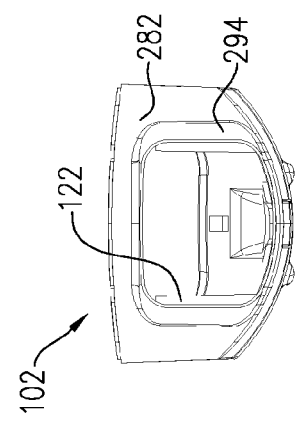
Figure 2F:
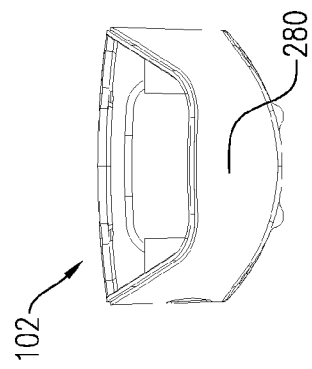
Figure 2D:
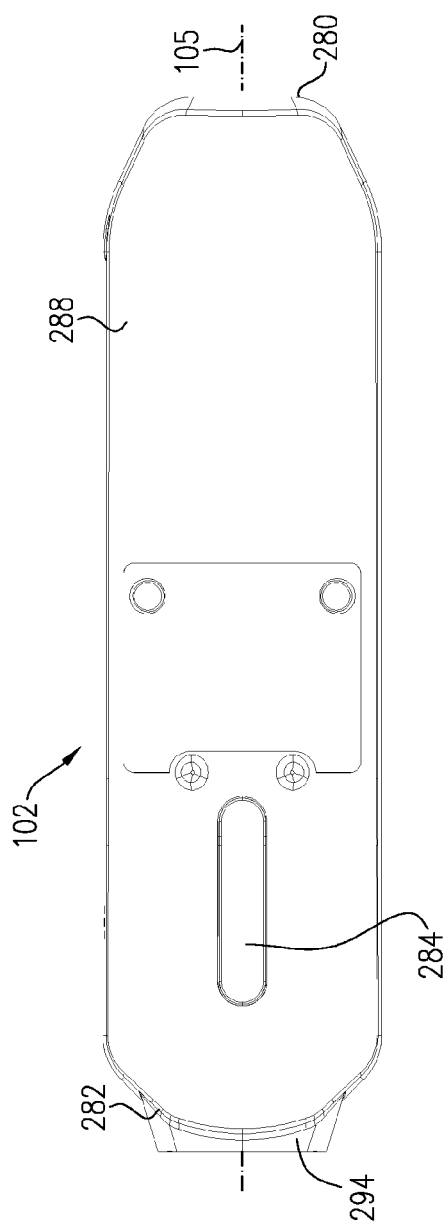

Reference is now made to FIG. 1A, which is a simplified pictorial illustration of a multiple use computerized injector (MUCI) constructed and operative in accordance with an embodiment of the present invention and to FIG. 1B, which is a simplified exploded view illustration of the multiple use computerized injector of FIG. 1A.

A multiple use computerized injector (MUCI) 100 for cassette insertion is seen in FIGS. 1A & 1B. It is seen in FIG. 1A that the MUCI 100 includes a main housing portion 102, fixedly coupled to a top housing portion 104, both arranged along a mutual longitudinal axis 105. A display 106 is preferably disposed within the MUM 100 and is preferably covered by a transparent window 108 formed in the top housing portion 104. The top housing portion 104 preferably has an opening 110 disposed adjacent to window 108 and configured to receive a button defining element 112 therewithin. Such button defining element 112 is preferably shown and described in detail in FIGS. 4A-4E of PCT Patent Application PCT/IL2017/050607.

An opening 116 is formed at the rearward end of top housing element 104 and is configured to receive an injection button element 120 thereinto. Such injection button element 120 is preferably shown and described in detail in FIGS. 5A-5D of PCT Patent Application PCT/IL2017/050607. An opening 122 is formed at the forward end of the main housing portion 102. A generally hollow needle shielding element 124 is at least partially inserted through opening 122 and defines a through bore 126. The needle shielding element 124 is biased to its forwardly extended position by means of biasing springs 125.

It is noted that the MUCI 100 is configured to axially receive a cassette assembly 130, which is adapted to contain a cartridge with a medicament therein. The cassette assembly 130 is inserted axially through bore 126 of the needle shielding element 124 and through opening 122 of the main housing portion 102 into the enclosure formed between the main housing portion 102 and the top housing portion 104. The cassette assembly 130 is configured to be selectably slidably axially displaceable along longitudinal axis 105 relative to the main and top housing portions 102 and 104.

It is noted that a cover may be optionally mounted over the needle shielding element 124.

It is seen in FIG. 1A that a charger inlet 138 and a speaker outlet 140 are formed in main housing portion 102.

It is particularly seen in FIG. 1B that a chassis element 150 is configured to reside between top housing portion 104 and main housing portion 102. The top housing portion 104 and the main housing portion 102 are adapted to be fixedly coupled to each other.

The chassis element 150 is configured to support the internal components of the MUCI 100. A main PCB assembly 152, (shown and described in detail in FIGS. 17A-17D of PCT Patent Application PCT/IL2017/050607), is seated onto the chassis element 150, and is configured to be operatively coupled with a power control PCB assembly 154 (shown and described in detail in FIGS. 18A-18C of PCT Patent Application PCT/IL2017/050607) and with an electrical motor 158, powered by a battery 160.

Figure 6A:
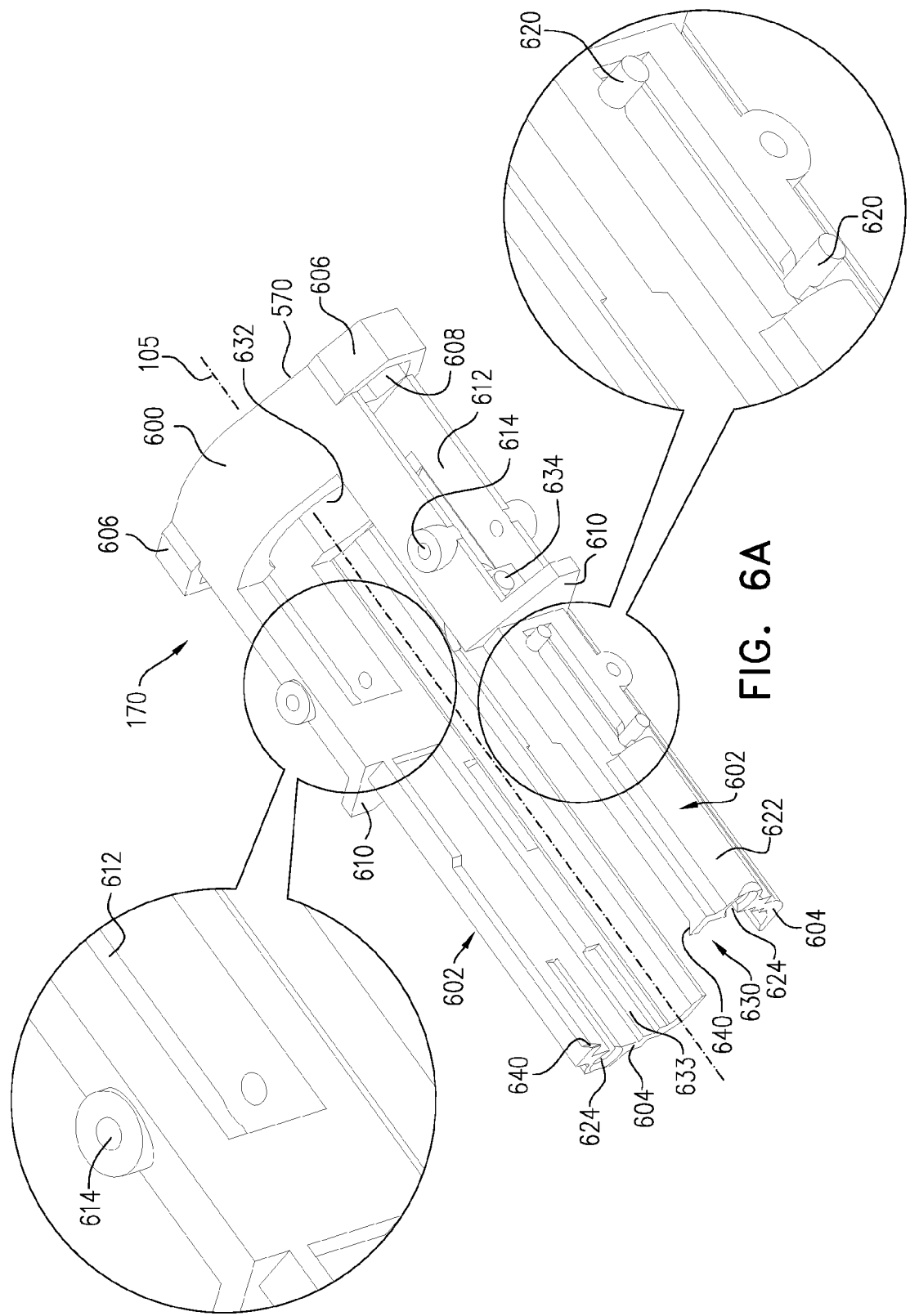
FIGS. 6A-6F are simplified respective first and second pictorial illustrations shown from two different directions, two planar side views, top planar view and bottom planar view of a cassette guiding and locking element forming part of the cassette enclosure sub-assembly of FIG. 5.
Figure 6B:
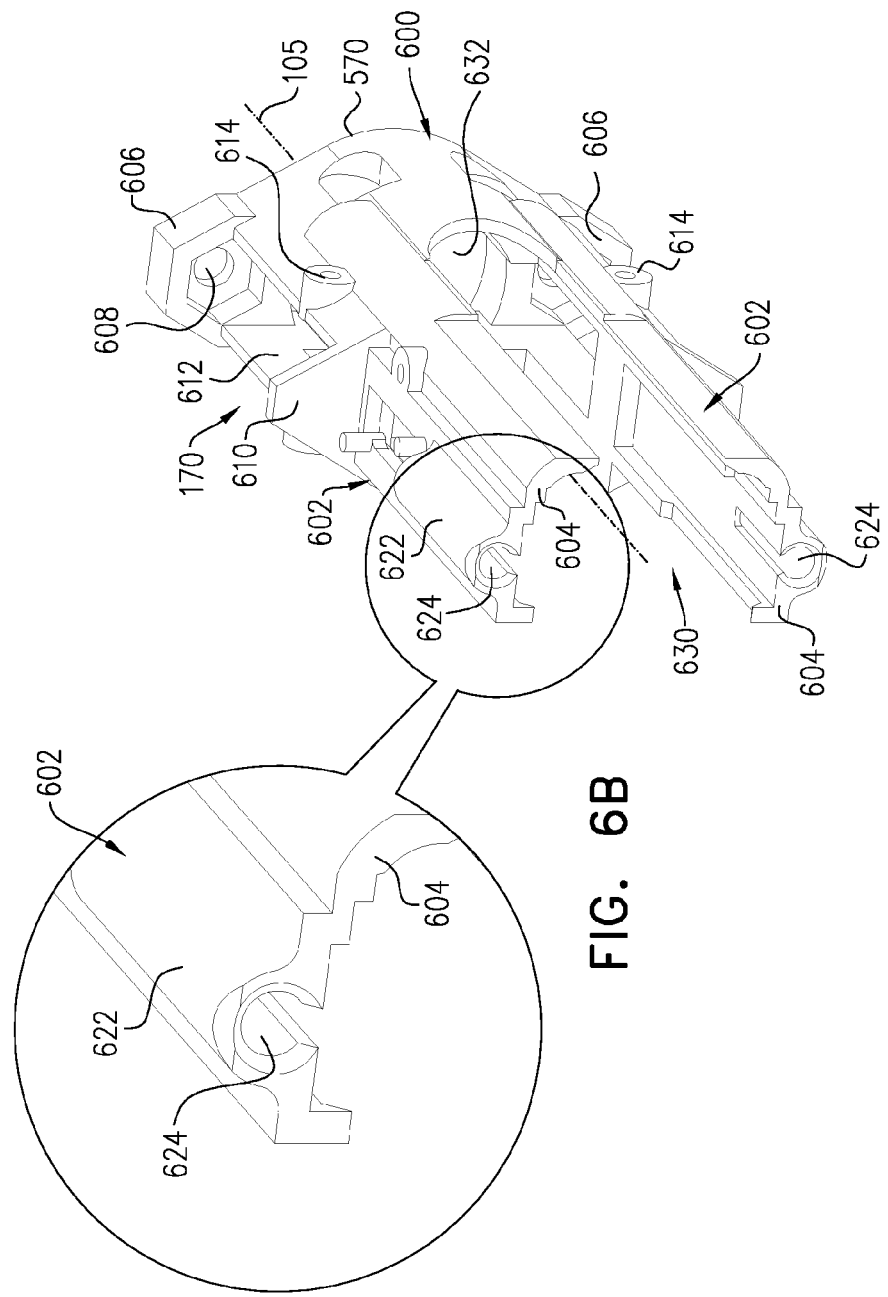
Figure 6C:
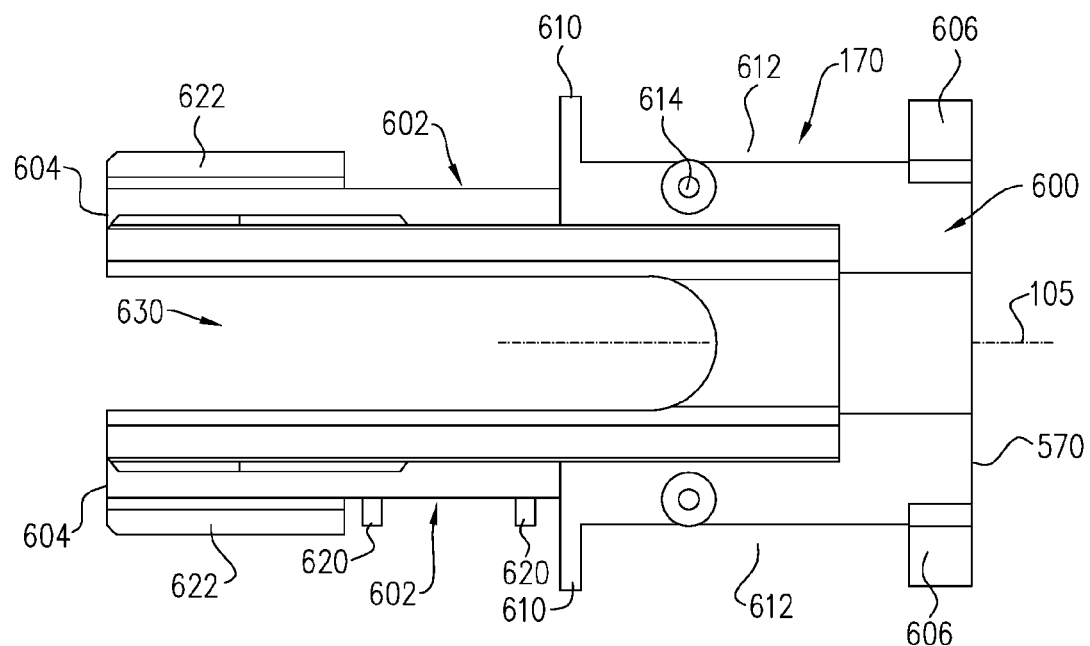
Figure 6D:
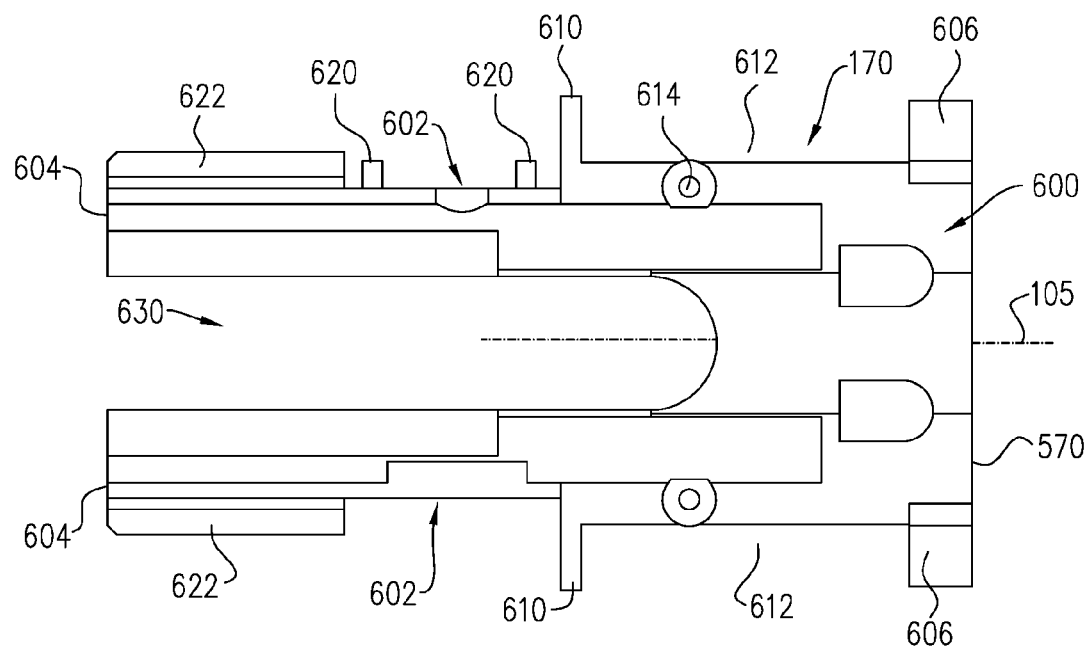
Figure 6E:
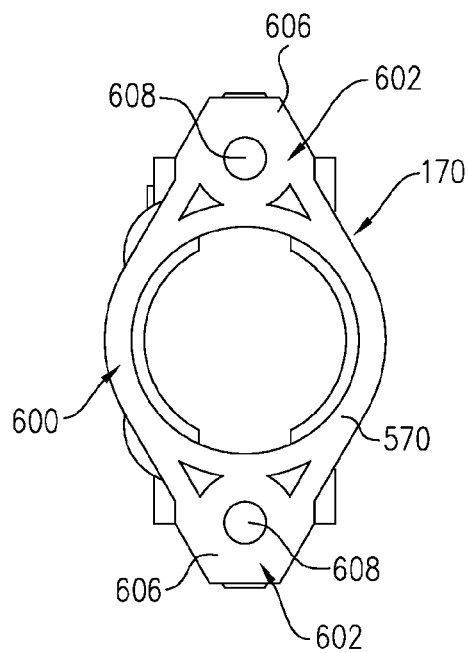
Figure 6F:
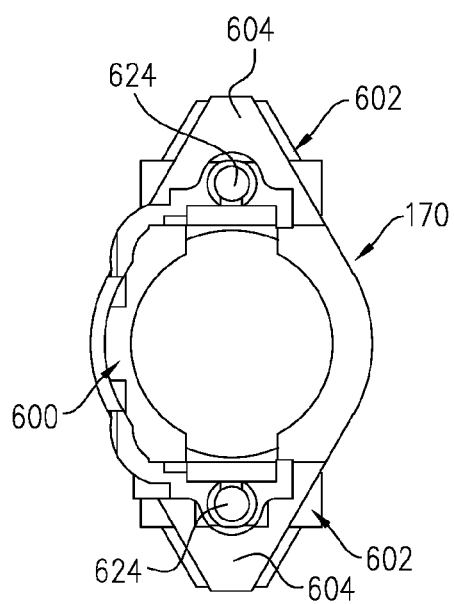
Figure 7A:
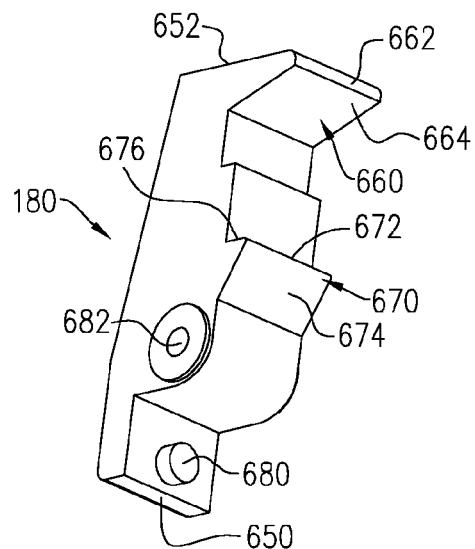
FIGS. 7A-7D are simplified respective first and second pictorial illustrations shown from two different directions and two planar side views of a locking element forming part of the cassette enclosure sub-assembly of FIG. 5.
Figure 7B:
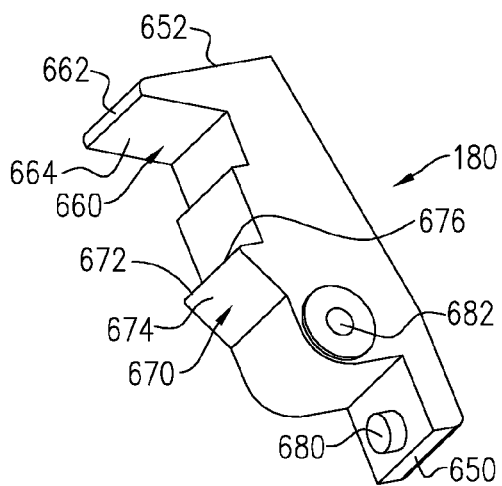
Figure 7C:
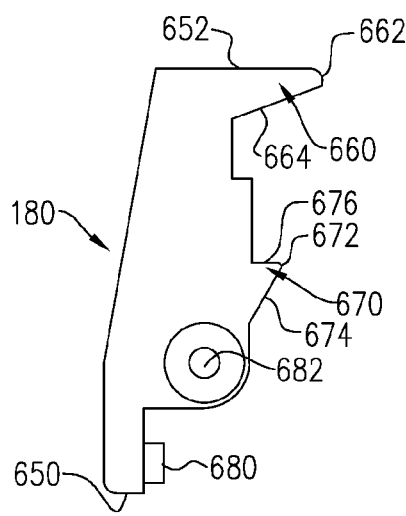
Figure 7D:
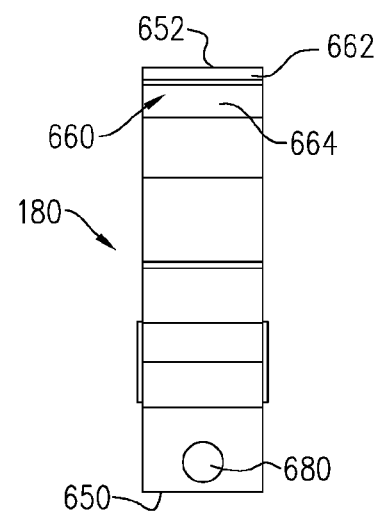

It is also seen in FIG. 1B that typically two generally identical spring support elements 162 (shown and described in detail in FIGS. 6A-6C of PCT Patent Application PCT/IL2017/050607) are seated onto the underside of the chassis element 150 and two compression springs 164 are supported between each of the spring support elements 162 and the injection button element 120. The injection button element 120 is configured to be pressed by the user against the force of the springs 164, and when the injection button element 120 is released, the button resumes its at rest operative orientation under the biasing force of springs 164.

It is seen in FIG. 1B that a cassette guiding and locking element 170 is adapted to be enclosed between the main housing portion 102 and the top housing portion and is configured to be fixedly coupled to the chassis element 150.

It is a particular feature of an embodiment of the present invention that upon axial insertion of the cassette assembly 130 into the enclosure formed by the main and top housing portions 102 and 104, the guiding and locking element 170 is configured to selectably lock the cassette assembly 130 in place by means of locking elements 180.

In accordance with an embodiment of the present invention, there are typically two generally identical locking elements 180, each of which is configured to be pivotable with respect to the cassette guiding and locking element 170 about axle 181 and configured to be biased to its locked orientation under the biasing force of springs 182.

A needle presence responsive element 190 is adapted to be coupled to the cassette assembly 130 and is configured to be axially displaceable along longitudinal axis 105 with respect thereto. The needle presence responsive element 190 is biased to a forward position by means of the biasing force of compression springs 192.

A PCB assembly 194 preferably has at least two switches 196 and 198 formed thereon and is operatively coupled to the cassette guiding and locking element 170. Switch 196 is configured to sense the axial orientation of the cassette assembly 130 with respect to the guiding and locking element 170. Switch 198 of the PCB assembly 194 is configured to sense the axial orientation of the needle presence responsive element 190 with respect to the cassette assembly 130. The PCB assembly 194 is adapted to be operatively coupled to the main PCB assembly 152. Optionally, there is also a switch responsible for sensing the axial orientation of the needle shielding element 124 with respect to main housing element 102.

It is noted that the switches may be mechanical, electromechanical, optical or any other type of commercially available switches.

A piston drive subassembly 220 is provided as part of the MUCI 100. It is noted that the piston and drive subassembly 220 functions in a similar manner to the piston drive subassembly 220 shown and described in detail in FIGS. 19A-19C of PCT Patent Application PCT/IL2017/050607, except the differences resulting from a different chassis element 150, which is described in detail hereinbelow with reference to FIGS. 4A-4F.

When the cassette assembly 130 is inserted into the MUM 100, the piston drive assembly 220 is configured for axially displacing a piston within the medicament cartridge in order to eject fluid therefrom.

The piston drive subassembly 220 preferably includes the electrical motor 158, such as a step motor or a DC motor, for example, which is mounted onto a plunger rod element 230 through a threaded nut. Electrical contacts 232 of the electrical motor 158 are adapted to be operatively coupled to power control PCB assembly 154, and following receipt of a suitable signal from the CPU of MUCI 100, the electrical motor 158 urges axial displacement of the plunger rod element 230 with respect to housing portions 102 and 104.

It is seen in FIG. 1B that a piston contact element 240 is mounted onto the forward end of plunger rod element 230 and an anti-rotation element 242 is mounted onto the distal end of plunger rod element 230. It is noted that the anti-rotation element 242 is configured to be axially displaced along a track element 250 (shown and described in detail in FIGS. 16A-16D of PCT Patent Application PCT/IL2017/050607).

A lock release element 251 is adapted to be mounted onto the forward end of the plunger rod element 230. A first spring 252 is disposed forwardly of the lock release element 251 and is adapted to bias the cassette assembly 130 forwardly longitudinally when the locking elements 180 are selectably disposed in their unlocked position. A second spring 254 is disposed rearwardly of the lock release element 251 and is supported against a flange 255 on the motor 158 in order to fixate the lock release element 251 and to provide further force to displace the cassette assembly 130 axially forwardly along axis 105 once the locking elements 180 are disposed in their unlocked position. The second spring 254 also provides forward biasing force to the lock release element 251, due to which the lock release element 251 abuts the piston contact element 240 once the locking elements 180 are disposed in their unlocked position.

It is a particular feature of an embodiment of the present invention that the lock release element 251 is configured to operatively couple the plunger rod element 230 to the locking elements 180, such that rearward displacement of the plunger rod element 230 causes pivoting of the two locking elements 180 radially outwardly in order to release the cassette assembly 130 from the cassette guiding and locking element 170. This operative coupling occurs due to the fact that the locking elements 180 are engaged with lock release element 251, while the lock release element is coupled to the plunger rod element 230 and is displaceable longitudinally together therewith.

It is noted that the piston drive subassembly 220 of the MUCI 100 in accordance with an embodiment of the present invention works preferably as described in a previously filed PCT Patent Application PCT/IL2017/050607, filed Jun. 1, 2017, which has published as WO2017212473 and entitled "Multiple use computerized injector".

Reference is now made to FIGS. 2A, 2B, 2C, 2D, 2E and 2F, which are simplified respective pictorial, side planar view, top planar view, bottom planar view, front planar view and back planar view illustrations of the main housing portion 102 of the MUCI 100 of FIGS. 1A & 1B.

It is seen in FIGS. 2A-2F that the main housing portion 102 is arranged along longitudinal axis 105 and has a generally closed rearward end 280 and a generally closed forward end 282. It is seen that a generally transparent window 284 is located adjacent forward end 282, configured for inspection of a medicament, when a medicament cartridge is inserted into the MUCI 100.

As previously mentioned, charger inlet 138 is formed in the main housing portion 102 and disposed adjacent the rearward end 280 and speaker outlet 140 is formed in the main housing portion 102 and disposed adjacent the forward end 282.

The main housing portion 102 preferably defines an inner surface 286 and an outer surface 288.

A plurality of snaps 290 are formed on the inner surface 286 of the main housing portion 102 for fixed connection with top housing portion 104. Additionally, two generally upstanding protrusions 292 are formed generally at an intermediate location of the inner surface 286 of the main housing portion 102 for connection to top housing portion 104. A forwardly extending hollow protrusion 294 is formed adjacent the forward end 282 of the main housing element 102, defining opening 122 therewithin and through the forward end 282. The opening 122 is adapted for axial insertion of cassette assembly 130 into the MUCI 100.

Reference is now made to FIGS. 3A, 3B, 3C, 3D, 3E, 3F, 3G and 3H, which are simplified respective two pictorials views taken from different perspectives, top planar view, bottom planar view, front planar view and back planar view, first and second side view illustrations of the top housing portion 104 of the MUCI 100 of FIGS. 1A & 1B.

It is seen in FIGS. 3A-3H that top housing portion 104 is arranged along longitudinal axis 105 and has a forward end 300 and a rearward end 302.

As mentioned above, opening 116 is formed in top housing portion 104 adjacent rearward end 302. Inspection window 132 is located rearwardly of forward end 300 and opening 110 is formed rearwardly of window 132.

Transparent window 108 is formed generally between opening 110 and opening 116.

Figure 3E:
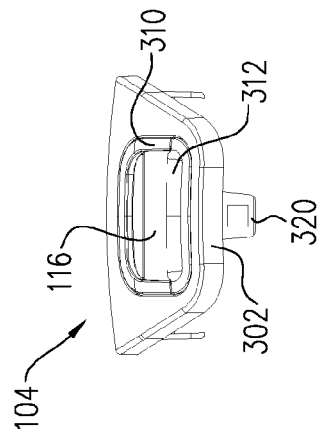
Figure 3F:
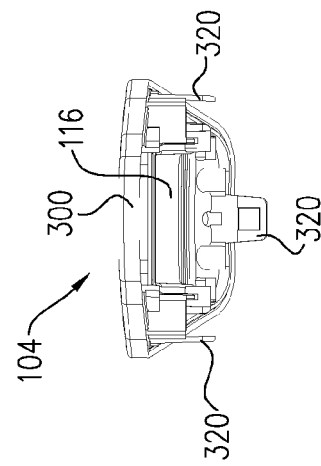
Figure 3D:
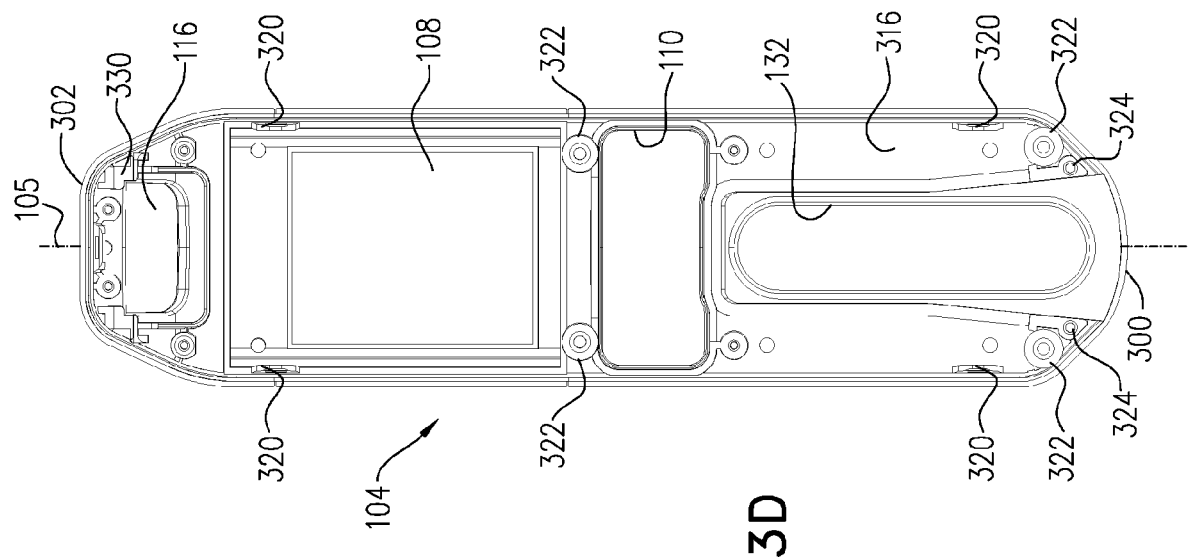

It is particularly seen in FIGS. 3C and 3E that a transparent frame 310 is formed around opening 116 enabling providing visual indication to the user, such as by LED's illuminating the injection button element 120, which is configured to be mounted through opening 116.

A flat shoulder 312 is formed on one side of the opening 116 configured to act as a stopper for the injection button element 120.

The top housing portion 104 defines an outer surface 314 and an inner surface 316.

It is seen in FIGS. 3A-3H that a plurality of snap portions 320 is formed on the inner surface 316 of the top housing portion 104 for secured connection with the snaps 290 on the main housing portion 102. There is a plurality of upstanding protrusions 322 formed on the inner surface 316 for secure connection with upstanding protrusions 292 of the main housing portion 102, top housing portion 104 and inner components of the MUCI 100. There are preferably two apertures 324 for insertion of protrusions 294 of the main housing portion 102 thereinto.

An injection button element hinge seating portion 330 is formed on the inner surface 316 adjacent the rearward end 302 of top housing portion 104.

Reference is now made to FIGS. 4A, 4B, 4C, 4D and 4E, which are simplified respective top and bottom pictorial, side planar view, top planar view and bottom planar view illustrations of button defining element 112 forming part of the MUCI 100 of FIGS. 1A & 1B.

Reference is now made to FIGS. 4A, 4B, 4C, 4D, 4E and 4F, which are simplified respective top and bottom pictorial, first and second side planar view, top planar view and bottom planar view illustrations of chassis element 150 forming part of the MUCI 100 of FIGS. 1A & 1B.

Chassis element 150 is configured to be positioned between main housing portion 102 and top housing portion 104 and is used for carrying the piston drive subassembly 220 and to support the cassette guiding and locking element 170, as well as to support the main PCB assembly 152.

Chassis element 150 is generally arranged along longitudinal axis 105 and has an upper side 430 and an underside surface 432. Several generally upstanding protrusions 434 are formed on the upper side 430 and serve to support and align the display 106.

Figure 4A:
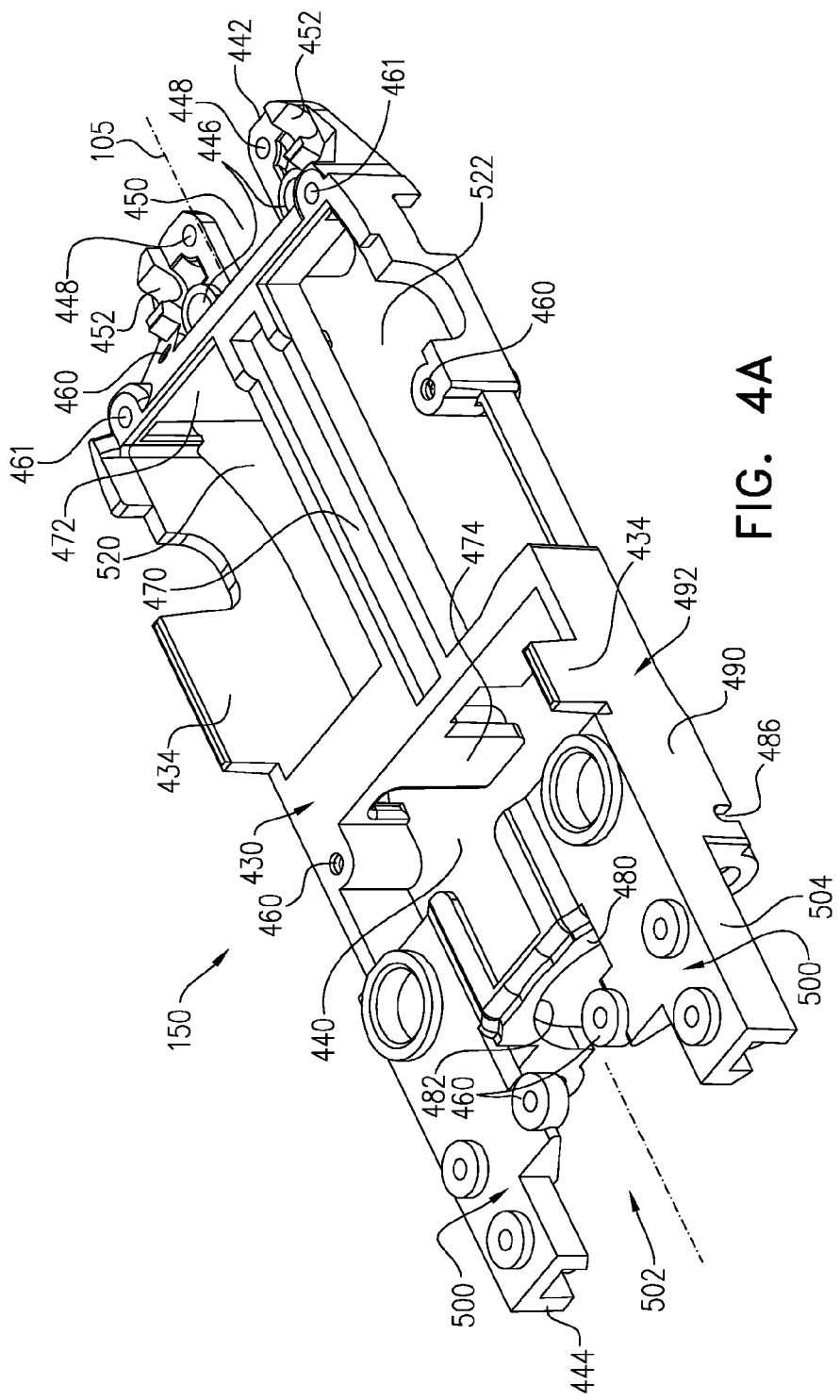
Figure 4B:
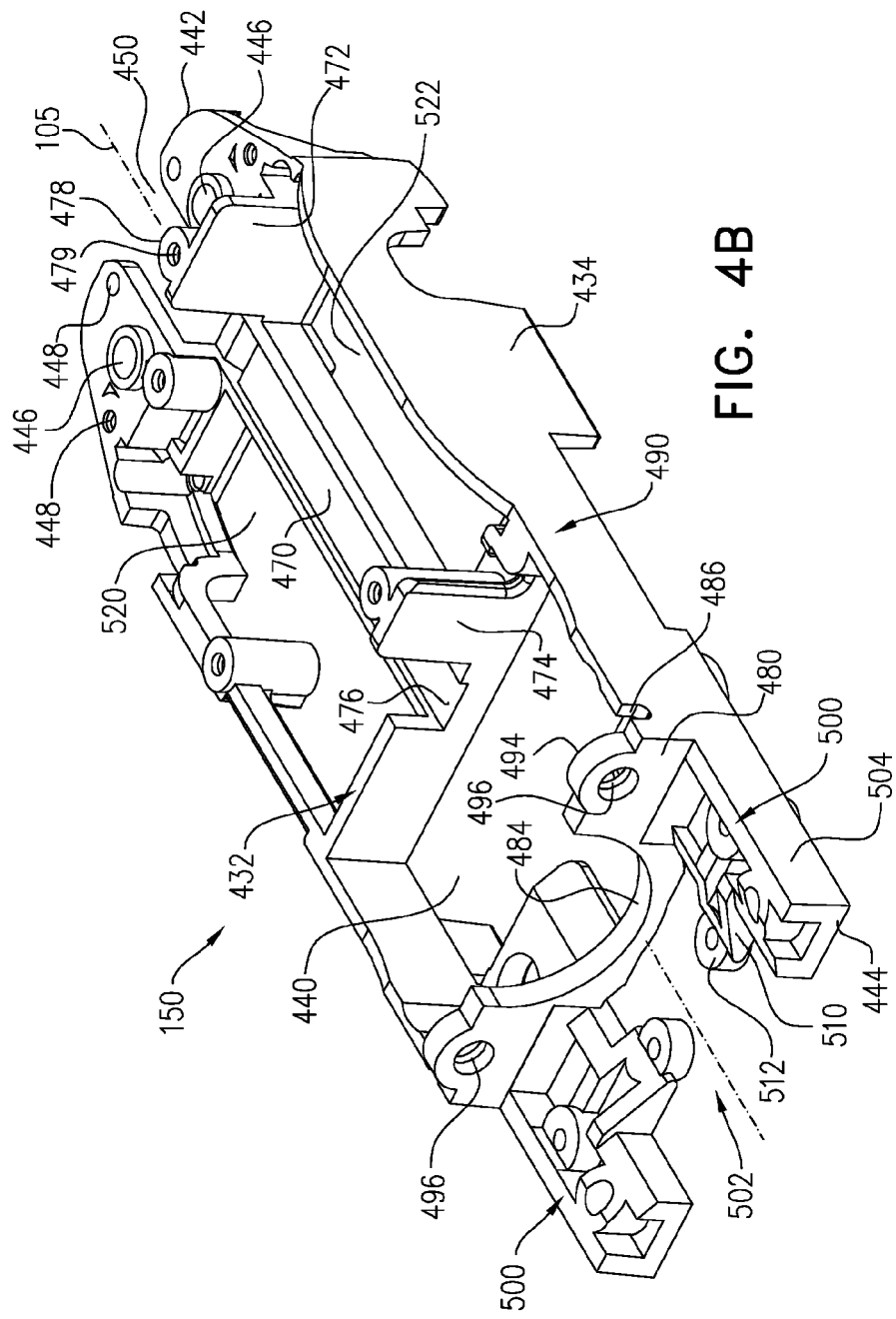

It is particularly seen in FIGS. 4A & 4B that an opening 440 for mounting the electrical motor 158 is formed in an intermediate location of chassis element 150. The electrical motor 158 is configured to be mounted onto rounded surface 484 located on the underside surface 432 of the chassis element 150.

Chassis element 150 also defines a rearward end 442 and a forward end 444.

It is also seen in FIGS. 4A, 4B, 4E and 4F that preferably two bores 446 are formed adjacent the rearward end 442 of chassis element 150 for insertion of springs 164 therethrough. Additionally, typically two apertures 448 are formed adjacent each of bores 446, configured for insertion of screws therethrough in order to connect spring support elements 162 with chassis element 150. A recess 450 extending forwardly from the rearward end 442 is formed in chassis element 150, generally between the two bores 446.

Preferably two hinges seats 452 are formed adjacent rearward end 442 of chassis element 150, configured together with hinge seating portions 330 of the top housing portion 104 to receive hinge axles 392 of injection button element 120.

A plurality of apertures 460 are formed on the upper side 430 of the chassis element 150 and are used for insertion of screws for connection of the main PCB assembly 152 to the chassis element 150. Additional apertures 461 are formed on the upper side 430 of the chassis element 150 and are used for insertion of screws for connection of top housing portion 104 to the chassis element 150.

A longitudinal track recess 470 is formed on the underside surface 432 of the chassis element 150, separated by a transversely extending wall 472 from recess 450. Track recess 470 extends longitudinally forwardly along axis 105. A transverse wall 474 separates the track recess 470 from opening 440. A recess 476 is formed in transverse wall 474. There are two protrusions 478 formed on the underside surface 432 of the chassis element, and disposed alongside track recess 470. Protrusions 478 have recesses 479 formed therein.

Opening 440 extends between transverse wall 474 and a wall 480 parallel to wall 474. Wall 480 generally includes a rounded cut-out 482 and a rounded surface 484 extends forwardly from cut-out 482, configured to support electrical motor 158. Adjacent and slightly rearwardly of wall 480, there are two cut-outs 486 formed on a first side wall 490 and a second side wall 492 of chassis element 150, configured to enable a flange of motor 158 to be seated in cut-outs 486.

Wall 480 defines a rearwardly facing surface 494 and typically two openings 496 each formed adjacent a corresponding side wall 490 and 492.

A rearwardly extending track arm 500 extends at each side of rounded surface 484. A recess 502 is formed between track arms 500 and forwardly of rounded surface 484. It is seen that each of track arms 500 has an outwardly facing side surface 504, which joins side walls 490 and 492 respectively. The track arms 500 are configured to cooperate with cassette guiding and locking element 170.

Generally inwardly directed protrusions 510 extend from each of the track arms 500. The protrusions 510 define apertures 512 therein, adapted for fixed connection with the cassette guiding and locking element 170.

There is an opening 520 formed between the first side wall 490 of chassis element 150 and track recess 470. Opening 520 is configured for insertion of battery 160 therethrough. An opening 522 is formed between the second side wall 492 of chassis element 150 and track recess 470. Opening 522 is configured for insertion of power control PCB assembly 154 therethrough.

Figure 5:
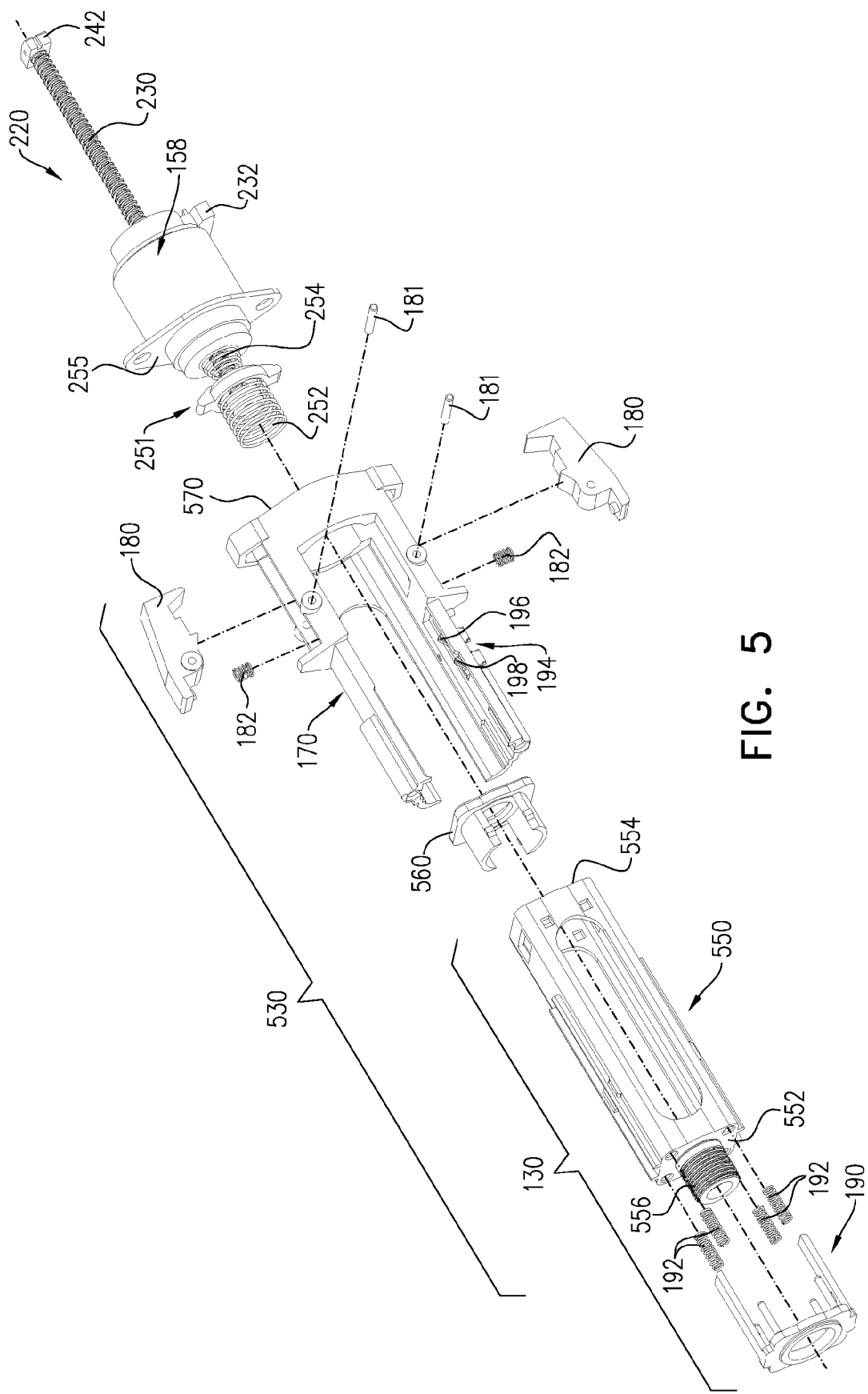
FIG. 5 is a simplified exploded view illustration of a cassette enclosure sub-assembly forming part of the MUCI of FIGS. 1A & 1B.

Reference is now made to FIG. 5, which is a simplified exploded view illustration of a cassette enclosure sub-assembly forming part of the MUCI 100 of FIGS. 1A & 1B.

A cassette enclosure sub-assembly 530 preferably includes the cassette guiding and locking element 170, which is adapted to at least partially receive the cassette assembly 130 therewithin. The cassette assembly 130 preferably includes a cassette 550, having a forward end 552 and a rearward end 554. An outwardly threaded generally circular protrusion 556 extends forwardly from the forward end 552 of the cassette 550 and is adapted for threadable attachment of a needle thereto.

The needle presence responsive element 190 is adapted to be generally axially slidably coupled to the forward end 552 of the cassette 550 and mounted over protrusion 556 of the cassette. The needle presence responsive element 190 is biased forwardly by springs 192.

A spring seat element 560 is adapted to be fixedly inserted into the cassette 550.

As mentioned hereinabove, locking elements 180 are configured to be pivotable with respect to the cassette guiding and locking element 170 about axle 181 and configured to be biased to their locked orientation under the biasing force of springs 182.

The PCB assembly 194 with switches 196 and 198 is operatively coupled to the cassette guiding and locking element 170.

The cassette guiding and locking element 170 has a rearward end 570, and is preferably adapted to be fixedly attached to the flange 255 of the electrical motor 158.

It is noted that the piston drive assembly 220 is configured to be partially received within the cassette guiding and locking element 170, such that the plunger rod 230 along with the lock release element 251 are slidable with respect to the cassette guiding and locking element 170. It is further noted that the lock release element 251 is slidably coupled with respect to the forward end of the plunger rod 230 and is disposed between spring 254 and spring 252. Spring 254 serves to bias the lock release element 251 axially forwardly to abut the piston engaging element 240 in storage and during cassette ejection.

It is noted that springs 252 and 254 are preferably axial compression springs. Alternatively, conical compression springs may be used for conservation of space in the MUCI 100.

The plunger rod 230 extends through the motor 158 and is selectively axially displaceable with respect thereto when the motor is operated, in accordance with the commands received from the controller arranged on the main PCB assembly 152.

It is noted that spring 252 is fixedly coupled to lock release element 251, for example by pressure-fit or by adhesive.

Reference is now made to FIGS. 6A-6F, which are simplified respective first and second pictorial illustrations shown from two different directions, two planar side views, top planar view and bottom planar view of a cassette guiding and locking element 170 forming part of the cassette enclosure sub-assembly of FIG. 5.

It is seen in FIGS. 6A-6F that the cassette guiding and locking element 170 is preferably arranged along the longitudinal axis 105 and has a base portion 600 extending forwardly from rearward end 570 and two generally mutually facing forwardly extending arms 602, extending from the base portion 600. The side arms 602 extend forwardly from base portion 600 and each terminates at a forwardly facing edge 604.

Typically, two radially outwardly facing protrusions 606, facing opposite directions are formed on base portion 600, adjacent rearward end 570. Each of the protrusions 606 has an aperture 608, for insertion of fastening means adapted to connect the cassette guiding and locking element 170 with the flange 255 of the motor 158.

An outwardly extending protrusion 610 is disposed typically in an intermediate location of each of the side arms 602.

An opening 612 is formed on each of the side arms 602, between protrusion 610 and protrusion 606. An aperture 614 is formed in each of side arms 602 and generally intersects opening 612 for insertion of axles 181 therethrough. Openings 612 are adapted for receiving at least a portion of the locking elements 180 thereinto.

Typically, two outwardly directed pins 620 are formed on one of the side arms 602, disposed generally forwardly of protrusion 610, for coupling of PCB 194 to the cassette guiding and locking element 170.

A spring enclosure protrusion 622 having a longitudinal socket 624 therein is formed on each of the side arms 602, extending rearwardly from forwardly facing edge 604 of side arm 602. Sockets 624 are adapted to receive springs 125 thereinto.

An opening 630 is provided between the two side arms 602. A bore 632 arranged along longitudinal axis 105 is formed in base portion 600 and communicates with opening 630 for receiving at least a portion of the cassette assembly 130 thereinto, as well as a portion of the plunger rod 230 with the lock release element 251.

Several guiding recesses 633 are formed on an internal surface of each of the side arms 602 and disposed generally adjacent the forwardly facing edges 604 thereof for axially guiding the insertion of the cassette assembly 130 into the cassette guiding and locking element 170.

An outwardly protruding pin 634 is formed on each of side arms 602, generally forwardly of protrusion 610, adapted for seating spring 182 thereon.

An inwardly directed protrusion 640 is formed on an internal surface of each one of the side arms 602, disposed generally adjacent the forwardly facing edge 604.

Reference is now made to FIGS. 7A-7D, which are simplified respective first and second pictorial illustrations shown from two different directions and two planar side views of the locking element 180 forming part of the cassette enclosure sub-assembly 530 of FIG. 5.

Locking element 180 is preferably an integrally made element having a forwardly facing edge 650 and a rearwardly facing edge 652.

A lock release engaging element 660 is formed adjacent the rearwardly facing edge 652 and generally extends inwardly, defining an inwardly facing edge 662 and a forwardly facing generally tapered surface 664.

A locking protrusion 670, having an inwardly facing edge 672 is disposed generally in an intermediate location of the locking element 180 and extends generally inwardly therefrom. The locking protrusion 670 has a forwardly facing tapered surface 674 and a rearwardly facing planar surface 676.

It is also seen in FIGS. 7A-7D that an inwardly extending pin 680 is formed adjacent the forwardly facing edge 650 and adapted for supporting spring 182.

A bore 682 is formed in locking element 180, closer to the forwardly facing edge 650. Bore 682 is generally disposed transversely with respect to the longitudinal axis 105 and is adapted for insertion of axle 181 therethrough.

Reference is additionally made to FIGS. 8A-8D, which are simplified respective first and second pictorial illustrations shown from two different directions and two planar side views of the spring seat element 560 forming part of the cassette enclosure sub-assembly 530 of FIG. 5.

The spring seat element 560 is an integrally formed element arranged along longitudinal axis 105 and having a base planar wall portion 690 defining a rearwardly facing surface 692 and a forwardly facing surface 694.

A generally circular recess 696 is formed in said wall portion 690 and adapted for seating of spring 252.

Typically, two arcuate mutually facing protrusions 698 extend forwardly from wall portion 690 and define forwardly facing edges 699, adapted to engage a piston of a cartridge.

Typically, two outwardly extending protrusions 700 are formed on each of protrusions 698, facing opposite radial directions. Protrusions 700 are configured for attachment to the cassette 550.

Figure 9C:
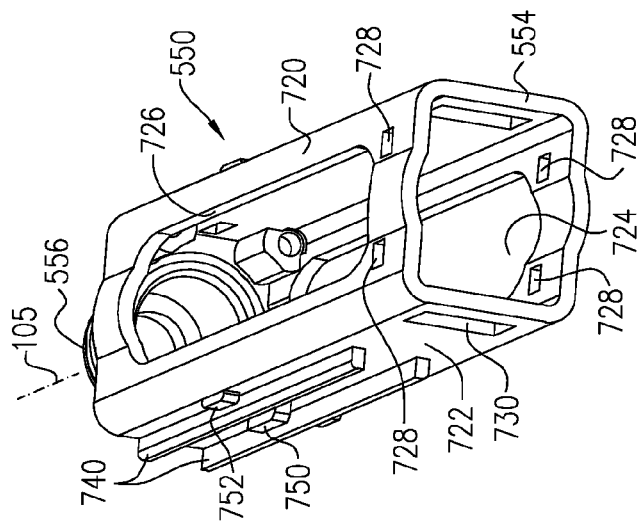
Figure 9B:
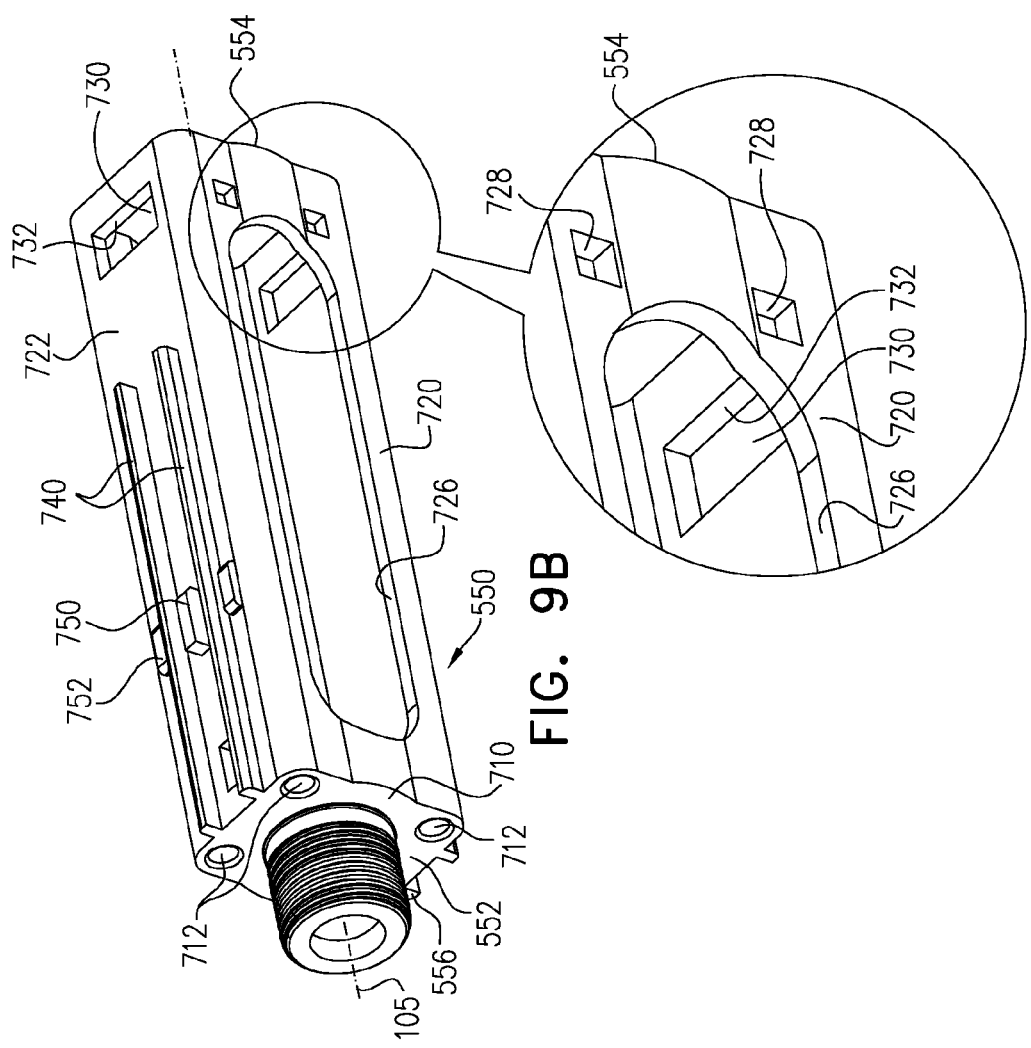
Figure 10A:
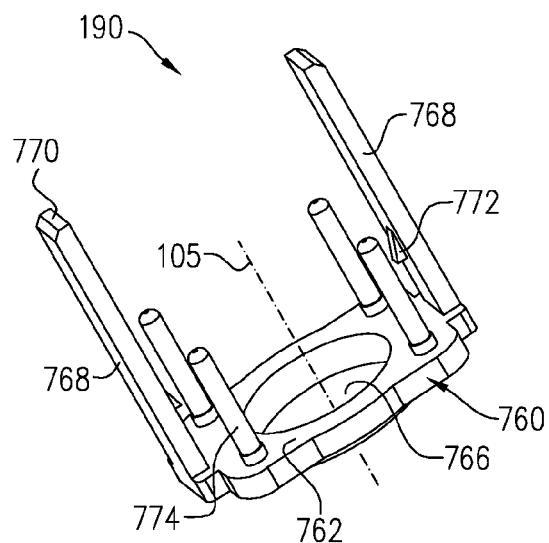
FIGS. 10A-10D are simplified respective first and second pictorial illustrations shown from two different directions, a planar side view and a planar top view of a needle presence responsive element forming part of the cassette enclosure sub-assembly of FIG. 5.
Figure 10B:
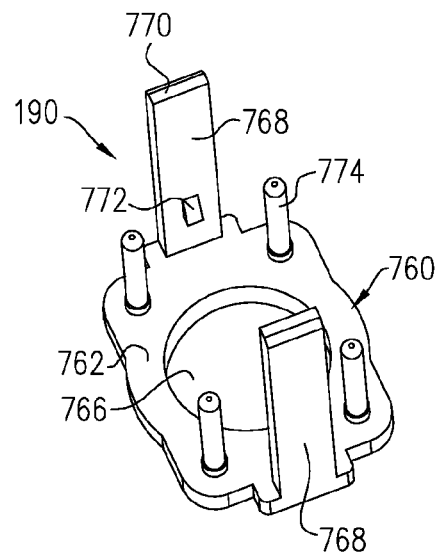
Figure 10C:
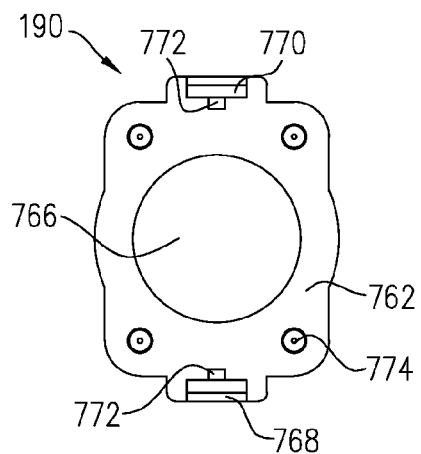
Figure 10D:
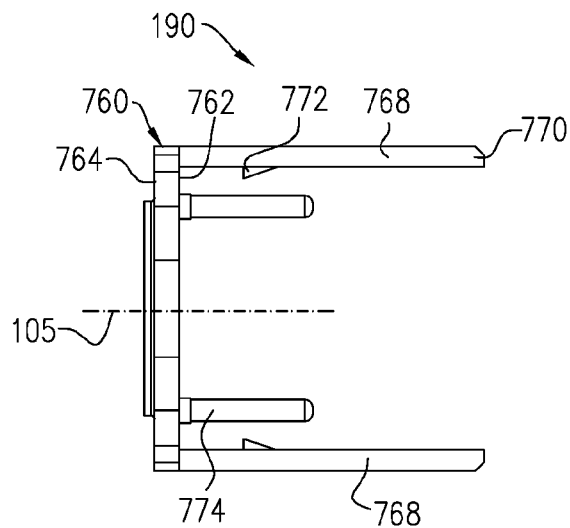

Reference is now made to FIGS. 9A-9G, which are simplified respective first, second and third pictorial illustrations shown from three different directions, three planar side views and a sectional view illustration of the cassette 550 forming part of the cassette enclosure sub-assembly 530 of FIG. 5, the sectional view being taken along the lines G-G in FIG. 9F.

The cassette 550 has rearward end 554 and forward end 552, with protrusion 556 extending forwardly therefrom, as mentioned hereinabove.

The cassette 550 is a preferably integrally formed element arranged along longitudinal axis 105 and preferably having a generally rectangular cross-section. The forward end 552 defines a wall portion 710 arranged transversely with respect to longitudinal axis 105. Typically, four apertures 712 are formed in wall portion 710.

The cassette 550 is formed of a container having a front and back walls 720, disposed generally in parallel to each other and two side walls 722, disposed generally in parallel to each other. A receiving socket 724 is formed within the container, for receiving the cartridge thereinto.

It is seen in FIGS. 9A-9G that an inspection window 726 is formed on each of front and back walls 720, for inspection of the contents of the cartridge.

Typically, two apertures 728 are formed on each of the front and back walls 720 of the cassette, disposed adjacent the rearward end 554 and adapted for connection of the spring seat element 560 to the cassette 550.

Locking opening 730 is formed on each of the side walls 722, disposed adjacent the rearward end 554 and defines a forwardly facing edge 732. Locking opening 730 is adapted for engagement with locking element 180.

Guiding ribs 740 are formed on side walls 722 and extend longitudinally. Guiding ribs 740 are adapted for engagement with the cassette guiding and locking element 170.

A central switch engaging protrusion 750 is formed on side wall 722 and disposed between guiding ribs 740 in a generally intermediate location of the cassette 550. Typically, two protrusions 752 are formed on side wall 722 and disposed outside of the guiding ribs 740 in a location slightly forwardly disposed than switch engaging protrusion 750. Switch engaging protrusion 750 is adapted to engage switch 196. The protrusions 752 are adapted for weakly keep the cassette assembly 130 within the MUCI 100 upon unlocking thereof, so that the cassette assembly 130 does not fall off until the user pulls it out of the MUCI 100.

An aperture 754 is formed on side walls 722 adjacent the forward end 552 of the cassette 550, adapted for attachment of the needle presence responsive element 190 to the cassette 550.

Reference is now made to FIGS. 10A-10D, which are simplified respective first and second pictorial illustrations shown from two different directions, a planar side view and a planar top view of the needle presence responsive element 190 forming part of the cassette enclosure sub-assembly 530 of FIG. 5.

The needle presence responsive element 190 is an integrally formed element arranged along longitudinal axis 105 and having a base planar wall portion 760 defining a rearwardly facing surface 762 and a forwardly facing surface 764.

A bore 766 is formed in wall portion 760 for receiving of the externally threaded protrusion 556 of the cassette 550 therethrough.

Typically, two mutually facing arms 768 extend rearwardly from wall portion 760 and terminate at a rearwardly facing edge 770. An inwardly facing protrusion 772 is formed on the inner side of each of the arms 768 and adapted for connection with the cassette 550.

Typically, four rearwardly extending pins 774 are formed on wall portion 760 and extend rearwardly therefrom, adapted for guiding springs 192.

Reference is now made to FIGS. 11A and 11B, which are simplified respective planar side view and sectional view illustration of the assembled cassette enclosure sub-assembly 530 of FIG. 5, shown with the cassette 550 disposed in a locked operative orientation with respect to the MUCI 100, the sectional view being taken along the lines B-B in FIG. 11A.

Figure 12A:
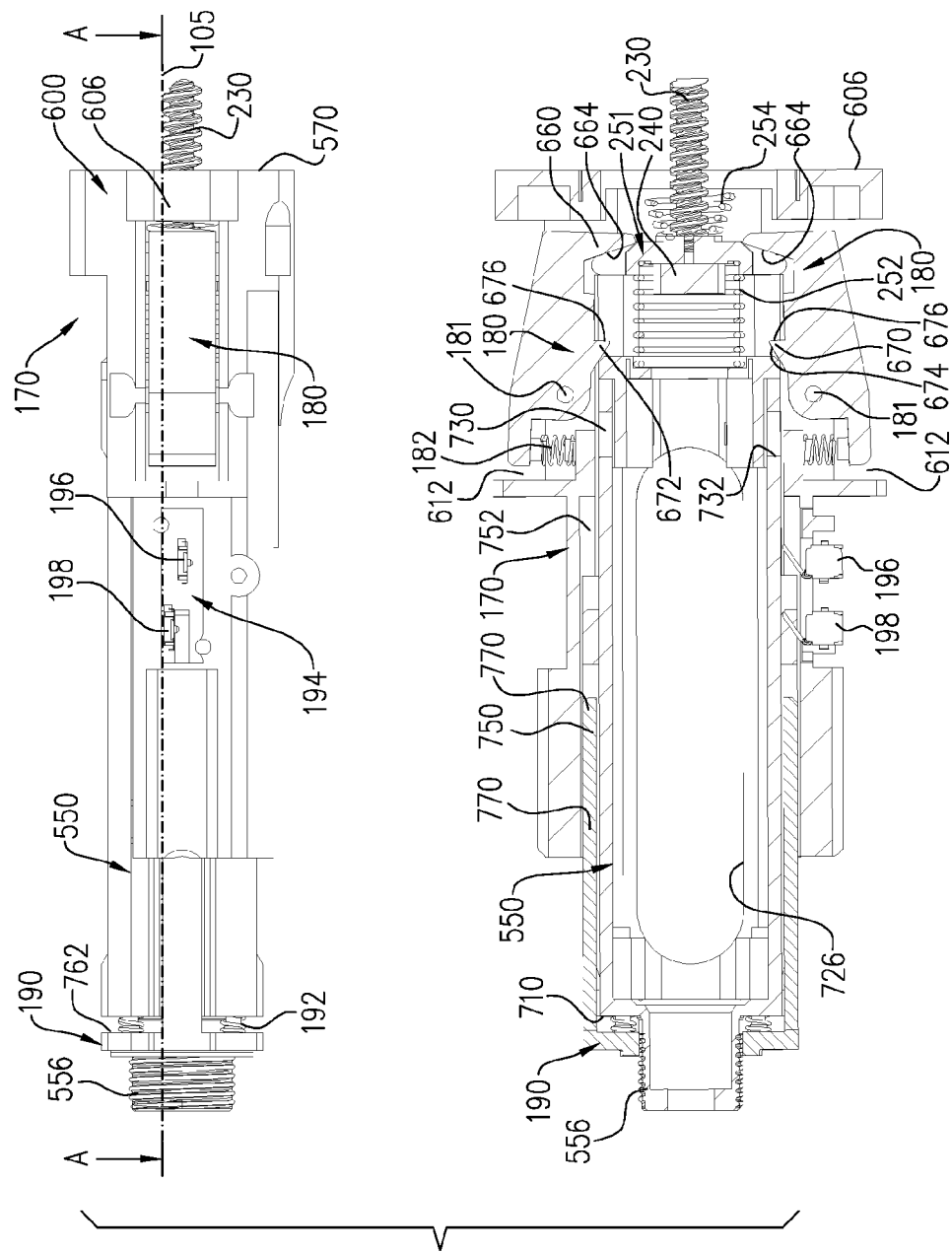
FIG. 12A is a simplified illustration shown prior to cassette insertion into the MUCI of FIGS. 1A & 1B, showing a planar side view and sectional view illustration of the cassette in an unlocked operative orientation with respect to the MUCI of FIGS. 1A & 1B, the sectional view being taken along the lines A-A in FIG. 12A.
Figure 12B:
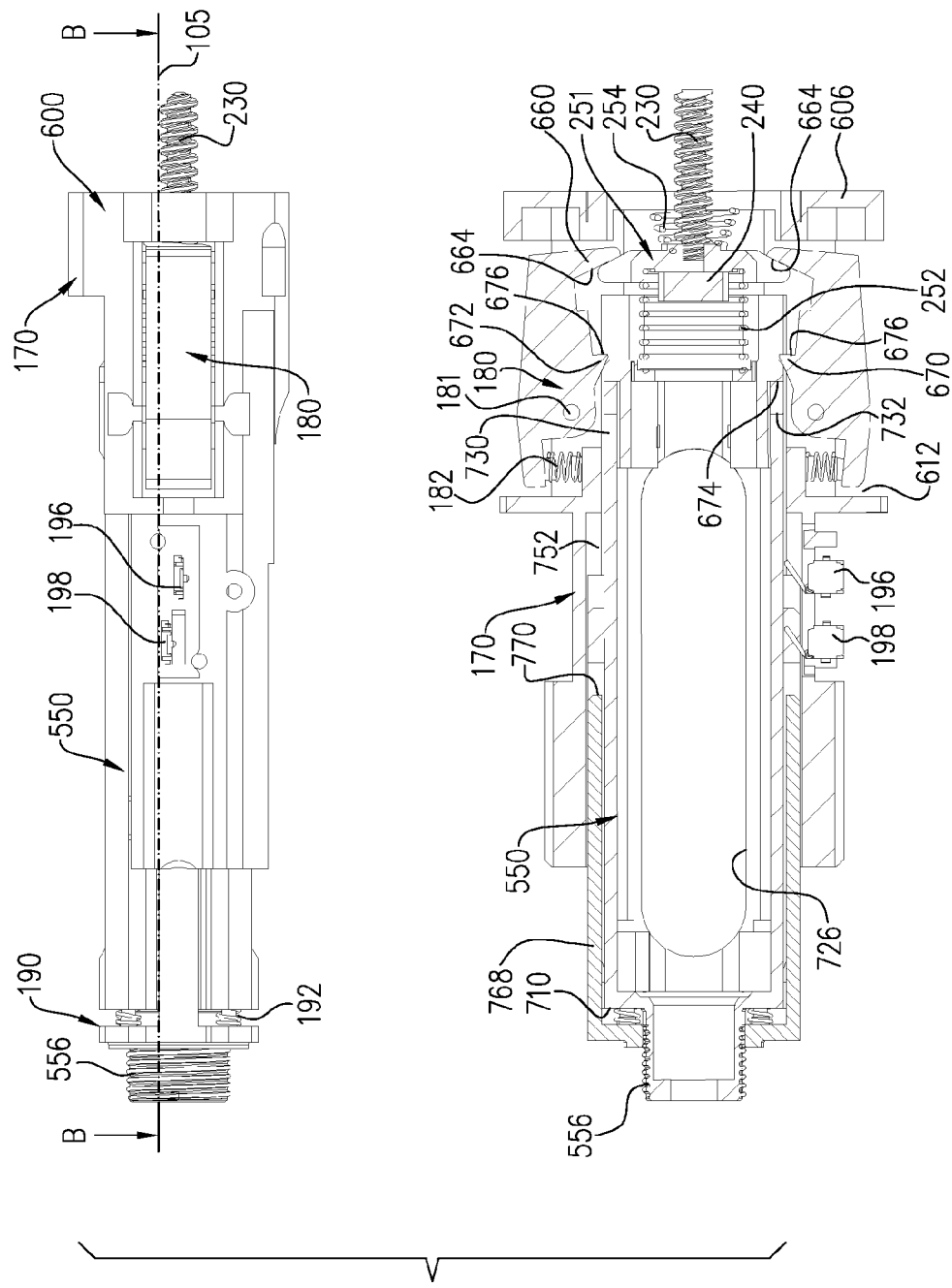
FIG. 12B is a simplified illustration shown in a first transitional stage during cassette insertion into the MUCI of FIGS. 1A & 1B, showing a planar side view and sectional view illustration of the cassette in an unlocked operative orientation with respect to the MUCI of FIGS. 1A & 1B, the sectional view being taken along the lines B-B in FIG. 12B.
Figure 12C:
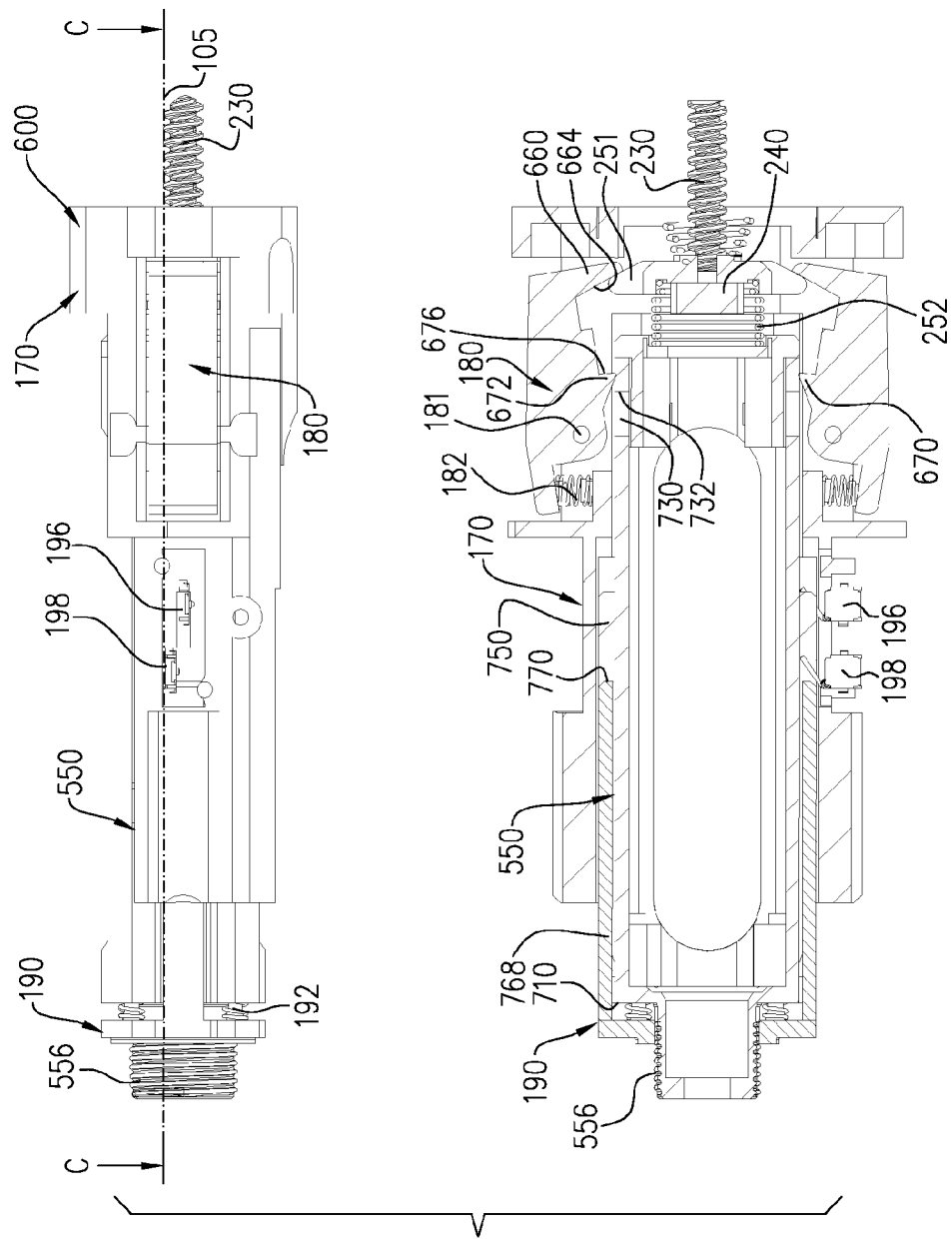
FIG. 12C is a simplified illustration shown in a second transitional stage during cassette insertion into the MUCI of FIGS. 1A & 1B, showing a planar side view and sectional view illustration of the cassette in an unlocked operative orientation with respect to the MUCI of FIGS. 1A & 1B, the sectional view being taken along the lines C-C in FIG. 12C.
Figure 12D:
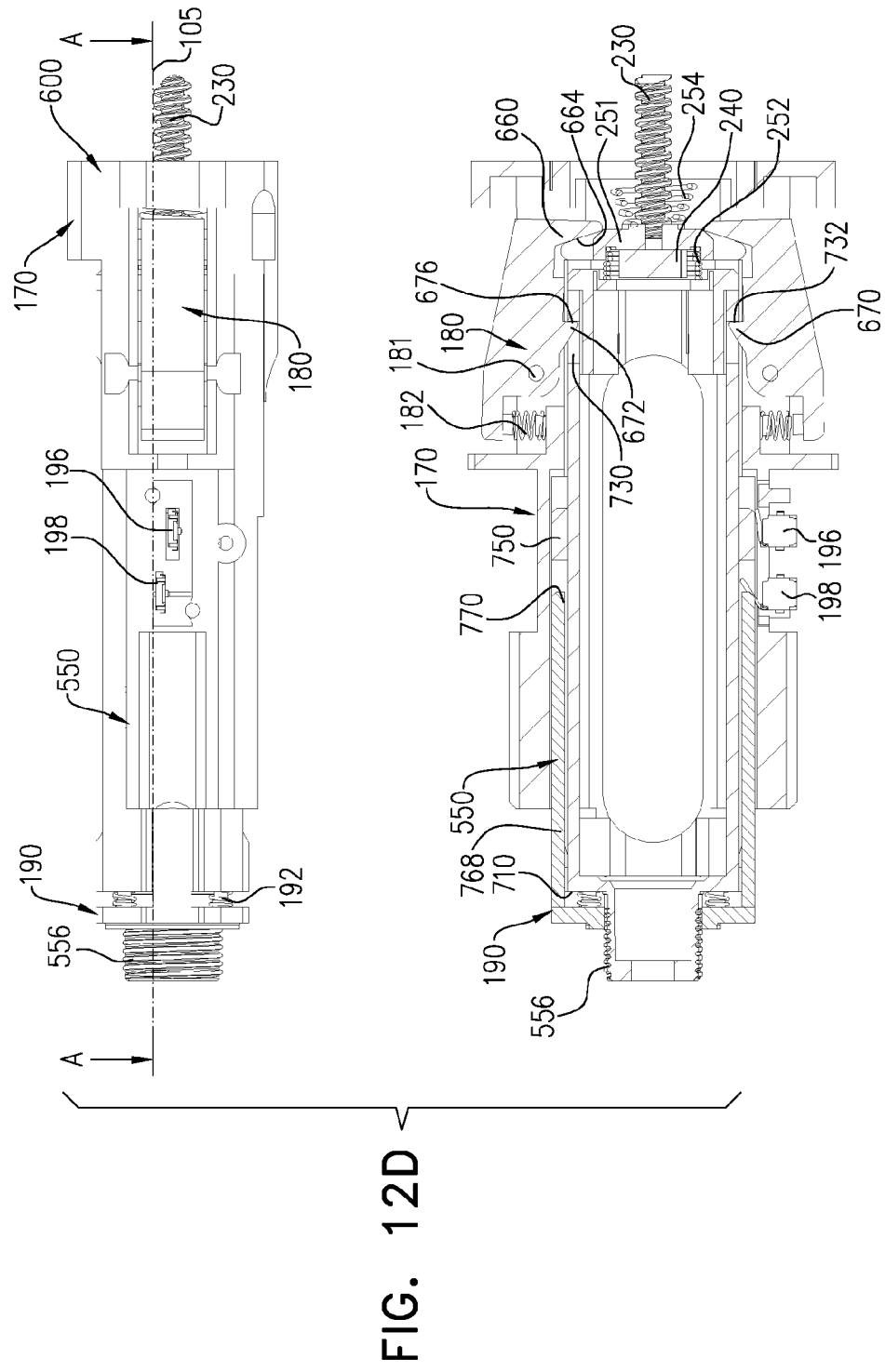
FIG. 12D is a simplified illustration shown following cassette insertion into the MUCI of FIGS. 1A & 1B, showing a planar side view and sectional view illustration of the cassette in a locked operative orientation with respect to the MUCI of FIGS. 1A & 1B, the sectional view being taken along the lines D-D in FIG. 12D.
Figure 14B:
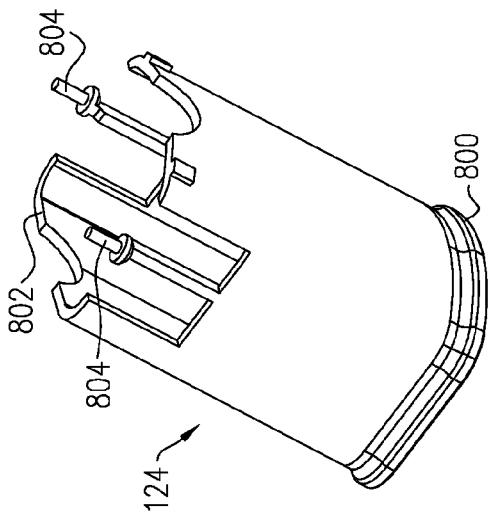
FIGS. 14A-14D are simplified respective first and second pictorial illustrations shown from two different directions, a planar side view and a planar top view of a needle shielding element forming part of the MUCI of FIGS. 1A & 1B.
Figure 14D:
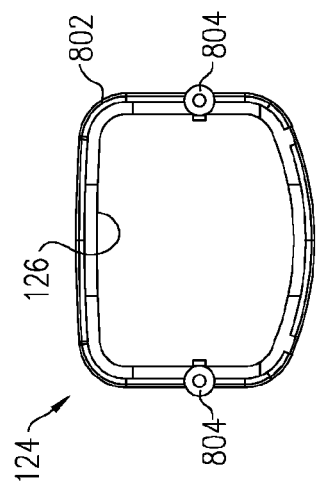
Figure 14A:
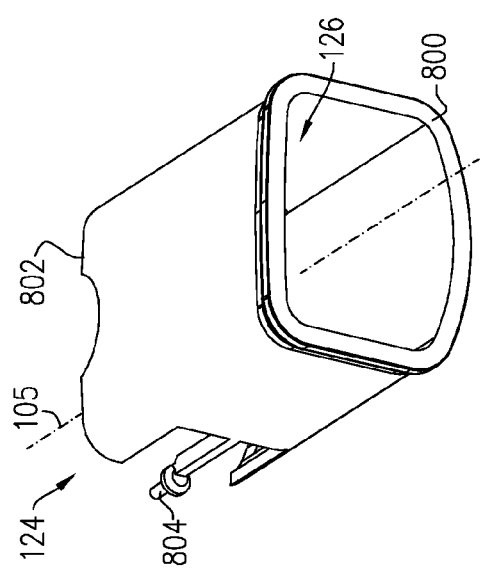
Figure 14C:
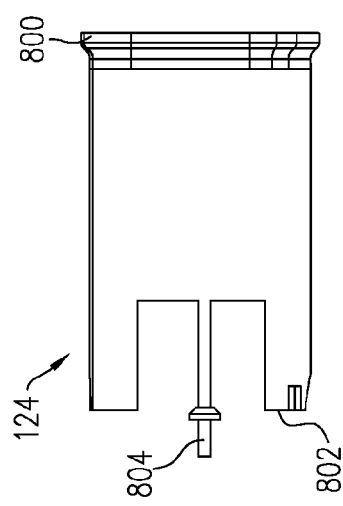

Reference is additionally made to FIG. 12A, which is a simplified illustration shown prior to cassette 550 insertion into the MUCI 100, showing a planar side view and sectional view illustration of the cassette 550 in an unlocked operative orientation with respect to the MUCI 100, the sectional view being taken along the lines A-A in FIG. 12A and to FIG. 12B, which is a simplified illustration shown in a first transitional stage during cassette 550 insertion into the MUCI 100, showing a planar side view and sectional view illustration of the cassette 550 in an unlocked operative orientation with respect to the MUCI 100, the sectional view being taken along the lines B-B in FIG. 12B and to FIG. 12C, which is a simplified illustration shown in a second transitional stage during cassette 550 insertion into the MUCI 100, showing a planar side view and sectional view illustration of the cassette 550 in an unlocked operative orientation with respect to the MUCI 100, the sectional view being taken along the lines C-C in FIG. 12C and to FIG. 12D, which is a simplified illustration shown following cassette 550 insertion into the MUCI 100, showing a planar side view and sectional view illustration of the cassette 550 in a locked operative orientation with respect to the MUCI 100, the sectional view being taken along the lines D-D in FIG. 12D.

Reference is further additionally made to FIGS. 13A and 13B, which are simplified respective planar side view and sectional illustration of the assembled cassette enclosure sub-assembly 530 of FIG. 5, shown with the cassette 550 disposed in the unlocked operative orientation with respect to the MUCI 100, the sectional view being taken along the lines B-B in FIG. 13A.

Referring now specifically to FIGS. 11A & 11B, it is seen that in this operative orientation, the cassette assembly 130 is inserted into the cassette guiding and locking element 170 and is locked with respect thereto.

It is specifically seen that the locking elements 180 are disposed within openings 612 of the cassette guiding and locking element 170.

It is a particular feature of an embodiment of the present invention that the locking elements 180 are pivotably coupled to the cassette guiding and locking element 170, such that axles 181 are inserted through apertures 614 of the cassette guiding and locking element 170 and through bores 682 of the locking elements 180, thus each of the locking elements 180 is pivotable about its respective axle 181.

It is seen that springs 182 are seated between pin 634 of the cassette guiding and locking element 170 and between pin 680 of the locking element 180, thus biasing the locking elements 180 inwardly into openings 612 of the cassette guiding and locking element 170, thus into their locking operative orientation.

It is seen that the plunger rod 230 along with the lock release element 251 is partially inserted into the cassette guiding and locking element 170, such that the lock release element 251 is disposed forwardly to lock release engaging element 660 of the locking elements 180 and forwardly facing tapered surface 664 of the lock release engaging elements 660 rearwardly abuts the lock release element 251.

It is noted that spring 252 is disposed in its compressed position in this locked operative orientation of the cassette assembly 130, so that it is supported between lock release element 251 and between recess 696 of spring seat element 560.

It is particularly seen in FIG. 11B that locking protrusions 670 of the locking elements 180 are inserted into locking openings 730 of the cassette 550, such that rearwardly facing surfaces 676 of the locking protrusions 670 are rearwardly supported by forwardly facing edges 732 of the cassette 550, thus preventing forward axial displacement of the cassette assembly 130 relative to the cassette guiding and locking element 170.

The locking element 251 is stabilized in place by means of spring 254 that is supported between the base portion 600 of cassette guiding and locking element 170 and between the lock release element 251.

It is a particular feature of an embodiment of the present invention that upon rearward axial insertion of the cassette assembly 130 into the MUCI 100, the cassette 550 is prevented from forward axial displacement with respect to the MUCI 100. Unlocking of the cassette assembly 130 from the MUCI 100 is permitted upon sufficient rearward displacement of the plunger rod 230 along with the lock release element 251. Rearward displacement of the plunger rod 230 urges rearward displacement of the lock release element 251, which in turn urges pivotable outward displacement of the locking elements 180 about axles 181 and thereby unlocking of the cassette assembly 130 from the cassette guiding and locking element 170 and forward axial displacement thereof under the force of spring 252.

It is seen that in this operative orientation where the cassette assembly 130 is inserted into the MUCI 100 and locked with respect to the cassette guiding and locking element 170, switch 196 is actuated by switch engaging protrusion 750 of the cassette 550 to indicate to the controller that the cassette assembly 130 is inserted into the MUCI 100.

It is further particularly seen in FIGS. 11A & 11B that the needle presence responsive element 190 is mounted onto the cassette 550, such that protrusion 556 of the cassette 550 protrudes forwardly through bore 766 of the needle presence responsive element 190. Needle presence responsive element 190 is slidably coupled to the cassette 550 by means of engagement of protrusions 772 of the needle presence responsive element 190 into apertures 754 of the cassette 550.

It is seen that the springs 192 are supported between apertures 712 of the cassette 550 and rearwardly facing surface 762 of needle presence responsive element 190 and thus the needle presence responsive element 190 is biased forwardly at rest, when no force is exerted thereon.

Reference is now specifically made to FIGS. 12A-12D, which show the insertion sequence of the cassette assembly 130 into the MUCI 100.

FIG. 12A illustrates that the cassette assembly 130 is at an initial stage of axial insertion into the cassette guiding and locking element 170 of the MUCI 100, shown in an un-locked operative state. It is specifically seen in FIG. 12A that locking openings 730 of the cassette 550 are forwardly spaced along axis 105 from protrusions 670 of the locking elements 180 in this operative orientation.

FIG. 12B illustrates that the cassette assembly 130 is in a first transitional stage of axial insertion to the cassette guiding and locking element 170 of the MUCI 100, the cassette assembly 130 is displaced slightly rearwardly relative to the cassette guiding and locking element 170 as compared to the cassette assembly position in FIG. 12A. The cassette assembly 130 in FIG. 12B is still shown in the un-locked state. It is specifically seen in FIG. 12B that locking openings 730 of the cassette 550 are slightly less forwardly spaced along axis 105 from protrusions 670 of the locking elements 180 in this operative orientation as compared to the operative orientation illustrated in FIG. 12A.

FIG. 12C illustrates that the cassette assembly 130 is in a second transitional stage of axial insertion into the cassette guiding and locking element 170 of the MUCI 100, the cassette assembly 130 is displaced further rearwardly relative to the cassette guiding and locking element 170 as compared to the cassette assembly position in FIG. 12B. The cassette assembly 130 in FIG. 12C is still shown in the un-locked state. It is specifically seen in FIG. 12C that locking openings 730 of the cassette 550 are further less forwardly spaced along axis 105 from protrusions 670 of the locking elements 180 in this operative orientation as compared to the operative orientation illustrated in FIG. 12B.

FIG. 12D illustrates that the cassette assembly 130 is shown in the locked state (as shown in FIGS. 11A & 11B) relative to the cassette guiding and locking element 170 of the MUCI 100, the cassette assembly is displaced further rearwardly relative to the cassette guiding and locking element 170 as compared to the cassette assembly position in FIG. 12C and is locked with respect thereto.

It is specifically seen in FIG. 12D that in this operative orientation protrusions 670 of the locking elements 180 are inserted into locking openings 730 of the cassette 550, so that rearwardly facing surfaces 676 of locking elements 180 abut forwardly facing edges 732 of locking openings 730 and thus effectively lock the cassette assembly 130 within the cassette guiding and locking element 170, which is in turn fixedly connected to the chassis element 150 of the MUCI 100.

Reference is now specifically made to FIGS. 13A and 13B, which illustrate the cassette assembly 130 in the un-locked operative orientation, similar to that illustrated in FIG. 12A-12C.

It is noted that in each of the above-described operative orientations, locking elements 180 abut the lock release element 251, by means of engagement of lock release engagement elements 660 of the locking elements 180 therewith.

The cassette assembly 130 is shown in FIGS. 13A & 13B just before locking.

Reference is now made to FIGS. 14A-14D, which are simplified respective first and second pictorial illustrations shown from two different directions, a planar side view and a planar top view of the needle shielding element 124 forming part of the MUCI 100 of FIGS. 1A & 1B.

The needle shielding element 124 is an integrally formed element arranged along longitudinal axis 105. The needle shielding element 124 has a generally rectangular cross section defining bore 126 and having a forward circumferential contact surface 800 and a rearward end 802. Generally, two spring seats 804 are arranged adjacent the rearward end 802, which are configured for supporting springs 125 between the needle shielding element 124 and the cassette guiding and locking element 170.

Figure 15A:
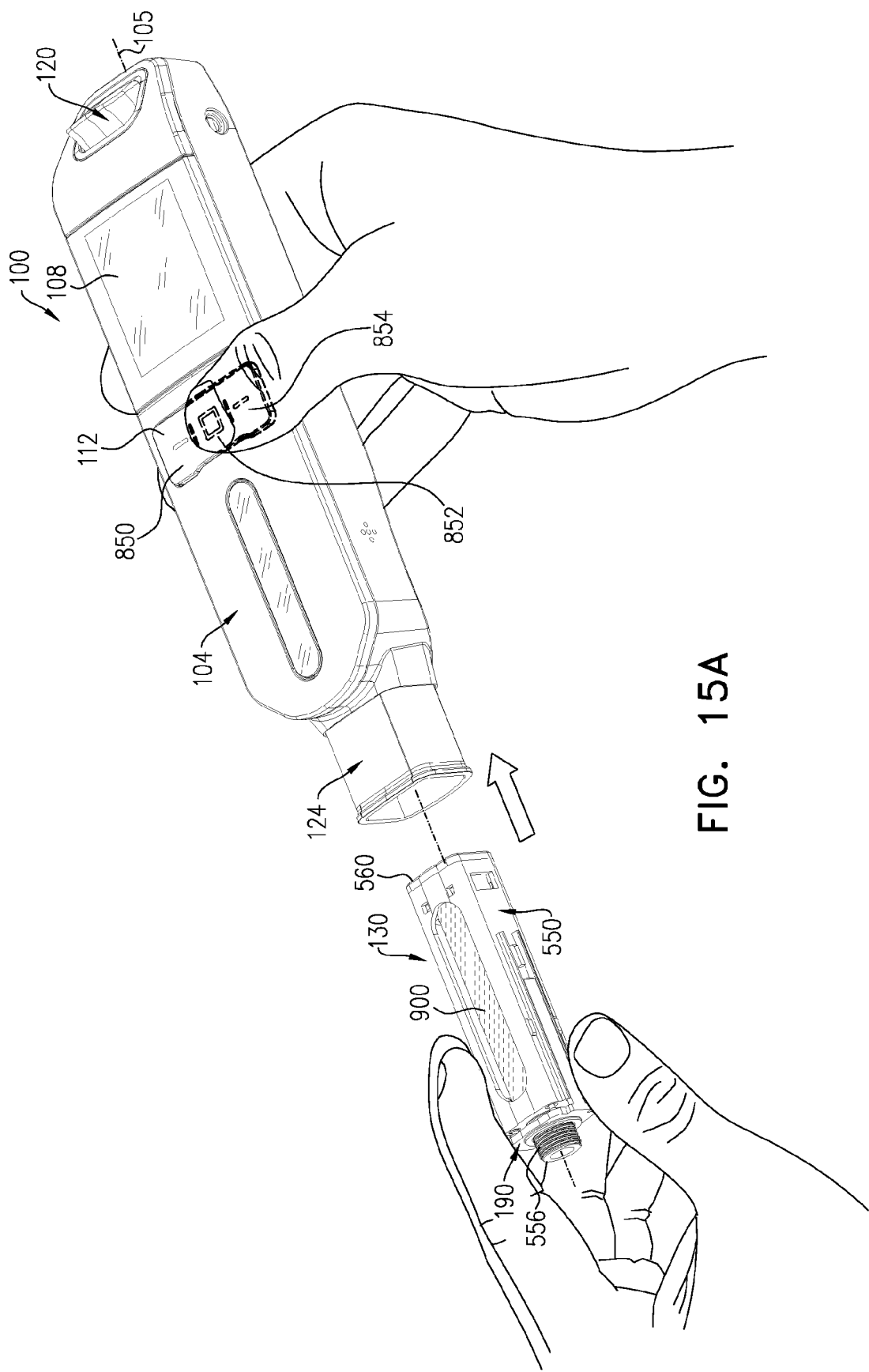
FIG. 15A is a simplified pictorial illustration of the MUCI of FIGS. 1A & 1B as operated by a user in a first operative orientation, prior to cassette insertion into the MUCI.

Reference is now made to FIG. 15A, which is a simplified pictorial illustration of the MUCI 100 of FIGS. 1A & 1B as operated by a user in a first operative orientation, prior to cassette insertion into the MUCI 100 and to FIGS. 15B and 15C, which are simplified respective planar side view and sectional illustration taken generally along lines C-C in FIG. 15B.

In FIGS. 15A-15C, the MUCI 100 is shown in the first operative orientation, prior to cassette assembly insertion. Preferably, in this first operative orientation, the user presses a button of the button defining element 112.

The display 106 preferably instructs the user to load the cassette assembly 130 into the MUCI 100.

Injection button element 120 is seated within opening 116 of top housing portion 104 and is pivotably supported on chassis element 150, such that hinge axles 392 of injection button element 120 are seated within corresponding hinge seats 452 of chassis element 150.

Display 106 is provided under the transparent window 108 of top housing portion 104, preferably configured to provide instructions and indications to the user.

Button defining element 112 is seated within opening 110 of top hop housing portion and is disposed such that buttons 850, 852 and 854 are positioned just above menu button switches, thus configured to be operatively coupled therewith.

It is particularly seen in FIG. 15C that both the cassette switch 196 and the needle switch 198 are disposed in a non-actuated state in this operative orientation, which indicate that needle is not mounted onto externally threaded end 556 of cassette 550 and that the cassette assembly 130 is not mounted to the MUCI 100.

It is seen in FIGS. 15A-15C that a medicament cartridge 900 is now inserted into the cassette assembly 130. Medicament cartridge 900 is preferably cylindrical and circularly symmetric and preferably includes a septum 902 at its forward end and a piston 904 at its rearward end. Piston 904 is configured to confine medicament 906 which is contained within the inner volume of the medicament cartridge 900.

Alternatively, a dual chamber medicament cartridge 910 may be inserted into the cassette assembly 130, such that includes one chamber for fluid confined by a first piston and another chamber for powder confined by a second piston, with a bypass between the two pistons, which is opened once force is applied by the plunger rod on the first piston and thereby mixes the fluid with the powder in preparation to injection.

It is seen in this operative orientation that the plunger rod 230 is disposed in its rearward position. Locking elements 180 are disposed at rest, such that they are biased inwardly towards the center of the MUCI 100 under the urge of springs 182.

The needle shielding element 124 is disposed in at rest position in a forwardly extended orientation under the force of biasing springs 125.

Figure 16A:
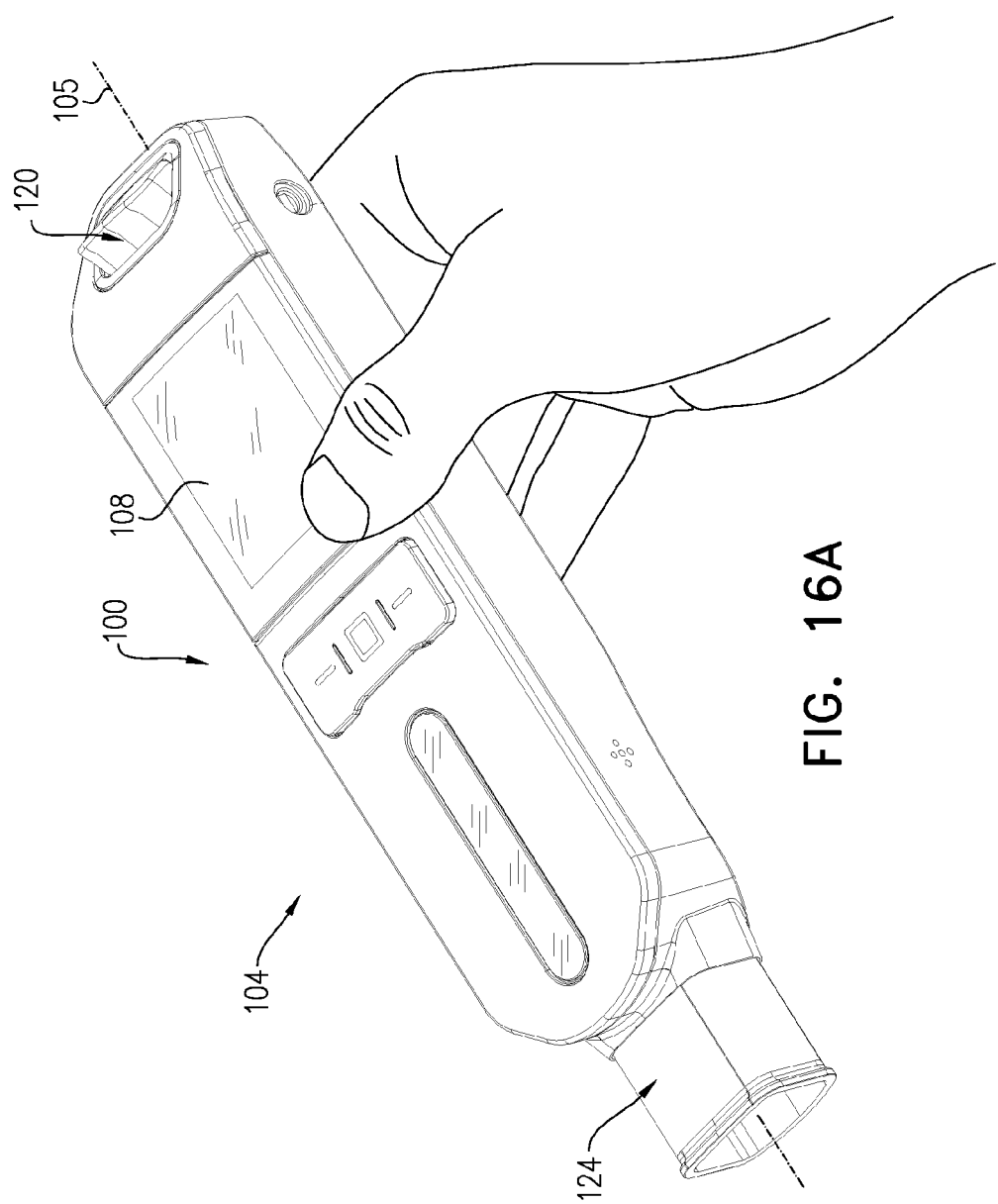
FIG. 16A is a simplified pictorial illustration of the MUCI of FIGS. 1A & 1B as operated by a user, in a second operative orientation, following cassette insertion into the MUCI.

Reference is now made to FIG. 16A, which is a simplified pictorial illustration of the MUCI 100 of FIGS. 1A & 1B as operated by a user, in a second operative orientation, following cassette insertion into the MUCI 100 and to FIGS. 16B and 16C, which are simplified respective planar side view and sectional illustration taken generally along lines C-C in FIG. 16B.

It is seen specifically in FIG. 16C, that the cassette assembly 130 is now inserted into the MUCI 100 and locked with respect thereto.

It is a particular feature of an embodiment of the present invention that the cassette assembly 130 is axially inserted into the MUCI 100 along longitudinal axis 105, whereas the cassette assembly 130 is first disposed in a first operative orientation such as shown in FIG. 12A, going through the stages as illustrated in FIGS. 12B and 12C and finally reaching the locked stage as shown in FIGS. 11A, 11B & 12D, whereas the locking elements 180 lock the cassette assembly 130 with the cartridge 900 therewithin to the cassette guiding and locking element 170.

It is noted that the cassette switch 196 is actuated in this operative orientation due to engagement thereof with protrusion 750 of the cassette 550.

It is further noted that the needle switch 198 is not actuated yet since the needle presence responsive element 190 is still biased forwardly by the force of springs 192 when the needle is not mounted to the externally threaded protrusion 556 of the cassette 550.

It is seen in FIG. 16C that the 240 is slightly rearwardly spaced from piston 904 of the cartridge 900 in this operative orientation.

It is a further particular feature of an embodiment of the present orientation that spring 252 is compressed in this stage following insertion of the cassette assembly 130 and is supported between spring seat element 560 and lock release element 251, so as to bias the cassette assembly to extend forwardly once the cassette assembly 130 is no more locked with respect to the cassette guiding and locking element 170.

It is noted that the cassette 550 is symmetrical and thus can be inserted into the MUCI 100 from both of the sides of the cassette 550.

Figure 17:
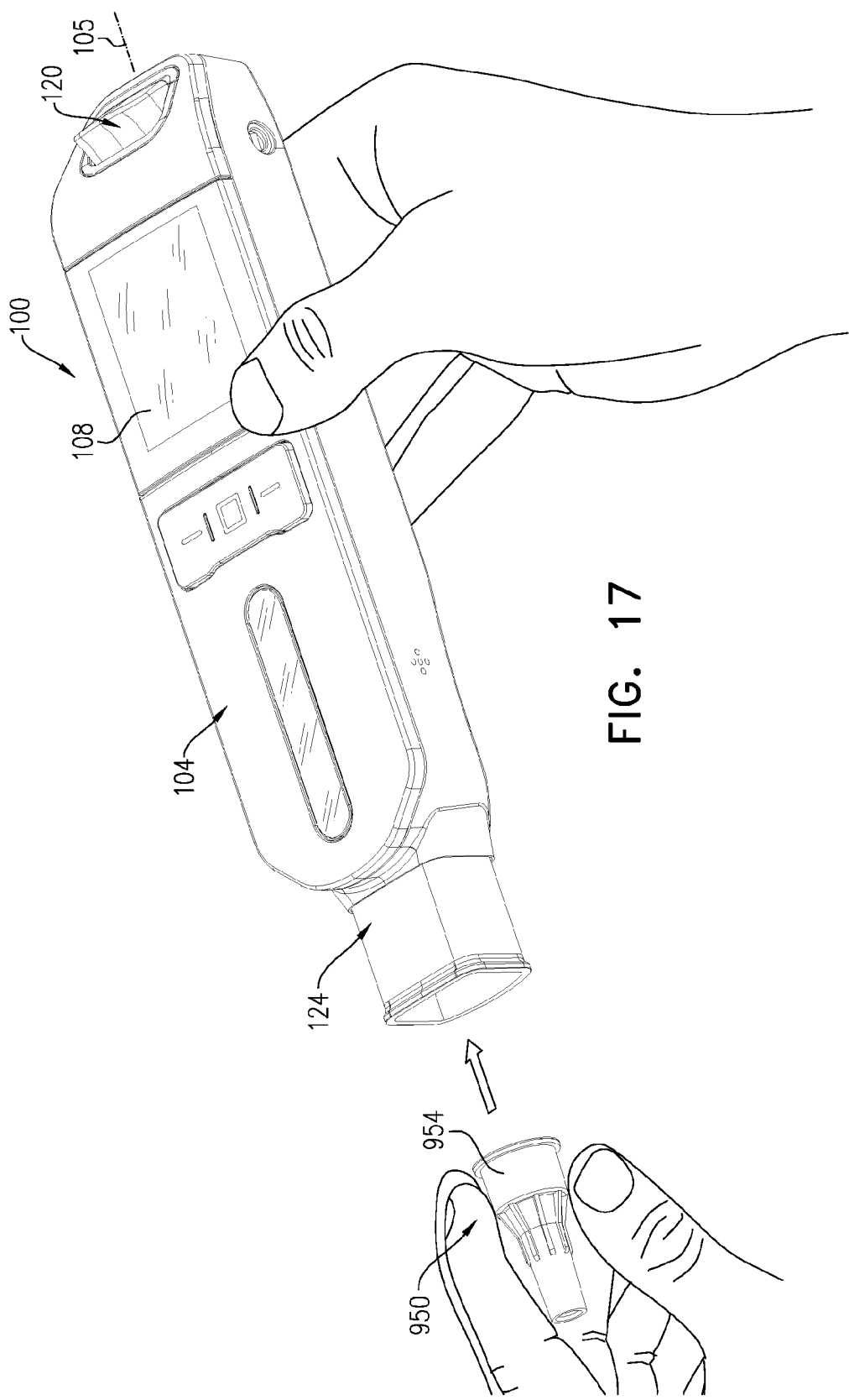
FIG. 17 is a simplified pictorial illustration of the MUCI of FIGS. 1A & 1B as operated by a user, in a third operative orientation, prior to needle attachment to a cartridge inserted into the MUCI.

Reference is now made to FIG. 17, which is a simplified pictorial illustration of the MUCI 100 of FIGS. 1A & 1B as operated by a user, in a third operative orientation, prior to needle attachment to the cartridge 900 inserted into the MUCI 100.

The display 106 preferably instructs the user to attach a needle and the user is about to connect a needle assembly 950, having a needle 952 attached to a needle hub and a needle cover 954, to the externally threaded protrusion 556 of cassette 550.

Figure 18A:
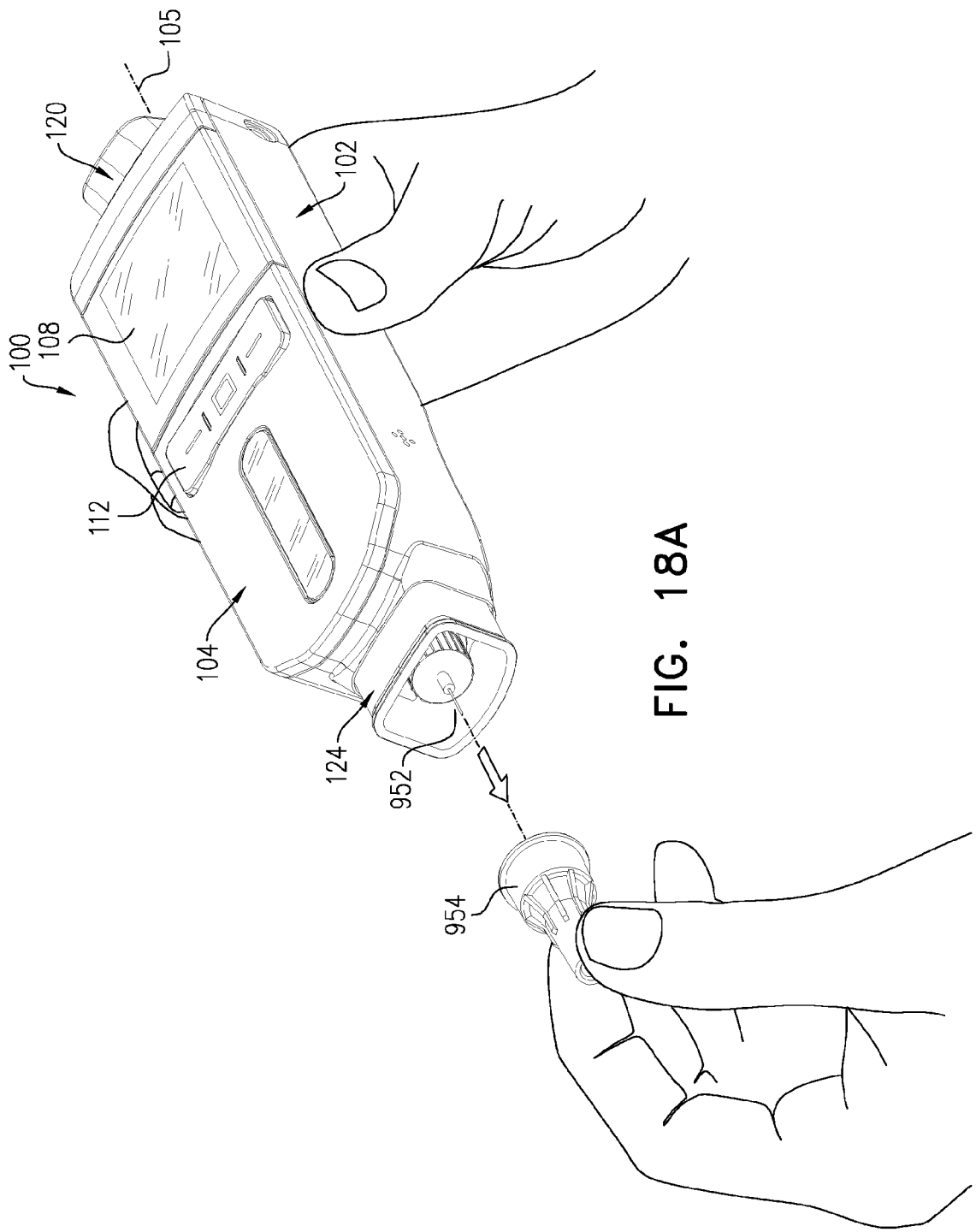
FIG. 18A is a simplified pictorial illustration of the MUCI of FIGS. 1A & 1B as operated by a user, in a fourth operative orientation, following needle cover removal from the needle following insertion thereof into the MUCI.

Reference is now made to FIG. 18A, which is a simplified pictorial illustration of the MUCI 100 of FIGS. 1A & 1B as operated by a user, in a fourth operative orientation, following needle cover 954 removal from the needle 952 after insertion thereof into the MUCI 100 and to FIGS. 18B and 18C, which are simplified respective planar side view and sectional illustration taken generally along lines C-C in FIG. 18B.

It is seen that upon threadable connection of the needle assembly 950 to protrusion 556 of the cassette 550, the needle assembly 950 applies pressure on the needle presence responsive element 190, thus urges its rearward axial displacement against the urge of springs 192.

Upon rearward displacement of needle presence responsive element 190, arm 768 thereof engages needle switch 198 and activates it to indicate to the controller of the MUCI 100 that needle 952 is connected to the cassette assembly 130.

It is a particular feature of an embodiment of the present invention that the needle 952 is hidden within the needle shielding element 124 at all times, to prevent user needle phobia.

Figure 19A:
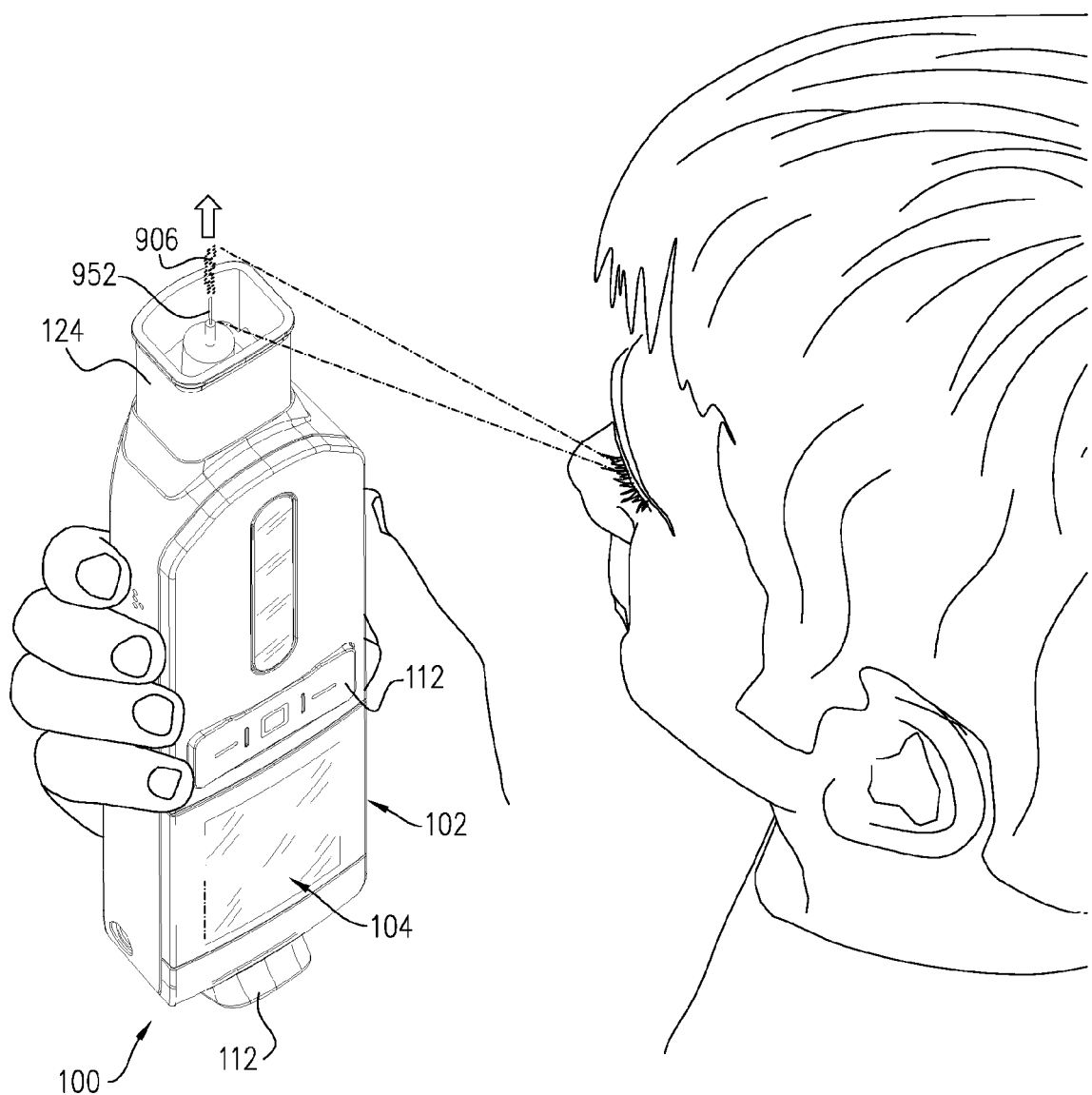
FIG. 19A is a simplified pictorial illustration of the MUCI of FIGS. 1A & 1B as operated by a user, in a fifth operative orientation, during priming of the cartridge.
Figure 19B:
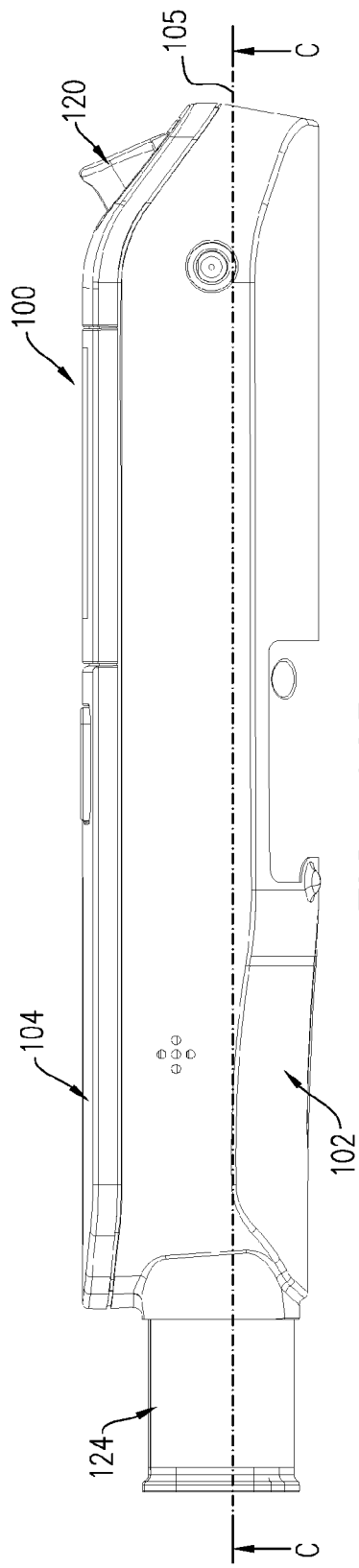
FIGS. 19B and 19C are simplified respective planar side view and sectional illustration taken generally along lines C-C in FIG. 19B of the MUCI in the fifth operative orientation.
Figure 19C:
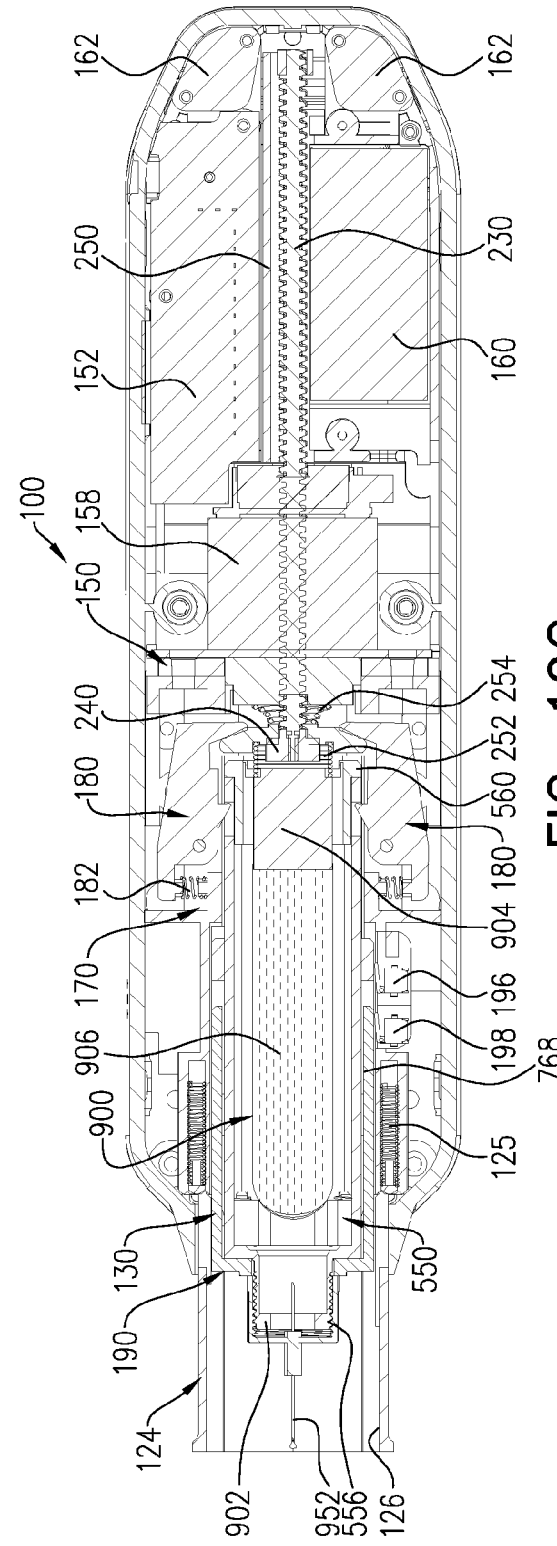

Reference is now made to FIG. 19A, which is a simplified pictorial illustration of the MUCI 100 of FIGS. 1A & 1B as operated by a user, in a fifth operative orientation, during priming of the cartridge 900 and to FIGS. 19B and 19C, which are simplified respective planar side view and sectional illustration taken generally along lines C-C in FIG. 19B.

The display 106 instructs the user to orient the injector with the needle 952 pointing up.

The user can visually inspect the contents of medicament cartridge 900 through transparent window formed in the upper housing portion 104.

It is a particular feature of an embodiment of the present invention that before completion of the priming process, the MUCI 100 is not ready for injection, since there is no engagement between the piston contact element 240 and piston 904, which is contained in medicament cartridge 900. It is noted that in case dual chamber cartridge is inserted into the cassette assembly 130, piston contact element 240 has to engage the piston 904 and displace forwardly along axis 105 in order to perform drug reconstitution and prepare the medication for injection.

Following needle 952 attachment to the cassette assembly 130, the MUCI 100 assumes its priming operative orientation and the display 106 instructs the user to orient the MUCI 100 with the needle 952 pointing up. The user can exit this screen by means of waiting for a predetermined amount of time or by means of pressing button 852, identified as "OK" on the display 106.

It is a particular feature of an embodiment of the present invention that once the user orients the MUCI 100 with the needle 952 pointing up and presses button 852 identified on the display as "OK", the display 106 is preferably shifted by 180 degrees and instructs the user to press the button which is identified as "PRIME" on the display 106 until drops appear at the tip of needle 952, as clearly seen in FIG. 19A.

It is noted that the user preferably taps the MUCI 100 to dislodge air bubbles, which maybe present within the medicament 906 contained in medicament cartridge 900.

The user may press the button identified as "PRIME" on the display 106 and as long as user continues pressing, the electrical motor 158 is operated to displace the piston 904 upward within the medicament cartridge 900.

It is noted that once the user observes a drop of medicament 906 at the top of needle 952, he stops pressing the button identified as "PRIME" on the display 106.

The user may press a different button, specifically button 854, identified on the display as "DONE" in order to confirm that the priming process is completed and then the display 106 instructs the user to inject, while it is a particular feature of an embodiment of the present invention that the display 106 has shifted back by 180 degrees at this stage.

It is appreciated that the priming process preferably continues as long as the user presses button 850, which is identified as "PRIME" on the display. Alternatively, the control system can define a condition where the priming process will be stopped even if the user did not release the button indicated as "PRIME" on the screen. This condition may include a certain amount of medicament 906 ejected from the medicament cartridge 900 or a predetermined pressure threshold exerted on the piston contact element 240.

It is a particular feature of an embodiment of the present invention that the initiation of injection is permitted only after the priming process is completed in order to enable the control system of the MUCI 100 to identify the exact amount of medication ejected from the medicament cartridge 900. This exact identification is provided by the fact that the injection is initiated only when the priming process is completed. The user indicates to the control system that the priming was completed by pressing button 854, which is identified as "DONE" on display 106 once he sees drops of liquid at the tip of needle 952, which indicate that the piston contact element 240 engaged the piston 904 and displaced it forwardly within the medicament cartridge 900. Initiation of injection is only permitted once this signal is provided by the user, indicating completion of priming process, in order to prevent counting of moveable subassembly 220 advancement during the period of time in which there is no engagement between piston contact element 240 and the piston 904, which does not result in ejection of medication 906 from the medicament cartridge 900.

It is appreciated that in accordance with an embodiment of the present invention, confirmation of completion of the priming process by the user, or alternatively, automatic check of priming completion by the control system, can be defined as a condition for initiating injection. Such automatic check of priming completion may include identification of change in resistance to operate the electric motor 158, thus indicating that the piston contact element 240 engaged the piston 904 within the medicament cartridge 900.

Upon completion of the priming or drug reconstitution or both, piston contact element 240 is now engaged with the piston 904, thus the MUCI 100 is now ready for injection upon receiving the appropriate signal from the control system, as described further hereinbelow.

Either in the initial set-up process of the MUCI 100 or after priming thereof, the user may set up injection dosage and duration by using the different MENU buttons.

Figure 20A:
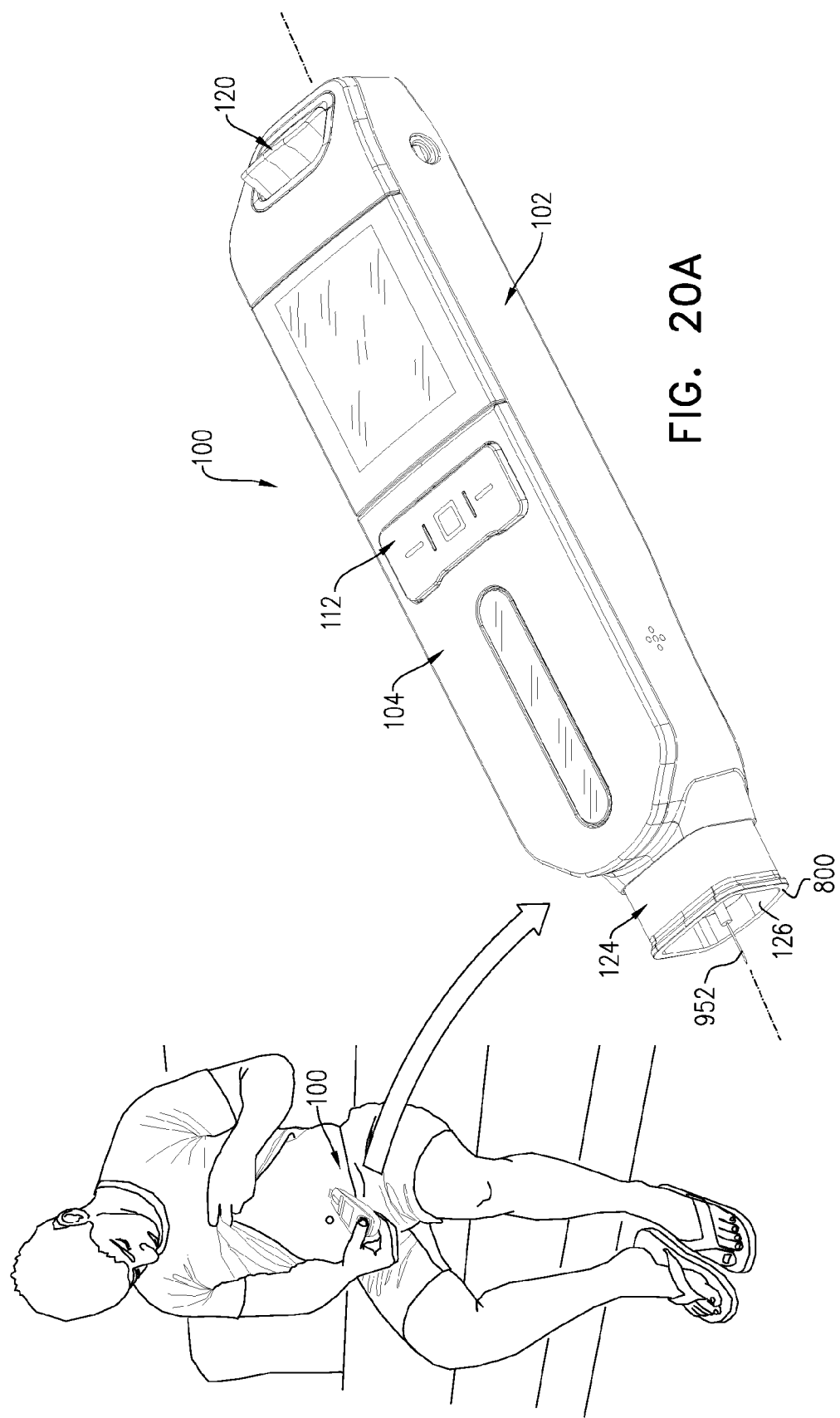
FIG. 20A is a simplified pictorial illustration of the MUCI of FIGS. 1A & 1B as operated by a user, in a sixth operative orientation, during injection of medicament from the cartridge.

Reference is now made to FIG. 20A, which is a simplified pictorial illustration of the MUCI 100 of FIGS. 1A & 1B as operated by a user, in a sixth operative orientation, during injection of medicament from the cartridge 900 and to FIGS. 20B and 20C, which are simplified respective planar side view and sectional illustration taken generally along lines C-C in FIG. 20B.

It is seen in FIGS. 20A-20C that the user inserts needle 952 at an injection site on a body of the user by means of placing the contact surface 800 of the needle shielding element 124 on the skin of the user.

It is a particular feature of an embodiment of the present invention that upon placing the needle shielding element 124 against the skin, the springs 125 are compressed to allow needle penetration into the skin without revealing the needle 952 to the user to prevent needle phobia.

It is a particular feature of an embodiment of the present invention that a needle shielding switch may be provided in the MUCI 100, sensing the axial orientation of the needle shielding element 124 relative to housing portions 102 and 104, thus indicating that the MUCI 100 is pressed against the skin and thus the injection can be initiated.

The user presses on the outer surface 380 of injection button element 120 to initiate ejection of medicament 906 from the medicament cartridge 900.

Upon pressing on the outer surface 380 of injection button element 120, the injection button element 120 is pivoted about pivoting axis 394, such that protrusion 384 engages injection button micro switch, which in turn transfers signal to the control system of the MUCI 100, to initiate injection by means of electrical motor 158 advancing the moveable subassembly of the piston drive subassembly 220 by a distance which precisely corresponds to the selected dose and at a rate which precisely corresponds to the selected injection duration.

It is noted that following pressing the injection button element 120, display 106 preferably shows a countdown of the duration of injection.

In this injection operative orientation, it is seen that moveable subassembly of piston drive subassembly 220 is displaced forwardly along longitudinal axis 105, while driving the piston contact element 240 forwardly along track element 250 and piston contact element 240 drives piston 904 forwardly within medicament cartridge 900 to a first longitudinal extent, which results in ejection of a certain amount of medicament 906 from the medicament cartridge 900.

It is noted that upon ejection of the selected dose of medicament 906, the needle 952 has to be removed from the cassette assembly 130. The needle cover 954 may be placed on the needle 952 in order to safely remove and discard needle 952. It is a particular feature of an embodiment of the present invention that in order to prevent accidental needle pricking during removal of the needle 952 from the cassette assembly while placing the cover 952 within the needle shielding element 124, a docking station may be provided, the circumferential dimensions of which are generally larger than those of the needle shielding element 124, thus providing for safe mounting of the needle cover 954 on the needle 952 for discarding thereof.

Upon discarding of the needle 952, the same cartridge 900 may be used again with another needle or the cassette assembly 130 may be removed from the MUCI 100.

It is a particular feature of an embodiment of the present invention that upon pressing one of the MENU buttons, which is responsible for releasing the cassette assembly 130, the plunger rod 230 along with the lock release element 251 is slightly displaced axially rearwardly along axis 105 in order to release the cassette from the cassette guiding and locking element 170. Specifically, a controller receives a command to release the cassette assembly 130 and thus it operates the motor 158 to rearwardly displace the plunger rod 230, which pulls the lock release element 251 rearwardly along with it. Due to engagement between lock release engaging element 660 of the locking elements 180 with the lock release element 251, the lock release element 251 is displaced slightly rearwardly together with the plunger rod 230, thus causes outward pivoting of the locking elements 180 about axles 181, each in a different radial direction, against the force of springs 182 and thus in turn causing disengagement of locking protrusions 670 of the locking elements 180 from the locking openings 730 of cassette 550. Once the locking protrusions 670 of locking elements 180 disengage locking openings 730 of the cassette 550, spring 252 which is supported on spring seat element 560 of the cassette assembly 130 biases the cassette assembly 130 axially forwardly along longitudinal axis 105 to be released from the cassette guiding and locking element 170.

It is noted that the cassette assembly 130 in the released operative orientation, such as shown in FIGS. 13A & 13B is adapted to be weakly held within the MUCI 100 by means of protrusions 752 in the cassette 550 engaging protrusions 640 in the cassette guiding and locking element 170 up until application of manual pulling force to fully detach the cassette assembly 130 from the MUCI 100.

It is a further particular feature of an embodiment of the present invention that the cassette 550 optionally bears an RFID transducer fixed thereto and containing information relating to the medicament 906. The MUCI 100 further has and an RFID communication antenna disposed within the main housing portion 102 and top housing portion 104 for communicating with the RFID transducer on the cassette 550. The MUCI 100 may be operated at least partially based on information received from the RFID transducer.

It will be appreciated by persons skilled in the art that the present invention is not limited by what has been particularly shown and described hereinabove. Rather the present invention includes both combinations and subcombinations of various features described herein and improvements and variations which would occur to persons skilled in the art upon reading the foregoing description and which are not in the prior art.

The invention claimed is:

1. A computer-controlled injector comprising:
a housing arranged along a longitudinal axis and configured to receive a cassette assembly, containing a medicament cartridge;
said housing includes a cassette assembly receiving volume and a cassette assembly insertion and removal opening communicating with said cassette assembly receiving volume;
at least one locking element for locking said cassette assembly with respect to said housing upon axial insertion of said cassette assembly into said housing; and
an injection drive mechanism including a computer-controlled motor for driving a piston, forming part of said medicament cartridge, for injecting a medicament, said computer-controlled motor also being operative for operating said at least one locking element for releasing said cassette assembly from said housing.

2. The computer-controlled injector according to claim 1, and wherein said at least one locking element includes two mutually pivotable locking elements, selectively couplable with said cassette assembly for locking thereof with respect to said housing.

3. The computer-controlled injector according to claim 2, and wherein said two mutually pivotable locking elements being biased radially inwardly to assume a locked orientation.

4. The computer-controlled injector according to claim 1, and wherein said cassette assembly includes a cassette and a needle presence responsive element slidably attached with respect thereto.

5. The computer-controlled injector according to claim 1, and wherein said cassette assembly is axially received into said housing along said longitudinal axis.

6. The computer-controlled injector according to claim 1, and wherein said injection drive mechanism also comprises a plunger rod to displace said piston for injecting a medicament.

7. The computer-controlled injector according to claim 6, also comprising an at least one lock release element, associated with said plunger rod and wherein rearward displacement of said plunger rod urges rearward displacement of said lock release element and thereby causing release of said cassette assembly from said housing.

8. The computer-controlled injector according to claim 7, and wherein said cassette assembly is released from said housing upon radial outward pivotable displacement of said at least one locking element against a biasing force.

9. The computer-controlled injector according to claim 7, and wherein said lock release element is configured to operatively couple said plunger rod to said at least one locking element, such that rearward displacement of the plunger rod causes pivoting of the at least one locking element radially outwardly, thereby releasing said cassette assembly from said housing.

10. The computer-controlled injector according to claim 1, and wherein said cassette assembly comprises: a cassette having a proximal end and a distal end and an externally threaded protrusion, which extends from said forward end of said cassette for mounting of a needle assembly thereto; and a needle presence responsive element slidably arranged with respect to said cassette and being biased to a forward extended position with respect to said cassette under the force of at least one biasing element before needle assembly attachment to said externally threaded protrusion.

11. A computer-controlled injector comprising:
a housing arranged along a longitudinal axis and configured to receive a cassette assembly, containing a medicament cartridge;
said housing includes a cassette assembly receiving volume and a cassette assembly insertion and removal opening communicating with said cassette assembly receiving volume;

at least one locking element for locking said cassette assembly with respect to said housing upon axial insertion of said cassette assembly into said housing;

at least one lock release element; and an injection drive mechanism including a computer-controlled motor for driving a plunger rod to displace a piston, forming part of said medicament cartridge, for injecting a medicament, and wherein rearward displacement of said plunger rod urges rearward displacement of said lock release element and thereby is operative to release said cassette assembly from said housing.

12. The computer-controlled injector according to claim 11, and wherein said lock release element is configured to operatively couple the plunger rod to the at least one locking elements, such that pivoting of said locking elements is operative to release said cassette assembly from said housing.

13. The computer-controlled injector according to claim 11, and wherein said computer-controlled motor also being operative for operating said at least one locking element for releasing said cassette assembly from said housing.

14. The computer-controlled injector according to claim 11, and wherein said at least one locking element includes two mutually pivotable locking elements, selectively couplable with said cassette assembly for locking thereof with respect to said housing.

15. The computer-controlled injector according to claim 14, and wherein said two mutually pivotable locking elements being biased radially inwardly to assume a locked orientation.

16. The computer-controlled injector according to claim 11, and wherein said cassette assembly includes a cassette and a needle presence responsive element slidably attached with respect thereto.

17. The computer-controlled injector according to claim 11, and wherein said cassette assembly is axially received into said housing along said longitudinal axis.

18. The computer-controlled injector according to claim 11, and wherein said cassette assembly is released from said housing upon radial outward pivotable displacement of said at least one locking element against a biasing force.

19. The computer-controlled injector according to claim 11, and wherein said lock release element is configured to operatively couple said plunger rod to said at least one locking element, such that rearward displacement of the plunger rod causes pivoting of the at least one locking element radially outwardly, thereby releasing said cassette assembly from said housing.

20. The computer-controlled injector according to claim 11, and wherein said cassette assembly comprises: a cassette having a proximal end and a distal end and an externally threaded protrusion, which extends from said forward end of said cassette for mounting of a needle assembly thereto; and a needle presence responsive element slidably arranged with respect to said cassette and being biased to a forward extended position with respect to said cassette under the force of at least one biasing element before needle assembly attachment to said externally threaded protrusion.

* * * * *